US012620567B2

(12) United States Patent
Deng et al.

(10) Patent No.: US 12,620,567 B2
(45) Date of Patent: May 5, 2026

(54) APPARATUS FOR ION MANIPULATION HAVING CURVED TURN REGIONS

(71) Applicant: MOBILion Systems, Inc., Chadds Ford, PA (US)

(72) Inventors: Liulin Deng, Chester Springs, PA (US); Adam Michael Engelson, Glen Mills, PA (US); John Daniel DeBord, West Grove, PA (US)

(73) Assignee: MOBILion Systems, Inc., Chadds Ford, PA (US)

( * ) Notice: Subject to any disclaimer, the term of this patent is extended or adjusted under 35 U.S.C. 154(b) by 550 days.

(21) Appl. No.: 18/105,083

(22) Filed: Feb. 2, 2023

(65) Prior Publication Data

US 2023/0187194 A1 Jun. 15, 2023

Related U.S. Application Data

(63) Continuation-in-part of application No. PCT/US2021/065617, filed on Dec. 30, 2021.

(60) Provisional application No. 63/132,876, filed on Dec. 31, 2020.

(51) Int. Cl.
*H01J 49/06* (2006.01)

(52) U.S. Cl.
CPC .................................. *H01J 49/062* (2013.01)

(58) Field of Classification Search
USPC .................................................. 250/291, 290
See application file for complete search history.

(56) References Cited

U.S. PATENT DOCUMENTS 5,789,745 A 8/1998 Martin et al.
6,107,628 A 8/2000 Smith et al.
6,791,078 B2 9/2004 Giles et al.
(Continued)

FOREIGN PATENT DOCUMENTS

EP 1942340 A1 7/2008
GB 2457769 A 9/2009
(Continued)

OTHER PUBLICATIONS

PCT International Search Report and Written Opinion dated Mar. 15, 2022, issued in Int'l App. No. PCT/US21/65617 (12 pages).
(Continued)

*Primary Examiner* — Kiet T Nguyen
(74) *Attorney, Agent, or Firm* — McCarter & English, LLP

(57) ABSTRACT

An apparatus for ion manipulations includes an ion manipulation path extending between an inlet and an outlet, at least one continuous electrode configured to receive a first RF voltage signal, and a plurality of segmented electrodes configured to receive a second voltage signal and generate a traveling wave field based thereon. The ion manipulation path includes a first region extending in a first direction, a second region extending in a second direction, and a curved region extending between the first and second regions. The at least one continuous electrode extends through the first region, the curved region, and second region. The segmented electrodes are arranged along the ion manipulation path in the first region, the curved region, and the second region. The traveling wave field is configured to cause ions to travel through, the first region, the curved region, and the second region.

43 Claims, 40 Drawing Sheets

(56) References Cited

U.S. PATENT DOCUMENTS

| | | | |
|---|---|---|---|
| 6,794,641 | B2 | 9/2004 | Bateman et al. |
| 6,800,846 | B2 | 10/2004 | Bateman et al. |
| 6,812,453 | B2 | 11/2004 | Bateman et al. |
| 6,872,939 | B2 | 3/2005 | Bateman et al. |
| 6,884,995 | B2 | 4/2005 | Bateman et al. |
| 6,891,157 | B2 | 5/2005 | Bateman et al. |
| 6,914,241 | B2 | 7/2005 | Giles et al. |
| 7,064,321 | B2 | 6/2006 | Franzen |
| 7,071,467 | B2 | 7/2006 | Bateman |
| 7,095,013 | B2 | 8/2006 | Bateman et al. |
| 7,205,538 | B2 | 4/2007 | Bateman et al. |
| 7,405,401 | B2 | 7/2008 | Hoyes |
| 7,456,394 | B2 | 11/2008 | Cameron et al. |
| 7,459,693 | B2 | 12/2008 | Park et al. |
| 7,491,930 | B2 | 2/2009 | Shvartsburg et al. |
| 7,514,676 | B1 | 4/2009 | Page et al. |
| 7,671,344 | B2 | 3/2010 | Tang et al. |
| 7,714,278 | B2 | 5/2010 | Boyle et al. |
| 7,781,728 | B2 | 8/2010 | Senko et al. |
| 7,829,841 | B2 | 11/2010 | Bateman et al. |
| 7,838,826 | B1 | 11/2010 | Park |
| 7,888,635 | B2 | 2/2011 | Belov et al. |
| 7,960,694 | B2 | 6/2011 | Hoyes |
| 8,288,717 | B2 | 10/2012 | Park |
| 8,299,443 | B1 | 10/2012 | Shvartsburg et al. |
| 8,319,177 | B2 | 11/2012 | Boyle et al. |
| 8,384,024 | B2 | 2/2013 | Miller et al. |
| 8,389,933 | B2 | 3/2013 | Hoyes |
| 8,487,240 | B2 | 7/2013 | Koehl |
| 8,581,177 | B2 | 11/2013 | Kovtoun |
| 8,648,293 | B2 | 2/2014 | Correale |
| 8,742,339 | B2 | 6/2014 | Hoyes |
| 8,809,769 | B2 | 8/2014 | Park |
| 8,829,464 | B2 | 9/2014 | Hoyes et al. |
| 8,835,839 | B1 | 9/2014 | Anderson et al. |
| 8,901,490 | B1 | 12/2014 | Chen et al. |
| 8,907,272 | B1 | 12/2014 | Wouters et al. |
| 8,907,273 | B1 | 12/2014 | Chen et al. |
| 8,921,772 | B2 | 12/2014 | Verenchikov |
| 8,941,054 | B2 | 1/2015 | Park et al. |
| 8,941,055 | B2 | 1/2015 | Park et al. |
| 8,946,626 | B2 | 2/2015 | Giles et al. |
| 8,952,326 | B1 | 2/2015 | Ugarov |
| 8,969,800 | B1 | 3/2015 | Tolmachev et al. |
| 9,063,086 | B1 | 6/2015 | Garimella et al. |
| 9,123,516 | B2 | 9/2015 | Hasegawa et al. |
| 9,123,518 | B2 | 9/2015 | Giles et al. |
| 9,281,170 | B2 | 3/2016 | Park et al. |
| 9,281,172 | B2 | 3/2016 | Bateman et al. |
| 9,417,211 | B2 | 8/2016 | Verenchikov |
| 9,425,035 | B2 | 8/2016 | Giles et al. |
| 9,429,543 | B2 | 8/2016 | Jiang et al. |
| 9,455,132 | B2 | 9/2016 | Mordehai et al. |
| 9,683,964 | B2 | 6/2017 | Park et al. |
| 9,704,701 | B2 | 7/2017 | Ibrahim et al. |
| 9,741,552 | B2 | 8/2017 | Park et al. |
| 9,761,427 | B2 | 9/2017 | Wouters et al. |
| 9,799,503 | B2 | 10/2017 | Williams et al. |
| 9,812,311 | B2 | 11/2017 | Anderson et al. |
| 9,824,874 | B2 | 11/2017 | Brahim et al. |
| 9,865,442 | B2 | 1/2018 | Giles et al. |
| 9,880,129 | B2 | 1/2018 | Bateman |
| 9,916,968 | B1 | 3/2018 | Kurulugama et al. |
| 9,939,408 | B2 | 4/2018 | Giles et al. |
| 9,939,409 | B2 | 4/2018 | Ibrahim et al. |
| 9,966,244 | B2 | 5/2018 | Anderson et al. |
| 10,018,592 | B2 | 7/2018 | Ibrahim et al. |
| 10,032,617 | B2 | 7/2018 | Welkie |
| 10,060,879 | B2 | 8/2018 | Silveira |
| 10,192,728 | B2 | 1/2019 | Zhang et al. |
| 10,224,194 | B2 | 3/2019 | Ibrahim et al. |
| 10,224,196 | B2 | 3/2019 | Giles et al. |
| 10,241,079 | B2 | 3/2019 | Betz et al. |
| 10,317,362 | B2 | 6/2019 | Harder et al. |
| 10,317,364 | B2 | 6/2019 | Garimella et al. |
| 10,319,575 | B2 | 6/2019 | Brown et al. |
| 10,332,723 | B1 | 6/2019 | Ibrahim et al. |
| 10,408,792 | B2 | 9/2019 | Betz et al. |
| 10,424,474 | B2 | 9/2019 | Ibrahim et al. |
| 10,446,381 | B2 | 10/2019 | Giles et al. |
| 10,460,920 | B1 | 10/2019 | Smith |
| 10,466,202 | B2 | 11/2019 | Brahim et al. |
| 10,473,620 | B2 | 11/2019 | Harder et al. |
| 10,497,552 | B2 | 12/2019 | Ibrahim et al. |
| 10,515,790 | B2 | 12/2019 | Cheng et al. |
| 10,522,337 | B2 | 12/2019 | Rizzo et al. |
| 10,665,443 | B2 | 5/2020 | Ibrahim et al. |
| 10,692,710 | B2 | 6/2020 | Prabhakaran et al. |
| 10,720,315 | B2 | 7/2020 | Taghioskoui |
| 10,741,375 | B2 | 8/2020 | Hamid et al. |
| 10,804,089 | B2 | 10/2020 | Ibrahim et al. |
| 10,811,243 | B2 | 10/2020 | Peterson et al. |
| 10,811,244 | B2 | 10/2020 | Green et al. |
| 10,840,077 | B2 | 11/2020 | Taghioskoui |
| 10,861,687 | B2 | 12/2020 | Wildgoose et al. |
| 10,976,283 | B2 | 4/2021 | Ibrahim et al. |
| 11,209,393 | B2 | 12/2021 | Garimella et al. |
| 11,293,898 | B2 | 4/2022 | Prasad et al. |
| 11,322,340 | B2 | 5/2022 | Hamid et al. |
| 11,460,439 | B2 | 10/2022 | DeBord et al. |
| 11,543,384 | B2 | 1/2023 | DeBord et al. |
| 11,605,531 | B2 | 3/2023 | Ibrahim et al. |
| 11,662,333 | B2 | 5/2023 | DeBord et al. |
| 11,670,495 | B2 | 6/2023 | DeBord et al. |
| 2007/0034810 | A1 | 2/2007 | Hoyes |
| 2007/0278396 | A1 | 12/2007 | Wu |
| 2008/0308721 | A1 | 12/2008 | Senko et al. |
| 2010/0282961 | A1 | 11/2010 | Miller et al. |
| 2011/0266432 | A1 | 11/2011 | Ugarov |
| 2014/0353496 | A1 | 12/2014 | Thomson |
| 2016/0071715 | A1 | 3/2016 | Anderson et al. |
| 2019/0004011 | A1 | 1/2019 | Garimella et al. |
| 2019/0103261 | A1 | 4/2019 | Ibrahim et al. |
| 2019/0189393 | A1* | 6/2019 | Ibrahim .................. H01J 37/21 |
| 2019/0348268 | A1 | 11/2019 | Hamid et al. |
| 2019/0369049 | A1 | 12/2019 | Ridgeway |
| 2019/0369050 | A1 | 12/2019 | Garimella et al. |
| 2020/0161119 | A1 | 5/2020 | Richardson et al. |
| 2020/0200708 | A1 | 6/2020 | Ibrahim et al. |
| 2020/0321190 | A1 | 10/2020 | Ibrahim et al. |
| 2020/0321208 | A1 | 10/2020 | Cooks et al. |
| 2020/0326304 | A1 | 10/2020 | Giles et al. |
| 2020/0373139 | A1 | 11/2020 | DeBord et al. |
| 2020/0378922 | A1 | 12/2020 | Ibrahim et al. |
| 2020/0381241 | A1 | 12/2020 | Park et al. |
| 2021/0080429 | A1 | 3/2021 | DeBord et al. |
| 2021/0156822 | A1 | 5/2021 | DeBord et al. |
| 2021/0364467 | A1 | 11/2021 | DeBord et al. |
| 2021/0382006 | A1 | 12/2021 | DeBord et al. |
| 2022/0074891 | A1 | 3/2022 | DeBord et al. |
| 2022/0136999 | A1 | 5/2022 | Garimella et al. |
| 2022/0365027 | A1 | 11/2022 | Makarov |
| 2023/0008420 | A1 | 1/2023 | Krioutchkov et al. |
| 2023/0052193 | A1 | 2/2023 | Krioutchkov et al. |
| 2023/0103674 | A1 | 4/2023 | DeBord et al. |

FOREIGN PATENT DOCUMENTS

| | | | |
|---|---|---|---|
| WO | 2020/201732 | A1 | 10/2020 |
| WO | 2020/243194 | A1 | 12/2020 |
| WO | 2022/147201 | A1 | 7/2022 |
| WO | 2024/011187 | A1 | 1/2024 |

OTHER PUBLICATIONS

Brodeur et al., "Experimental Investigation of the Ion Surfing Transport Method," Int'l Journal of Mass Spec., vol. 336, pp. 53-60, Feb. 2013 (8 pages).

Donohoe, et al., "A New Ion Mobility-Linear Ion Trap Instrument for Complex Mixture Analysis," Anal. Chem., vol. 86, Iss. 16, pp. 8121-8128, Aug. 19, 2014 (17 pages).

F. W. Schmidlin, "A New Nonlevitated Mode of Traveling Wave Toner Transport," IEEE, Copyright 1988 (5 pages).

(56) References Cited

OTHER PUBLICATIONS

G. Bollen, "Ion Surfing' with Radiofrequency Carpets," Int'l Journal of Mass Spec., vol. 299, pp. 131-138, Jan. 2011 (8 pages).
Hamid et al., "Characterization of Traveling Wave Ion Mobility Separations in Structures for Lossless Ion Manipulations," Anal. Chem., 2015, 87, pp. 11301-11308, published Oct. 28, 2015 (8 pages).
Henderson et al., "ESI/Ion Trap/Ion Mobility/Time-of-Flight Mass Spectrometry for Rapid and Sensitive Analysis of Biomolecular Mixtures," Anal. Chem., vol. 71, Iss. 2, pp. 291-301, Jan. 15, 1999 (Abstract only—1 page).
Hoaglund-Hyzer et al., "Ion Trap/Ion Mobility/Quadrupole/Time-of-Flight Mass Spectrometry for Peptide Mixture Analysis," Anal. Chem., vol. 73, Iss. 2, pp. 177-184, Jan. 15, 2001 (Abstract only—1 page).
Ibrahim et al., "Development of a New Ion Mobility (Quadrupole) Time-of-Flight Mass Spectrometer," Int'l Journal of Mass Spectrometry, 377 (2015) 655-662, Jul. 28, 2014 (8 pages).
Jiang et al., "Ion Mobility-Mass Spectrometry," Encyclopedia of Anal. Chem., 2013, DOI: 10.1002/9780470027318. a9292 (21 pages).
Li et al., "Ion Mobility Spectrometry with High Ion Utilization Efficiency Using Traveling Wave-Based Structures for Lossless Ion Manipulations (SLIM)," poster presented at the Proceedings of the 68th ASMS Conference on Mass Spectrometry and Allied Topics, Online Meeting, Jun. 1-12, 2020 (1 page).
Li et al., "Ion Mobility Spectrometry with High Ion Utilization Efficiency Using Traveling Wave-Based Structures for Lossless Ion Manipulations," Anal. Chem., vol. 92, Iss. 22, pp. 14930-14938, Oct. 26, 2020 (9 pages).
Masuda et al., "Movement of Blood Cells in Liquid by Nonuniform Traveling Field," IEEE Transactions on Industry Applications, vol. 24, No. 2, pp. 217-222, Mar./Apr. 1988 (6 pages).
N. Agbonknkon, "Counter-flow Ion Mobility Analysis: Design, Instrumentation, and Characterization," Theses and Dissertations 1215, Nov. 14, 2007, https://scholarsarchive.byu.edu/etd/1215 (230 pages).
Wu et al., "Separation of Isomeric Peptides Using Electrospray Ionization/High-Resolution Ion Mobility Spectrometry," Anal. Chem., vol. 72, Iss. 2, pp. 391-395, Jan. 15, 2000 (Abstract only—1 page).
Zhang et al., "Ion Trapping, Storage, and Ejection in Structures for Lossless Ion Manipulations," Anal. Chem. 2015, 87, 6010-6016, May 14, 2015 (7 pages).

* cited by examiner

APPARATUS FOR ION MANIPULATION HAVING CURVED TURN REGIONS

CROSS-REFERENCE TO RELATED APPLICATIONS

The present application is a continuation-in-part of International Application No. PCT/US2021/065617, filed Dec. 30, 2021, which claims the benefit of priority to U.S. Provisional Patent Application Ser. No. 63/132,876, filed on Dec. 31, 2020, both of which are herein incorporated by reference in their entirety.

TECHNICAL FIELD

The present disclosure relates generally to ion extraction and transmission systems used in the fields of ion mobility spectrometry (IMS) and mass spectrometry (MS). More specifically, the present disclosure relates to systems and methods for extracting ions from a gas flow, e.g., using ion manipulation systems such as Structures for Lossless Ion Manipulation (SLIM) to extract ions from a low-pressure gas mixture and focus the extracted ions through an aperture into an adjoining vacuum chamber, as well as IMS devices having curved regions and ion manipulation paths.

RELATED ART

Mass spectrometry and ion mobility systems can utilize one or more inlet ion optics to couple an ionization source, e.g., an electrospray ion source, with an analyzer device, e.g., a mass spectrometer, or ion manipulation optics, e.g., an ion mobility separation (IMS) device, for example. In particular, such inlet ion optics are configured to receive ions from the ionization source, which can be discharged from the ionization source and into the inlet ion optics through a capillary or skimmer, focus the received ions, and transfer the ions to an adjoining vacuum region that differs in pressure or flow characteristics. This adjoining vacuum region can contain an analyzer that separates or filters the incoming ions based on their gas phase mobility or mass to charge ratio. For example, the capillary can discharge the ions into the inlet ion optics within a low-pressure, high-flow gas stream.

One type of inlet ion optics is an ion funnel, such as a stacked ring ion funnel. Stacked ring ion funnels can include a series of stacked ring electrodes that are spaced apart and extend from an entrance to an exit, and define an interior chamber. The entrance can receive the capillary, e.g., from an electrospray ion source, which discharges ions into the interior chamber of the stacked ring ion funnel. However, ion funnels often require a multitude of high-precision components arranged into a complex and costly assembly, a relatively large form factor to operate properly, and time consuming and complicated computational fluid dynamics and ion trajectory simulations for design optimization.

An additional issue that can result from the low-pressure, high-flow gas stream being discharged into the inlet ion optics is that a portion of the discharged gas can enter the adjoining vacuum region. In many ion analysis systems this adjoining vacuum region houses analyzers which require well controlled pressure and flow conditions to operate properly. This analyzer region can be at a lower or higher pressure than that of the inlet optics region. In either case, the incoming gas flow from the ion source may be transmitted to the analyzer region, e.g., if the inlet extraction optics are not designed with significant care to ensure proper and adequate removal of the gas. This can result in the contamination or disruption of the analyzer region, which can be detrimental to the device's intended ion manipulation function, e.g., due to the gas flow and/or composition. To fully remove gas jet effects from the exit of the inlet ion optics, complicated designs, such as dual ion funnels, orthogonal capillary inlet configurations, etc., are necessary, which can add to the overall cost, size, and complexity of the system.

Inlet ion optics can also be expensive and complex devices that require substantial design effort to ensure compatibility with the ionization source and analyzer to which they are intended to be coupled. In some instances, this can also require modification of the ionization source and/or device hardware. Moreover, since in some instances prior art inlet ion optics are designed to be coupled to a specific ionization source and analyzer, additional or alternative inlet ion optics cannot be utilized in the same system without substantial and expensive modifications.

In addition to the foregoing, prior art SLIM devices include turn regions that are formed from multiple paths interfacing at 90 degree angles, and which utilize perpendicular intersections or junctions of electrodes, e.g., RF electrodes and traveling wave electrodes, in order to change the direction of travel for ions. Thus, in prior art turn regions, ions are discharged from one path into another perpendicular path to cause the ions' direction of travel to change. However, this configuration results in some different phase RF electrodes being in close proximity at interface regions of the turn, e.g., where a first path transitions or intersects with a second path. This can result in mis-aligned RF signals that can have negative impacts on performance, including, for example: unintentional trapping of ions, ion heating and fragmentation, loss of large or small ions at the edges of the core transmission range, and reduction of ion mobility resolution due to differential ion transmission through the junction. Additionally, the turn regions of the prior art SLIM devices generally permit ions to travel in a single direction through the turn, as they must be discharged perpendicularly from the first path to the second path, which is disposed perpendicularly thereto, and this perpendicular discharge is unidirectional.

Accordingly, there is a need for systems for ion extraction and guidance that prevent neutral gas molecules from contaminating or disrupting an associated ion analysis region and address the above-identified challenges, as well as improved turn regions for SLIM devices that address the above-identified challenges.

SUMMARY

The present disclosure relates to systems and methods for extracting ions from a gas flow, e.g., using an ion manipulation path to extract the ions from a low-pressure gas flow and transmit the extracted ions into an adjoining vacuum region for analysis.

In accordance with embodiments of the present disclosure, a system for extracting ions from a gas flow includes a housing, an ion manipulation path, and a pump. The housing includes an entrance port, an exit port, and a vacuum pump port. The entrance port is configured to receive a gas flow comprising ions and gas. The ion manipulation path includes a first surface having a first plurality of electrodes and a second surface having a second plurality of electrodes. The ion manipulation path is positioned within the housing and is configured to receive the gas flow. The ion manipulation path is also configured to extract at least a portion of the ions from the gas flow, and transmit the ions extracted from the gas flow toward the exit port of the housing. The pump is in fluidic communication with the vacuum pump port, and is configured to extract the gas from the housing through the vacuum pump port.

In some aspects, the vacuum pump port can prevent the gas from exiting the housing through the exit port.

In some aspects, the system can include an analyzer region positioned adjacent the exit port. The analyzer region can have a pressure greater than a pressure of the housing to prevent the gas from exiting the housing through the exit port and entering the analyzer region.

In some aspects, the ion manipulation path can include one or more printed circuit boards having the first plurality of electrodes and the second plurality of electrodes. While in other aspects, the exit port can be configured to be mounted adjacent an analyzer. In such aspects, the analyzer region can include one or more of an ion mobility separation device, a Structure for Lossless Ion Manipulation (SLIM), and a mass spectrometer.

In some other aspects, the entrance port can be positioned in a first side of the housing and the exit port can be positioned in a second side of the housing opposite the first side of the housing. In these aspects, the vacuum pump port can be positioned in a third side of the housing between the entrance port and the exit port. Alternatively, the vacuum pump port can be positioned in the second side of the housing aligned with the entrance port, and the exit port can be offset from the vacuum pump port. In such aspects, the ion manipulation path can include an inlet region, a diverter region, and an exit region. The diverter region can be configured to guide the ions in a direction different than a direction of the gas flow.

In other aspects, the entrance port can be positioned in a first side of the housing and the vacuum pump port can be positioned in a second side of the housing opposite the first side of the housing such that the vacuum pump port is aligned with the entrance port. In these aspects, the exit port can be positioned in a third side of the housing between the entrance port and the vacuum port.

In still other aspects, the system can include a gas diverter positioned within the housing between the entrance port and the exit port. The gas diverter can be configured to block the gas flow from accessing the exit port. In such aspects, the ion manipulation path can include an inlet region, a diverter region, and an outlet region. The diverter region can extend partially around the gas diverter toward the vacuum pump port. In such aspects, the diverter region can form an open area, and the gas diverter can be positioned within the open area. In other such aspects, the gas diverter can include a curved face aligned with the entrance port, and the curved face can be concave and curve generally from the entrance port to the vacuum pump port.

In further aspects, the ion manipulation path can include a tapered funnel region configured to capture and focus ions from the gas flow, and to permit the gas of the gas flow to expand and dissipate.

In accordance with embodiments of the present disclosure, a method of extracting ions from a gas flow includes discharging a gas flow comprising ions and gas into a housing of an ion extraction system that includes an entrance port, an exit port, and a vacuum pump port. The method further involves receiving the gas flow, extracting at least a portion of the ions from the gas flow, and transmitting the ions extracted from the gas flow toward the exit port of the housing, by an ion manipulation path of the ion extraction system, which is positioned within the housing and includes a first surface having a first plurality of electrodes and a second surface having a second plurality of electrodes. The method further involves extracting, with a pump, the gas from the housing through the vacuum pump port.

In some aspects, the method can include the step of preventing the gas from exiting the housing through the exit port with the vacuum pump port.

In some aspects, the method can include the step of preventing the gas from exiting the housing through the exit port and entering an analyzer region positioned adjacent the exit port by adjusting a pressure of the housing to a first pressure value and adjusting a pressure of an analyzer region to a second pressure value greater than the first pressure value In other aspects, the ion manipulation path includes one or more printed circuit boards having the first plurality of electrodes and the second plurality of electrodes. While in other aspects, the exit port can be configured to be mounted adjacent an analyzer region that can include one or more of an ion mobility separation device, a Structure for Lossless Ion Manipulation (SLIM), and a mass spectrometer.

In some other aspects, the entrance port can be positioned in a first side of the housing and the exit port can be positioned in a second side of the housing opposite the first side of the housing. In these aspects, the vacuum pump port can be positioned in a third side of the housing between the entrance port and the exit port. Alternatively, the vacuum pump port can be positioned in the second side of the housing aligned with the entrance port, and the exit port can be offset from the vacuum pump port. In such aspects, the ion manipulation path can include an inlet region, a diverter region, and an exit region. The diverter region can be configured to guide the ions in a direction different than a direction of the gas flow.

In other aspects, the entrance port can be positioned in a first side of the housing and the vacuum pump port can be positioned in a second side of the housing opposite the first side of the housing such that the vacuum pump port is aligned with the entrance port. In these aspects, the exit port can be positioned in a third side of the housing between the entrance port and the vacuum port.

In some aspects, the method can include blocking the gas of the gas flow from accessing the exit port of the housing with a diverter of the ion extraction system positioned between the entrance port and the exit port. In such aspects, the ion manipulation path can include an inlet region, a diverter region, and an outlet region. The diverter region can extend partially around the gas diverter toward the vacuum pump port. In such aspects, the diverter region can form an open area, and the gas diverter can be positioned within the open area. In other aspects, the gas diverter can include a curved face aligned with the entrance port. In such aspects, the curved face can be concave and curve generally from the entrance port to the vacuum pump port.

In further aspects, the method can include capturing and focusing ions from the gas flow with a tapered funnel region of the ion manipulation path, causing the gas of the gas flow to expand and dissipate.

In accordance with the present disclosure, an apparatus for ion manipulations includes an inlet, and outlet, an ion manipulation path, at least one continuous electrode, and a plurality of segmented electrodes. The inlet is configured to receive ions and the outlet is configured to have ions discharged therefrom. The ion manipulation path extends between the inlet and the outlet, and includes a first region extending in a first direction, a second region extending in a second direction, and a curved region extending between the first region and the second region. The at least one continuous electrode is configured to receive a first RF voltage signal and extends through the first region, the curved region, and the second region. The plurality of segmented electrodes are arranged along the ion manipulation path in the first region, the curved region, and the second region, and are configured to receive a second voltage signal and generate a traveling wave field based on the second voltage signal. The traveling wave field is configured to cause the ions received at the inlet to travel through the first region, the curved region, and the second region.

In some aspects, the at least one continuous electrode can curve along the curved region in a single continuous curve, while in other aspects the at least one continuous electrode can curve along the curved region in a plurality of angularly connected sequential straight sections.

In further aspects, the second direction can be different than the first direction, while in other aspects the second direction can be the same as the first direction and the second region can be laterally offset from the first region.

In still other aspects, the curved region can curve between 0° to 180° from the first region to the second region, can include at least two sequential turns, and/or can be configured to change a direction of travel of the ions.

In some aspects, the at least one continuous electrode can include a first continuous electrode and a second continuous electrode, and the plurality of segmented electrodes can be positioned between the first continuous electrode and the second continuous electrode. In such aspects, a second plurality of segmented electrodes can be arranged along the ion manipulation path in the first region, the curved region, and the second region. Additionally, the at least one continuous electrode can include a third continuous electrode and the second plurality of segmented electrodes can be positioned between the second continuous electrode and the third continuous electrode. The plurality of segmented electrodes can also include a first number of individual electrodes in the curved region and the second plurality of segmented electrodes can include a second number of individual electrodes in the curved region. In this regard, the second number of individual electrodes can be greater than the first number of individual electrodes. Additionally, in such aspects, the second voltage signal can be an AC voltage signal that is applied to adjacent electrodes within a sequential set of the plurality of segmented electrodes and phase shifted on the adjacent electrodes of the plurality of segmented electrodes by a first value between 1° and 359°. The second plurality of segmented electrodes can also be configured to receive the AC voltage signal, which can be applied to adjacent electrodes within a sequential set of the second plurality of segmented electrodes and phase shifted on the adjacent electrodes of the second plurality of segmented electrodes by a second value between 1° and 359°, which can be different than the first value.

In some aspects, the plurality of segmented electrodes can be curved electrodes, rectangular electrodes, or a combination of curved electrodes and rectangular electrodes.

In still other aspects, the at least one continuous electrode and the plurality of segmented electrodes can be arranged on the same surface.

In accordance with the present disclosure, a curved ion manipulation path includes an inlet, an outlet, a curved region extending between the inlet and the outlet, at least one continuous electrode, and a plurality of segmented electrodes. The inlet is configured to receive ions in a first direction and the outlet is configured to discharge ions in a second direction. The at least one continuous electrode extends through the curved region from the inlet to the outlet, and is configured to receive a first RF voltage signal. The plurality of segmented electrodes are arranged along the curved region from the inlet to the outlet, and are configured to receive a second voltage signal and generate a traveling wave field based on the second voltage signal. The traveling wave field is configured to cause the ions received at the inlet to travel through the curved region and to be discharged from the outlet in the second direction.

In some aspects, the at least one continuous electrode can curve along the curved region in a single continuous curve, while in other aspects the at least one continuous electrode can curve along the curved region in a plurality of angularly connected sequential straight sections.

In further aspects, the second direction can be different than the first direction, while in other aspects the second direction can be the same as the first direction and the inlet can be laterally offset from the outlet.

In still other aspects, the curved region can curve between 0° to 180° from the inlet to the outlet, can include at least two sequential turns, and/or can be configured to change a direction of travel of the ions.

In some aspects, the at least one continuous electrode can include a first continuous electrode and a second continuous electrode, and the plurality of segmented electrodes can be positioned between the first continuous electrode and the second continuous electrode. In such aspects, a second plurality of segmented electrodes can be arranged along the curved region from the inlet to the outlet. Additionally, the at least one continuous electrode can include a third continuous electrode and the second plurality of segmented electrodes can be positioned between the second continuous electrode and the third continuous electrode. The plurality of segmented electrodes can also include a first number of individual electrodes in the curved region and the second plurality of segmented electrodes can include a second number of individual electrodes in the curved region. In this regard, the second number of individual electrodes can be greater than the first number of individual electrodes. Additionally, in such aspects, the second voltage signal can be an AC voltage signal that is applied to adjacent electrodes within a sequential set of the plurality of segmented electrodes and phase shifted on the adjacent electrodes of the plurality of segmented electrodes by a first value between 1° and 359°. The second plurality of segmented electrodes can also be configured to receive the AC voltage signal, which can be applied to adjacent electrodes within a sequential set of the second plurality of segmented electrodes and phase shifted on the adjacent electrodes of the second plurality of segmented electrodes by a second value between 1° and 359°, which can be different than the first value.

In some aspects, the plurality of segmented electrodes can be curved electrodes, rectangular electrodes, or a combination of curved electrodes and rectangular electrodes.

In still other aspects, the at least one continuous electrode and the plurality of segmented electrodes can be arranged on the same surface.

Other features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

The present disclosure relates to systems and methods for extracting ions from a gas flow, e.g., using ion manipulation systems, as well as improved turn regions for IMS devices, as described in detail below in connection with FIGS. 1-29B.

Figure 1:
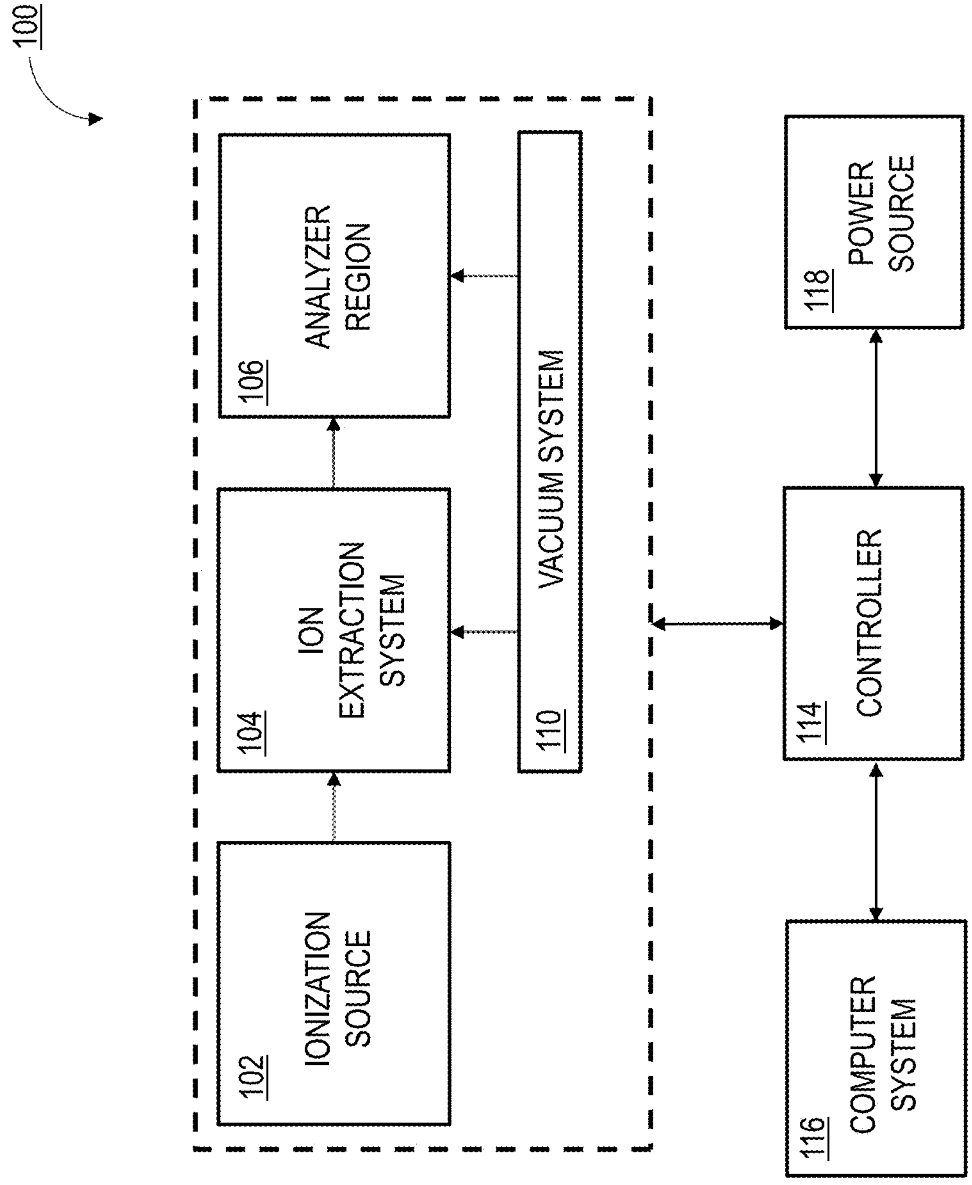
FIG. 1 is a first schematic diagram of an exemplary ion mobility separation (IMS) system incorporating an exemplary ion extraction system of the present disclosure.

FIG. 1 is a first schematic diagram of an exemplary ion analysis system 100 in accordance with the present disclosure. The ion analysis system 100 includes an ionization source 102, an ion extraction system 104, an analyzer region 106 (e.g., an IMS system and/or a mass spectrometer such as a time of flight (TOF) mass spectrometer), a vacuum system 110, a controller 114, a computer system 116, and a power source 118.

Figure 3:
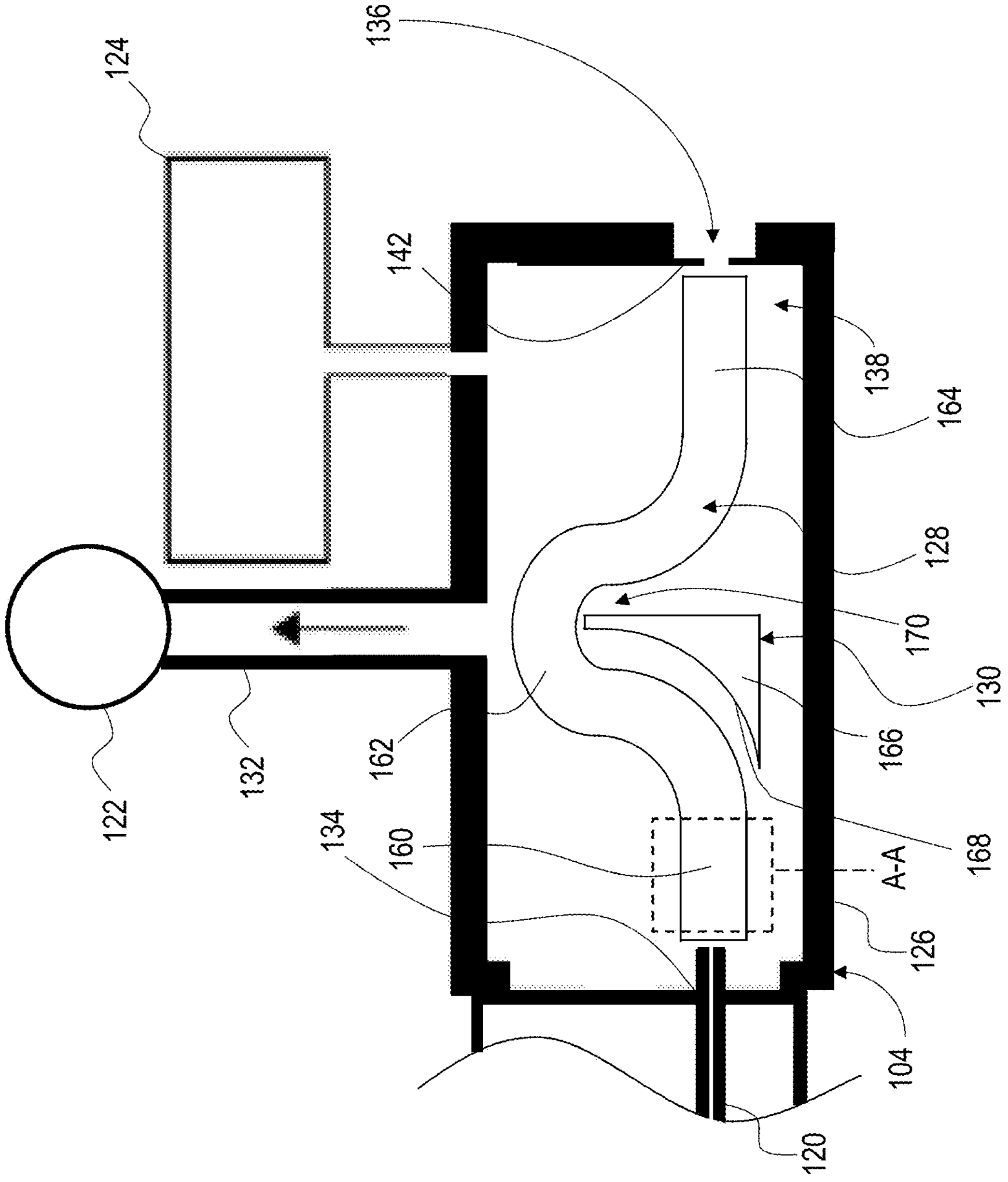
FIG. 3 is a detailed schematic diagram of the ion extraction system of FIGS. 1 and 2.

The ionization source 102 generates ions (e.g., ions having varying mobility and mass-to-charge-ratios) and passes the ions into the ion extraction system 104 through a capillary 120 (see FIG. 3). For example, the ionization source 102 can be an electrospray ion source and the capillary 120 can be a heated capillary to aid in desolvation of the ions. The capillary 120 discharges a gas jet stream mixture (herein referred to as a gas flow, gas jet, and/or gas stream), which can be a mixture of low abundance ions and high abundance neutral molecules. Accordingly, the ions exiting the capillary 120 are entrained in a gas flow that controls movement of the ions as they enter the ion extraction system 104.

The ion extraction system 104 is configured to transmit the ions to the analyzer region 106, and is described in more detail in connection with FIGS. 2 and 5. The ion extraction system 104 is in fluidic communication with the vacuum system 110 which regulates the pressure within the ion extraction system 104 and removes gas therefrom. In this regard, the vacuum system 110 can include a vacuum pump 122 and a pressure gauge 124, as shown and described in connection with FIG. 2.

The analyzer region 106 can be any device known in the art used for analyzing, e.g., transporting, accumulating, storing, separating, or detecting, ions, or a combination of multiple devices provided sequentially. For example, the analyzer region 106 can be an ion mobility spectrometry (IMS) device configured to separate the ions based on their mobility. Mobility separation can be achieved, for example, by applying one or more potential waveforms (e.g., traveling potential waveforms, direct current (DC) gradient, or both) on the ions. In this exemplary configuration, the analyzer region 106 can be a SLIM device that performs IMS based mobility separation by systematically applying traveling and/or DC potential waveforms to a collection of ions. For example, the analyzer region 106 can be configured and operated in accordance with the SLIM devices disclosed and described in U.S. Pat. No. 8,835,839 entitled "Method and Apparatus for Ion Mobility Separations Utilizing Alternating Current Waveforms" and U.S. Pat. No. 10,317,364 entitled "Ion Manipulation Device," both of which are incorporated herein by reference in their entirety. Moreover, the analyzer region 106 can be configured to transfer ions, accumulate ions, store ions, and/or separate ions, depending on the desired functionality and waveforms applied thereto by the controller 114. However, it should be understood that the analyzer region 106 need not be a SLIM device, but can be a different type of IMS device known in the art, such as a drift tube, a trapped ion mobility spectrometry (TIMS) device, or a field asymmetric ion mobility spectrometer (FAIMS), etc. Alternatively, the analyzer region 106 could be a mass spectrometer or other analytical device known in the art, including ion detection devices and downstream ion optics. Moreover, as previously noted, the analyzer region 106 could include more than one device arranged sequentially. For example, the analyzer region 106 could include a SLIM device and a mass spectrometer, where the SLIM device is configured to receive ions from the ion extraction system 104 and provide the ions separated based on mobility to the mass spectrometer for detection.

The vacuum system 110 can be in fluidic communication with the analyzer region 106 and regulate the gas pressure within the analyzer region 106. Specifically, the vacuum system 110 can provide nitrogen to the analyzer region 106 while maintaining the pressure therein at a consistent level.

The controller 114 can receive power from the power source 118, which can be, for example, a DC power source that provides DC voltage to the controller 114, and can be in communication with and control operation of the ionization source 102, the ion extraction system 104, the analyzer region 106, and the vacuum system 110. For example, the controller 114 can control the rate of injection of ions into the ion extraction system 104 by the ionization source 102, a target mobility of the analyzer region 106 (e.g., when the analyzer region 106 includes a SLIM device), the pump 122 of the vacuum system 110, the pressure within the ion extraction system 104 (e.g., through control of the vacuum system 110), the pressure within the analyzer region 106 (e.g., through control of the vacuum system 110), and ion detection by the analyzer region 106 (e.g., when the analyzer region 106 includes an ion detection device). In some aspects, e.g., when the analyzer region 106 includes a SLIM device or the ion extraction system 104 includes a SLIM path, the controller 114 can control the characteristics and motion of potential waveforms (e.g., amplitude, shape, frequency, etc.) generated by the analyzer region 106 (e.g., by applying RF/AC/DC potentials to the electrodes of the analyzer region 106) in order to transfer, accumulate, store, and/or separate ions.

The controller 114 can be communicatively coupled to a computer system 116. For example, the computer system 116 can provide operating parameters of the ion analysis system 100 via a control signal to the master control circuit. In some implementations, a user can provide the computer system 116 (e.g., via a user interface) with the operating parameters. Based on the operating parameters received via the control signal, the master control circuit can control the operation of control circuits (e.g., RF, AC, and DC control circuits) associated with the ion extraction system 104 and/or the analyzer region 106, which in turn can dictate the operation thereof. In some implementations, the control circuits can be physically distributed over the ion analysis system 100. For example, one or more of the control circuits can be located in the ion analysis system 100, and the various control circuits can operate based on power from the power source 118.

Figure 2:
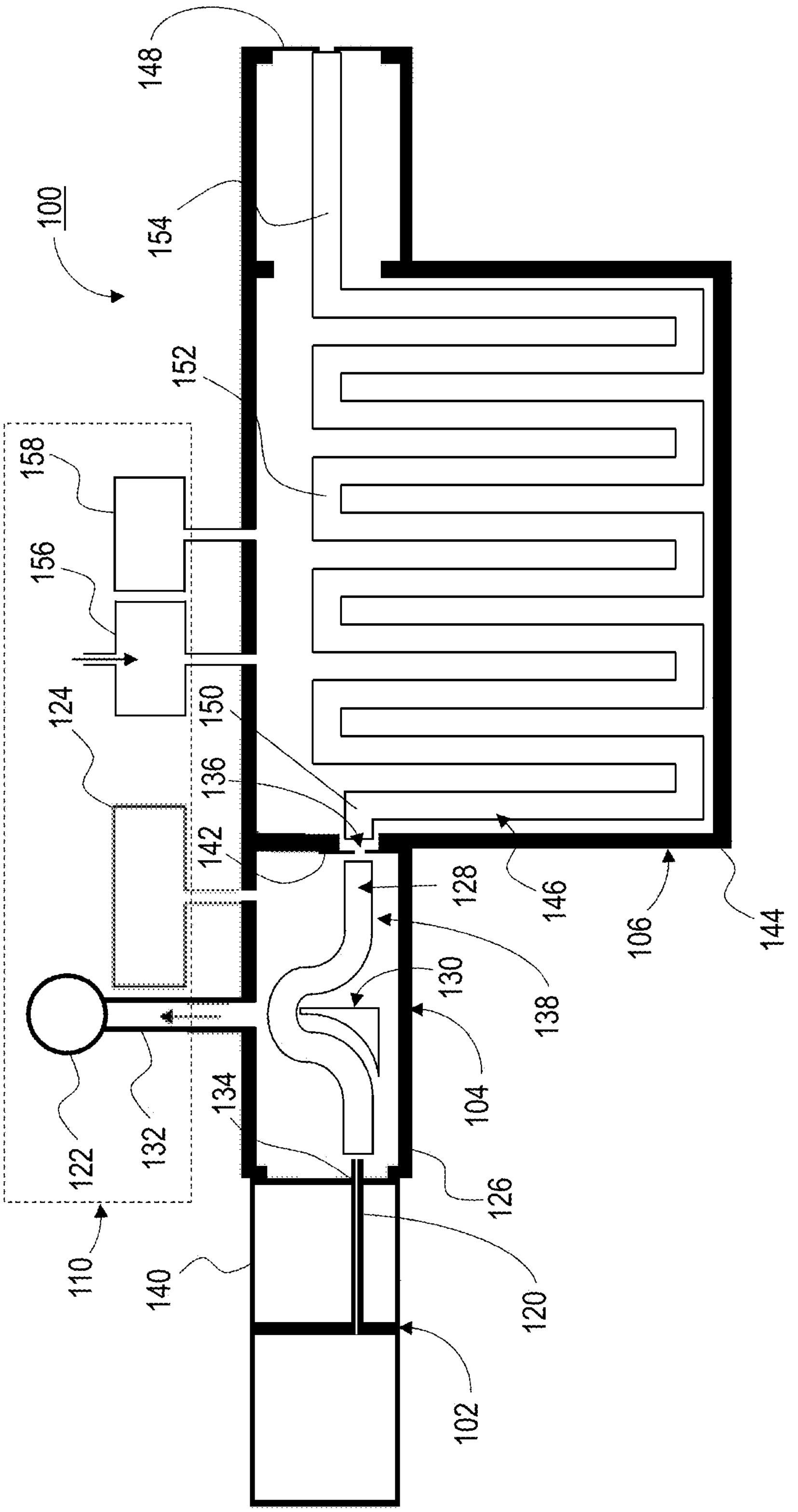
FIG. 2 is a second schematic diagram of the IMS system of FIG. 1 showing details of the ion extraction system and an IMS device of the present disclosure.

FIG. 2 is a second schematic diagram of the IMS system 100 of FIG. 1 showing details of the ion extraction system 104 of the present disclosure, and an exemplary analyzer region 106 illustrated as a SLIM device. The ion extraction system 104 includes a vacuum chamber housing 126, an ion manipulation path 128 (e.g., a SLIM path), and a gas diverter 130. The vacuum chamber housing 126 includes a vacuum pump port 132, an entrance port 134, and an exit port 136, and forms a vacuum chamber 138 in which the SLIM path 128 and gas diverter 130 are positioned. The entrance port 134 is configured to be coupled to the ionization source 102, which can include a desolvation chamber 140, and receive the capillary 120, which can extend through the entrance port 134 and into the vacuum chamber 138 so as to discharge the gas jet/flow into the SLIM path 128.

The exit port 136 is positioned generally opposite to the entrance port 134 and configured to be coupled to the analyzer region 106. A conductance limit orifice plate 142 can be positioned at the exit port 136 between the vacuum chamber housing 126 and the analyzer region 106. The vacuum pump port 132 extends from the vacuum chamber housing 126 to the vacuum pump 122, placing the vacuum pump 122 in fluidic communication with the vacuum chamber 138. The pressure gauge 124 is in fluidic communication with the vacuum chamber 138 and provides a reading of the pressure within the vacuum chamber 138 to the controller 114, which can control the vacuum pump 122 to adjust the pressure within the vacuum chamber 138. Alternatively, the system 100 can include a separate flow controller that meters in gas, e.g., nitrogen gas, to adjust the pressure. The ion extraction system 104 is discussed in greater detail in connection with FIGS. 3 and 6.

The exemplary analyzer region 106 shown in FIG. 2 can include an IMS housing 144, an ion mobility separation path 146, and an outlet conductance limit orifice plate 148 between the ion mobility separation path 146 and a downstream device, such as a mass spectrometer. The ion mobility separation path 146 includes an inlet region 150, an ion separation path 152, and an outlet region 154. The ion separation path 152 extends from the inlet region 150 to the outlet region 154 and can be serpentine in shape to maximize the length thereof. The inlet region 150 is positioned adjacent the exit port 136 of the vacuum chamber housing 126 and the conductance limit orifice plate 142 so as to receive ions from the SLIM path 128 of the ion extraction system 104 through the conductance limit orifice plate 142. The outlet region 154 is positioned adjacent the outlet conductance limit orifice plate 148 and configured to output ions there through into the downstream device. As described in detail above, it should be understood that the analyzer region 106 could have various other configurations than that shown in FIG. 2, or could be one or more different devices, such as a different IMS device, ion optics, an analytical device, an ion detection device, etc.

As previously noted, the vacuum system 110 is in fluidic communication with the analyzer region 106 and regulates the gas pressure within the analyzer region 106. The vacuum system 110 can include a gas pressure controller 156 and a pressure gauge 158, in addition to the vacuum pump 122 and a pressure gauge 124. The gas pressure controller 156 is connected to a gas, e.g., nitrogen source, and configured to discharge gas into the IMS housing 144 based on a reading of the pressure gauge 158, which monitors the pressure within the IMS housing 144. The pressure gauge 158 can provide the pressure reading directly to the gas pressure controller 156, or to controller 114, which can in turn control the gas pressure controller 156. In some aspects, the gas pressure controller 156 can be a valve that can be manipulated by the controller 114. Additionally, it should be understood that the components of the vacuum system 110, namely, the vacuum pump 122, the pressure gauge 124, the gas pressure controller 156, and the pressure gauge 158, can be controlled in concert and as a singular unit. For example, the pressure within the ion extraction system 104 and the analyzer region 106 can be controlled based on the characteristics of each other and the respective pressures, among other considerations. Accordingly, the vacuum system 110 can be an integrated vacuum system that considers the ion analysis system 100 holistically.

FIG. 3 is a detailed schematic diagram of the ion extraction system 104 of FIGS. 1 and 2. The SLIM path 128 is positioned within the vacuum chamber 138 of the vacuum chamber housing 126 and extends from the entrance port 134 to the exit port 136, which are positioned generally on opposite sides of the vacuum chamber 138. The SLIM path 128 generally includes an inlet region 160, a diverter region 162, and an outlet region 164, which are in sequence. The inlet region 160 is positioned adjacent the capillary 120 with a small space between the end of the capillary 120 and the edge of the inlet region 160. The diverter region 162 is subsequent the inlet region 160 and generally curves toward the vacuum pump port 132, which can be positioned in the middle of the vacuum chamber housing 126, e.g., at a central point between the entrance port 134 and the exit port 136, and can extend perpendicularly from the vacuum chamber housing 126. That is, the central axis of the vacuum pump port 132 can be perpendicular to a line drawn connecting the entrance port 134 and the exit port 136. The outlet region 164 is subsequent the diverter region 162 and extends to the exit port 136 and the inlet conductance limit orifice plate 148 with a small gap between the end of the outlet region 164 and the inlet conductance limit orifice plate 148. Accordingly, the SLIM path 128 has a serpentine configuration with a bend, e.g., the diverter region 162, that bring the SLIM path 128 closer to the vacuum pump port 132 to assist in removal of gas, as discussed in greater detail below. The SLIM path 128 is configured to transport the ions discharged from the capillary 120 to the ion mobility separation path 146 of the analyzer region 106.

The gas diverter 130 includes a body 166 and a curved diverter face 168 that can be concave and semi-circular in shape. The gas diverter 130 is mounted within the vacuum chamber housing 126, and positioned between the capillary 120 and the exit port 136 within an open area 170 created by the bend of the diverter region 162 of the SLIM path 128. Additionally, the gas diverter 130 is positioned in front of the capillary 120 with the curved diverter face 168 directly in the line-of-sight of the capillary 120, e.g., in the discharge trajectory of the capillary 120, and the entrance port 134, e.g., aligned with the entrance port 134. In this regard, the curved diverter face 168 curves from the entrance port 134 toward the vacuum pump port 132 so that the outlet of the curved diverter face 168 is inline or parallel to the central axis of the vacuum pump port 132. That is, a tangent line to the end of the curved diverter face 168 would extend substantially toward the vacuum pump port 132. Accordingly, the gas diverter 130 directs the gas stream/flow discharged by the capillary 120 off axis toward the vacuum pump port 132 and away from the exit port 136, thus preventing the gas stream/flow from traveling through the exit port 136 and into the analyzer region 106.

Figure 4:
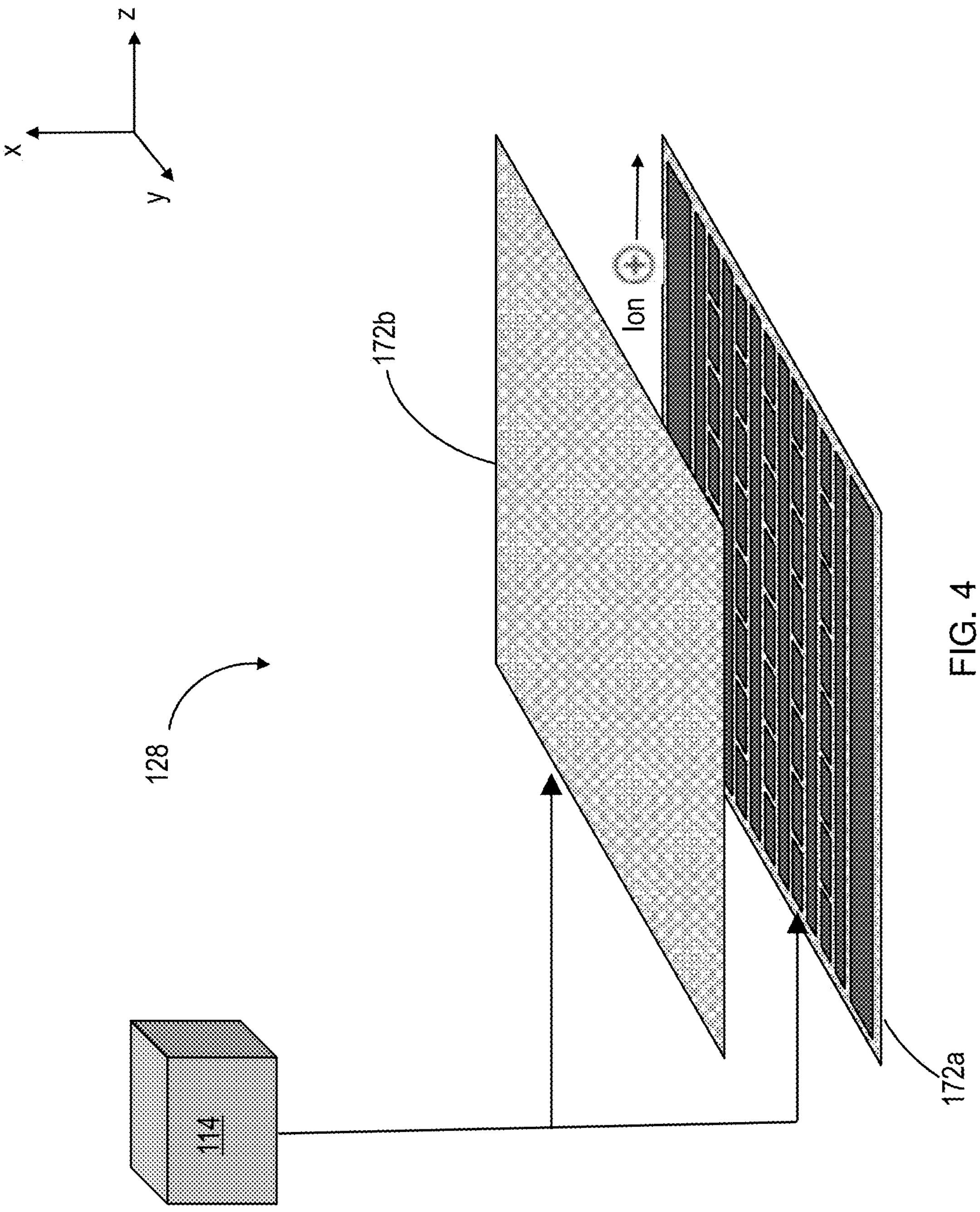
FIG. 4 is a diagrammatic view of a portion of the ion extraction system and the IMS device of the ion mobility separation system of FIGS. 1 and 2.

FIG. 4 is a diagrammatic view of an area A-A of the SLIM path 128 of FIG. 3. The SLIM path 128 can be configured and operated in accordance with the SLIM devices disclosed and described in U.S. Pat. No. 8,835,839 entitled "Method and Apparatus for Ion Mobility Separations Utilizing Alternating Current Waveforms" and U.S. Pat. No. 10,317,364 entitled "Ion Manipulation Device," both of which are incorporated herein by reference in their entirety. However, it should be understood that the SLIM path 128 need not be a SLIM device, but can be any ion manipulation path/device that transfers ions without the use of gas or pressure for ion motion.

In particular, the SLIM path 128 can include a first surface **172*a* and a second surface 172*b*. The first and second surfaces 172*a*, 172*b* can be arranged (e.g., parallel to one another) to define one or more ion channels there between. In this regard, the capillary 120 is configured to discharge the neutral/ion mixed gas stream/flow between the first and second surfaces 172*a*, 172*b*. The first and second surfaces 172*a*, 172*b* can include electrodes 174, 176*a-f*, 178*a-e*, 180*a-h* (see FIG. 5), e.g., arranged as arrays of electrodes on the surfaces facing the ion channel. The electrodes 174**,

176*a-f*, 178*a-e*, 180*a-h* on the first and second surfaces 172*a*, 172*b* can be electrically coupled to the controller 114 and receive voltage (or current) signals or waveforms therefrom. In some implementations, the first surface 172*a* and second surface 172*b* can include a backplane that includes multiple conductive channels that allow for electrical connection between the controller 114 and the electrodes 174, 176*a-f*, 178*a-e*, 180*a-h* on the first surface 172*a* and second surface 172*b*. In some implementations, the number of conductive channels can be fewer than the number of electrodes 174, 176*a-f*, 178*a-e*, 180*a-h*. In other words, multiple electrodes 174, 176*a-f*, 178*a-e*, 180*a-h* can be connected to a single electrical channel. As a result, a given voltage (or current) signal can be transmitted to multiple electrodes 174, 176*a-f*, 178*a-e*, 180*a-h* simultaneously. Based on the received voltage (or current) signals, the electrodes 174, 176*a-f*, 178*a-e*, 180*a-h* can generate one or more potentials (e.g., a superposition of various potentials) that can confine, drive, and/or separate ions along the SLIM path 128.

Figure 5:
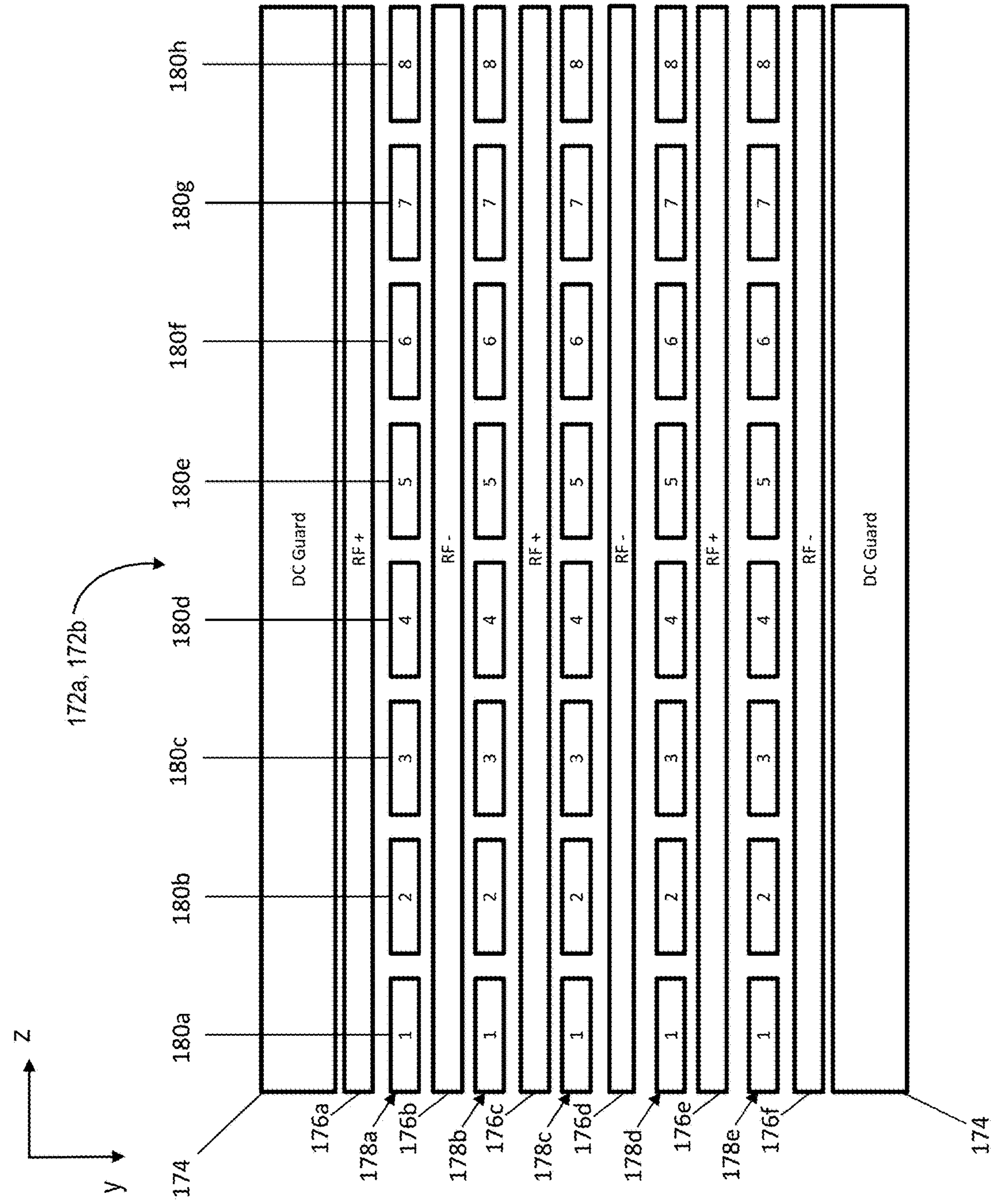
FIG. 5 is a schematic diagram illustrating an exemplary arrangement of electrodes for implementation with the ion extraction system and the IMS device of FIGS. 1 and 2.

FIG. 5 is a schematic diagram of the first and second surfaces 172*a*, 172*b* of the SLIM path 128 illustrating the arrangement of electrodes 174, 176*a-f*, 178*a-e*, 180*a-h* thereon. The first and second surfaces 172*a*, 172*b* can be substantially mirror images relative to a parallel plane, and thus it should be understood that the description of the first surface 172*a* applies equally to the second surface 172*b*, thus the second surface 172*b* can include electrodes with similar electrode arrangement to the first surface 172*a*. As noted, the electrodes 174, 176*a-f*, 178*a-e*, 180*a-h* can be arranged and configured in accordance with U.S. Pat. Nos. 8,835,839 and 10,317,364.

In particular, the first and second surfaces 172*a*, 172*b* can include guard electrodes 174, a plurality of RF electrodes 176*a-f*, and a plurality of segmented electrode arrays 178*a-e*. The guard electrodes 174 can receive a DC voltage from the controller 114, which retains the ions laterally and prevents the ions from exiting the SLIM path 128 through the sides thereof. Each of the plurality of RF electrodes 176*a-f* can receive voltage (or current) signals, or can be connected to ground potential, and can generate a pseudopotential that can prevent or inhibit ions from approaching the first and second surfaces 172*a*, 172*b*. In particular, the RF electrodes 176*a-f* can receive RF signals from the controller 114. The RF voltages applied to the RF electrodes 176*a-f* can be phase shifted with respect to adjacent RF electrodes 176*a-f*, e.g., adjacent RF electrodes 176*a-f* can receive the same RF signal, but phase shifted by 180 degree. The foregoing functionality retains the ions between the first and second surfaces 172*a*, 172*b* and prevents the ions from contacting the first and second surfaces 172*a*, 172*b*. The plurality of RF electrodes 176*a-f* can be separated from each other along a lateral direction, which can be perpendicular to the direction of propagation.

Each of the plurality of segmented electrode arrays 178*a-e* can be placed between two RF electrodes 176*a-f*, and includes a plurality of individual electrodes 180*a-h*, e.g., eight electrodes, sixteen electrodes, twenty-four electrodes, etc., that are arranged along a direction of ion motion. The plurality of RF electrodes 176*a-f* and the plurality of segmented electrode arrays 178*a-e* can be arranged in alternating fashion on the first and second surfaces 172*a*, 172*b* between the DC guard electrodes 174.

The plurality of segmented electrode arrays 178*a-e* can receive a second voltage signal and generate a drive potential that can drive/transmit ions along the central axis of the SLIM path 128. In particular, the segmented electrodes 178*a-e* can be traveling wave (TW) electrodes such that each of the individual electrodes 180*a-h* of each segmented electrode array 178*a-e* receives a voltage signal that is simultaneously applied to all individual electrodes 180*a-h*, but phase shifted between adjacent electrodes 180*a-h* along the z-axis. The voltage signal applied to the individual electrodes 180*a-h* can be a sinusoidal waveform (e.g., an AC voltage waveform), a rectangular waveform, a DC square waveform, a sawtooth waveform, a biased sinusoidal waveform, a pulsed current waveform, etc., and the amplitude of the signal provided to the individual electrodes 180*a-h* can be determined based on the voltage waveform applied, e.g., in view of the phase shifting referenced above. Accordingly, the segmented electrodes 178*a-e* are configured to transmit the received ions along the SLIM path 128.

Accordingly, the SLIM path 128 functions as a conduit for the ions as the electrode configuration creates an ion trap that retains the ions along its length. More specifically and as previously described in detail, the RF electrodes 176*a-f* on the first and second surfaces 172*a*, 172*b* retain the ions between the first and second surfaces 172*a*, 172*b*, e.g., along the x-axis shown in FIG. 4, while the DC guard electrodes 174 retain the ions laterally, e.g., along the y-axis shown in FIGS. 4 and 5, and prevent the ions from exiting the SLIM path 128 through the sides thereof. Thus, the ions are permitted to travel only along the length of the SLIM path 128, e.g., along the z-axis shown in FIGS. 4 and 5, in accordance with the travelling wave applied to the individual electrodes 180*a-h* of each segmented electrode array 178*a-e*, which propels the ions along the SLIM path 128 toward the exit port 136.

Figure 9:
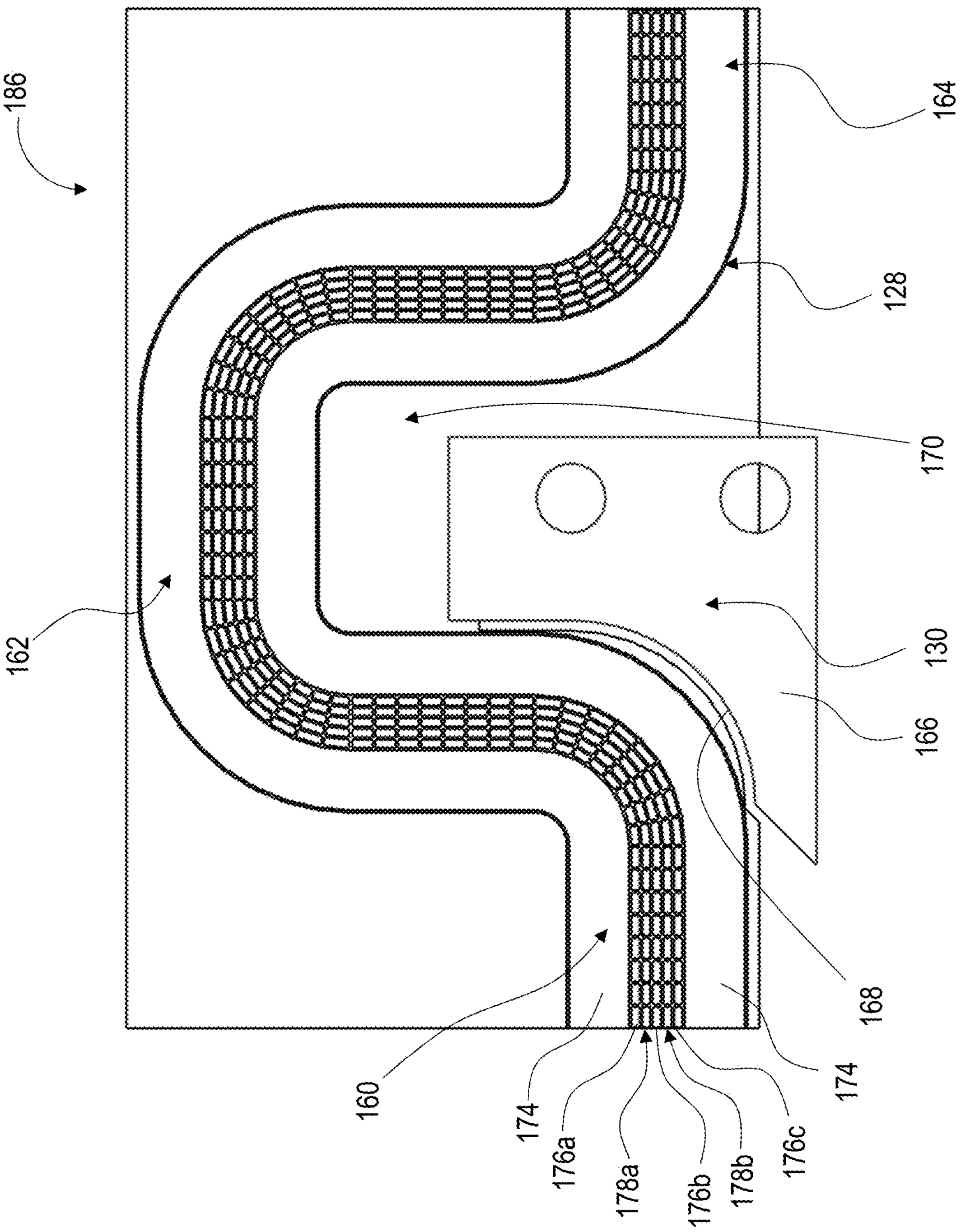
FIG. 9 is a sectional view of the exemplary ion extraction apparatus taken along line 9-9 of FIG. 8.
Figure 10:
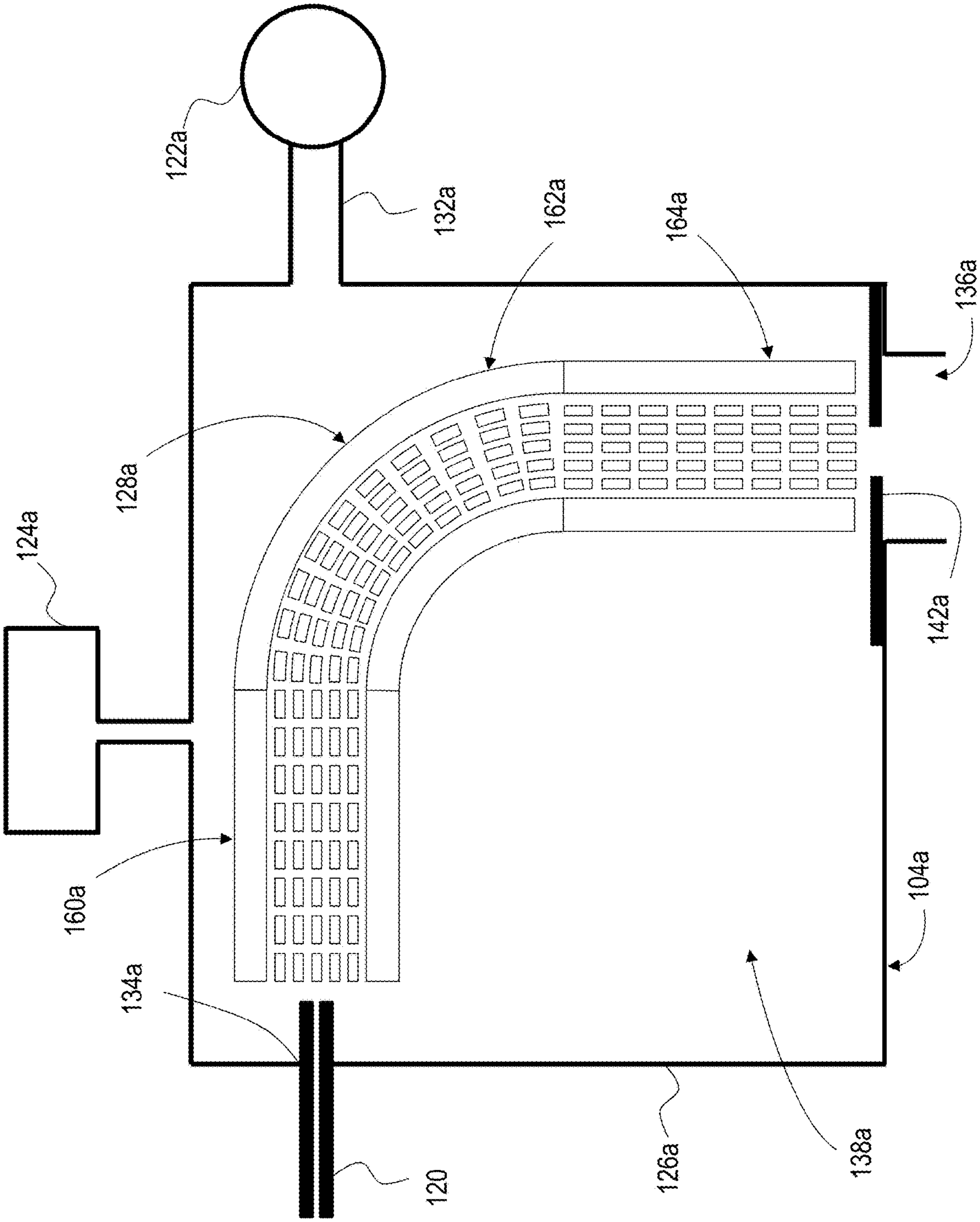
FIG. 10 is a detailed schematic diagram of a second ion extraction system of the present disclosure.
Figure 11:
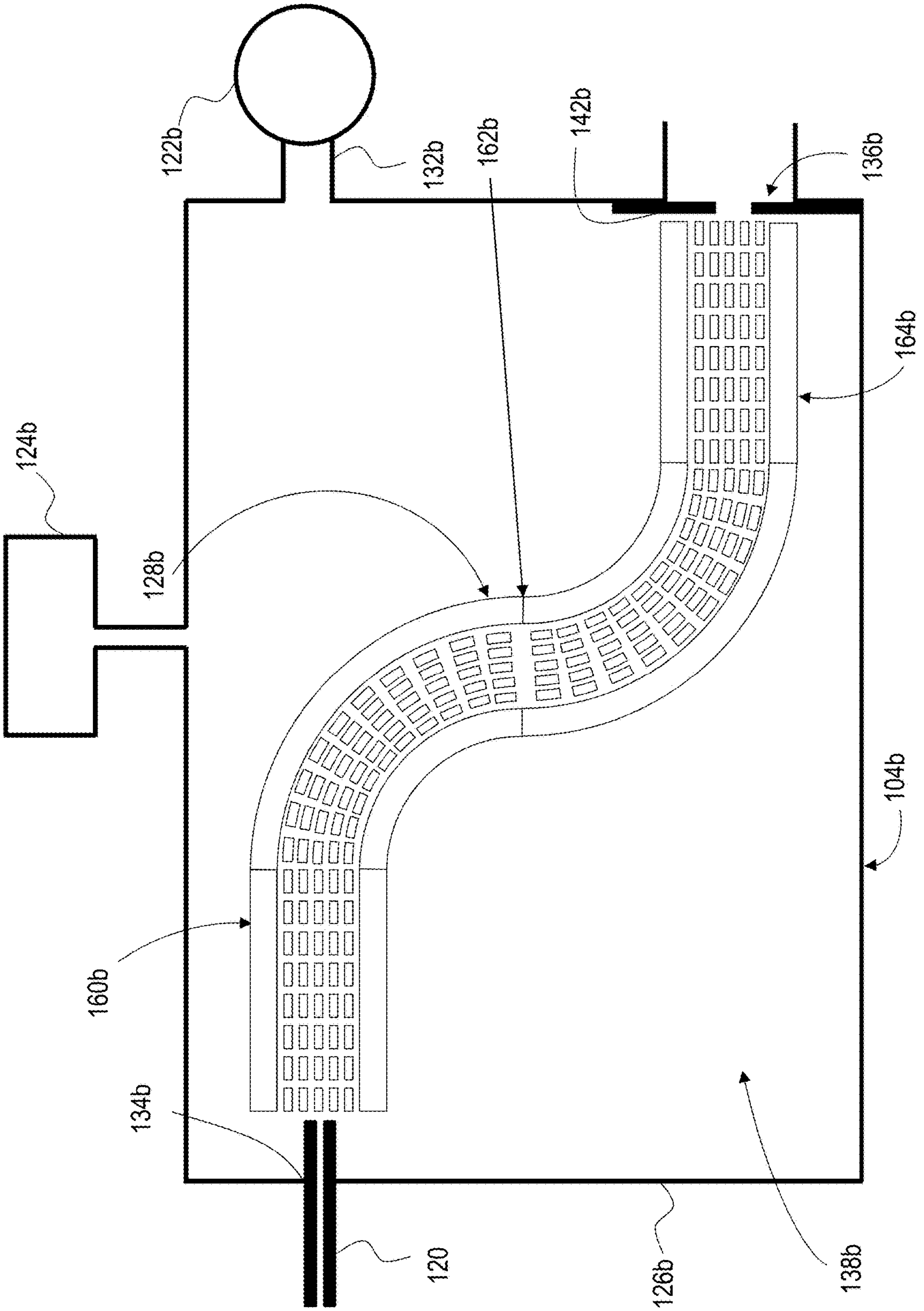
FIG. 11 is a detailed schematic diagram of a third ion extraction system of the present disclosure.

Moreover, the arrangement of electrodes 174, 176*a-f*, 178*a-e*, 180*a-h* of the SLIM path 128 allows for flexibility in design of the SLIM path 128. For example, since the RF electrodes 176*a-f* retain the ions between the first and second surfaces 172*a*, 172*b* and the DC guard electrodes 174 retain the ions laterally, the SLIM path 128 can be designed with a non-linear configuration, such as that shown in FIGS. 2 and 3, be either curving the electrode arrangement, as shown in FIGS. 9-11, or by orienting different segments of the SLIM path 128 at an angle with respect to one another, e.g., at right angles. Thus, the SLIM path 128 can be designed to go around the gas diverter 130 or transmit ions in a direction that is different than the discharge trajectory of the capillary 120 in order to extract the ions from the discharged gas.

Figure 6:
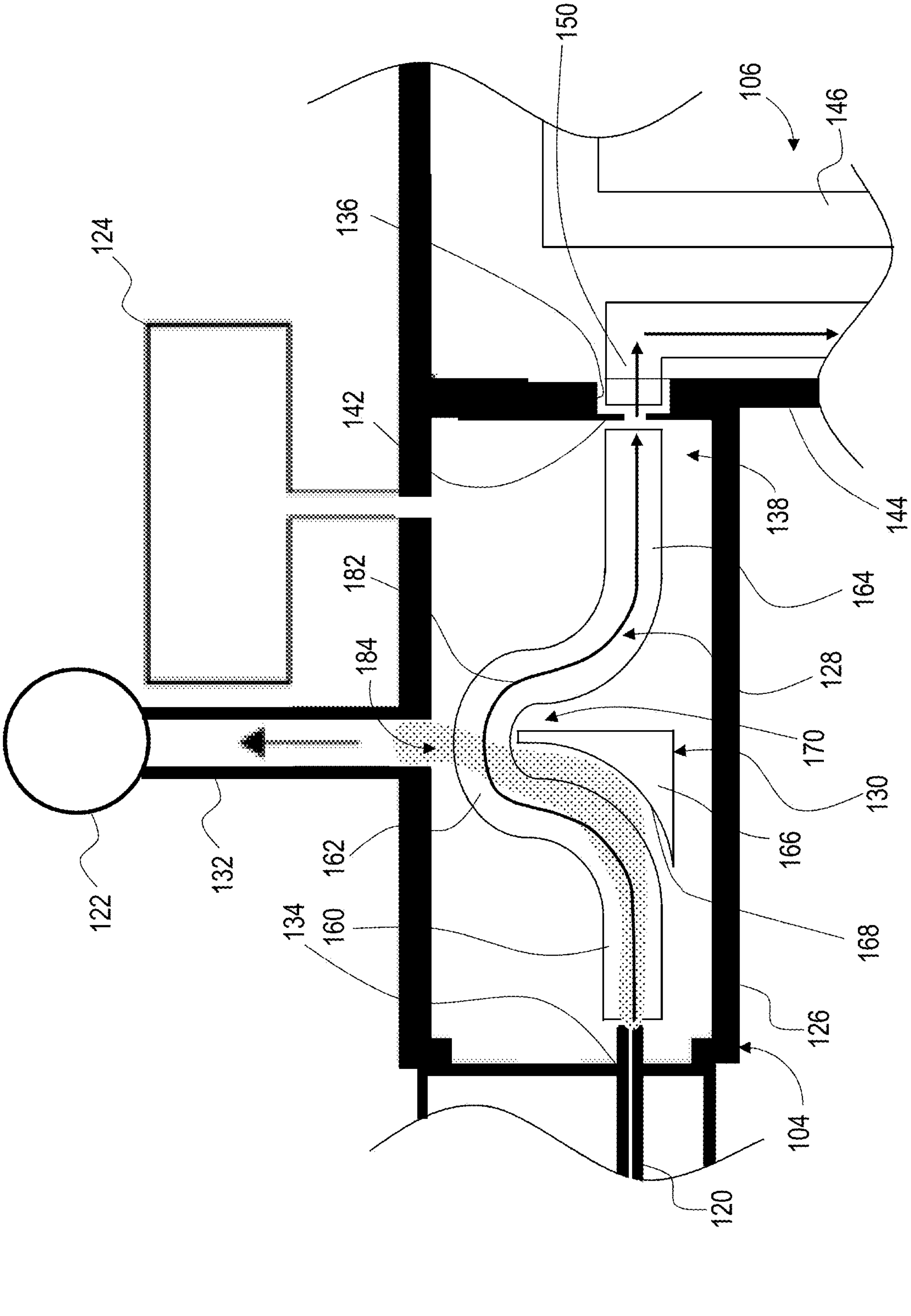
FIG. 6 is a detailed schematic diagram of the ion extraction system of FIG. 3 showing an exemplary flow path of ions and exemplary flow path of gas.

FIG. 6 is a detailed schematic diagram of the ion extraction system 104 of FIG. 5 showing an exemplary flow path of ions 182 and an exemplary flow path of gas 184 within the ion extraction system 104. During operation, the capillary 120 discharges a gas jet/flow into the SLIM path 128, e.g., between the first and second surfaces 172*a*, 172*b* and between the guard electrodes 174 (see FIGS. 4 and 5). The gas jet/flow is a mixture of ions 182 and high pressure gas 184.

As shown in FIG. 6, during operation, the ions 182 of the mixture are retained within the SLIM path 128, transferred along the SLIM path 128 to the exit port 136, and passed through the conductance limit orifice plate 142 and into the ion mobility separation path 146 of the analyzer region 106 where they can undergo ion mobility separation. In particular, voltage applied to the guard electrodes 174 (see FIG. 5) of the SLIM path 128 retains the ions 182 laterally within the SLIM path 128, the RF voltage applied to the RF electrodes 176*a-f* retains the ions 182 between the first and second surfaces 172*a*, 172*b*, and the electrical signal applied to the plurality of segmented electrode arrays 178*a-e* transmits the ions 182 along the SLIM path 128.

However, the gas 184 of the gas jet/flow is not influenced by the electrical signals of the guard electrodes 174, the RF electrodes 176*a-f*, or the plurality of segmented electrode arrays 178*a-e*. Accordingly, the gas flow 184 contacts the gas diverter 130, e.g., the curved diverter face 168, and is diverted off of the original trajectory and directed toward the vacuum pump port 132. Additionally, the vacuum pump 122 creates a suction effect at the vacuum pump port 132, which draws the gas flow 184 toward the vacuum pump port 132 and suctions the gas flow 184 out from the vacuum chamber housing 126 through the vacuum pump port 132, thus removing the gas from the vacuum chamber housing 126 and preventing the gas from entering the analyzer region 106 and preventing contamination of the analyzer region 106. Additionally, the analyzer 106 can be maintained at a greater pressure than the vacuum chamber housing 126 to assist with preventing gas from entering the analyzer region 106 and control contamination thereof.

Accordingly, the ion extraction system 104 extracts the ions from the gas jet/flow by diverting the gas into the vacuum pump port 132 and guiding the ions away from gas using the SLIM path 128. The SLIM path 128 further transmits the extracted ions to the analyzer region 106.

It should be understood that the waveforms applied to the electrodes 174, 176*a-f*, 178*a-e*, 180*a-h* of the SLIM path 128 can be adjusted based on the velocity and pressure of the gas jet/flow, as well as the pressure generated by the vacuum pump 122. For example, the DC voltage applied to the guard electrodes 174 can be increased in the diverter region 162 of the SLIM path 128 in order to ensure that the ions are retained on the SLIM path 128 and not pushed off of the SLIM path 128 by the gas. It is also contemplated by the present disclosure that the gas diverter 130, entrance port 134, exit port 136, and vacuum port 132 could be provided in a different form, position, configuration, arrangement, or size, so long as the ion extraction system 104 sufficiently directs the gas flow away from the exit port 136 and toward the vacuum pump port 132, and extracts the ions. Exemplary alternative configurations contemplated by the present disclosure are shown and described in connection with FIGS. 10-12.

Figure 7:
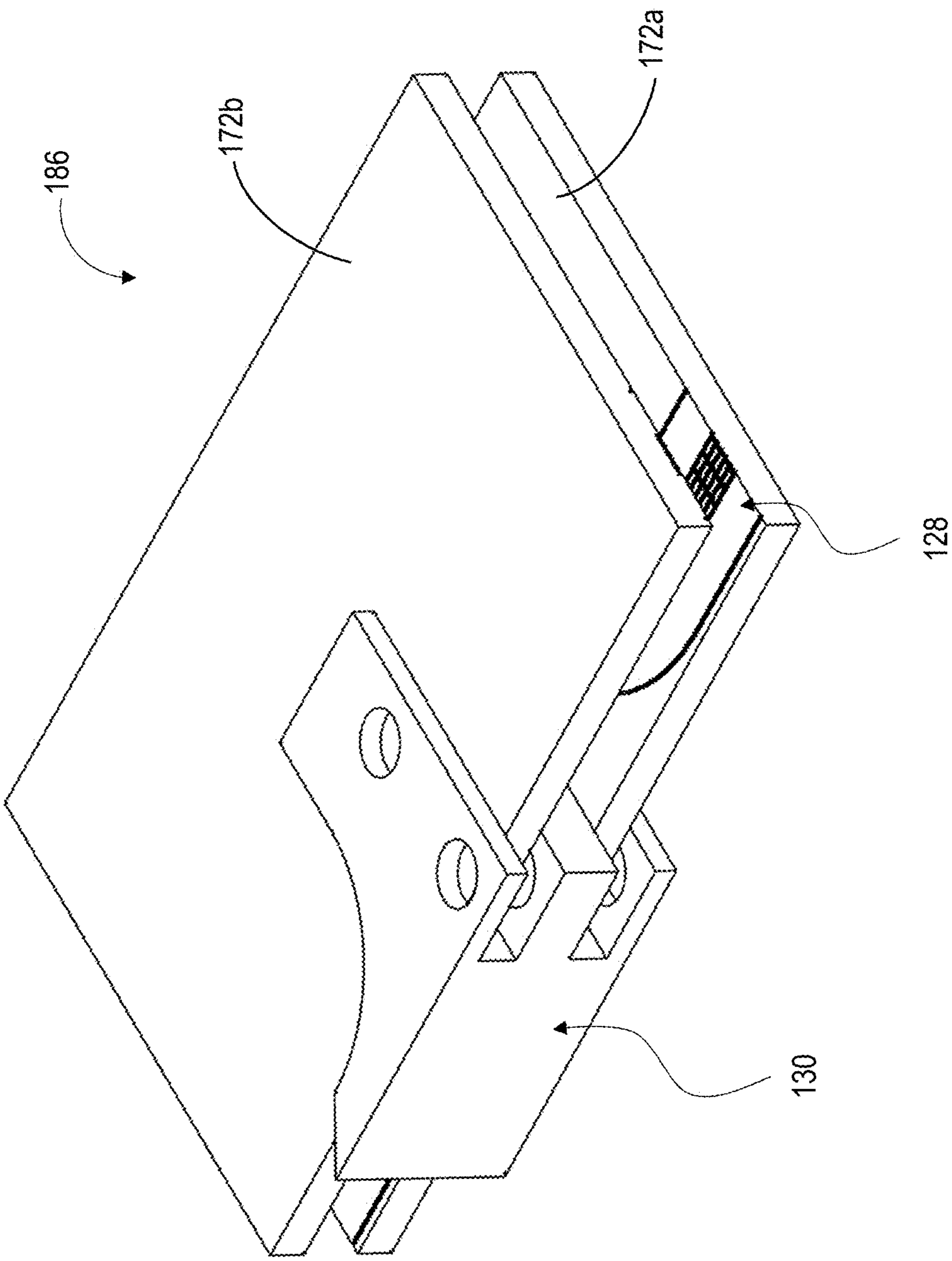
FIG. 7 is a perspective view of an exemplary ion extraction apparatus for use with the ion extraction system of the present disclosure.
Figure 8:
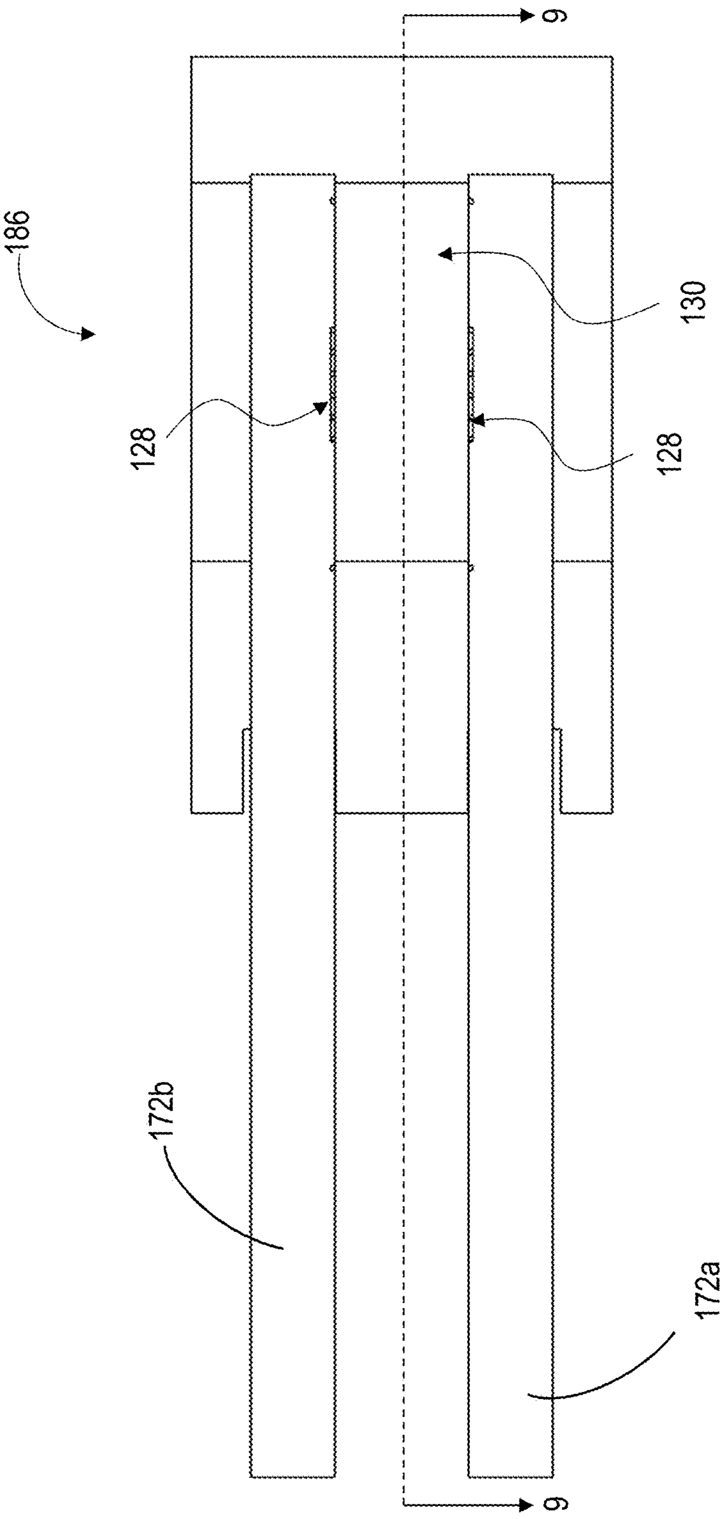
FIG. 8 is a side elevational view of the exemplary ion extraction apparatus of FIG. 7.

FIGS. 7-9 illustrate an exemplary ion extraction apparatus 186 of the present disclosure that can be implemented in the ion extraction system 104. FIG. 7 is a perspective view of the exemplary ion extraction apparatus 186, FIG. 8 is a side elevational view of the exemplary ion extraction apparatus 186, and FIG. 9 is a sectional view of the exemplary ion extraction apparatus 186 taken along line 9-9 of FIG. 8. As can be seen in FIGS. 7-9, the ion extraction apparatus 186 can include the first and second surfaces 172*a*, 172*b*, which can be printed circuit boards, and the gas diverter 130. The first and second surfaces 172, 172*b* can contain the SLIM path 128 which includes electrodes 174, 176*a-c*, 178*a-b*, as discussed in connection with FIGS. 4 and 5, which trap and transfer the ions there along. In particular, the SLIM path 128 of the ion extraction apparatus 186 of FIGS. 7-9 includes only three rows of RF electrodes 176*a-c* (instead of six as shown in the configuration of FIG. 5) and two rows of segmented electrodes 178*a-b* (instead of five as shown in the configuration of FIG. 5). Additionally, the RF electrodes 176*a-c* of FIGS. 7-9 are segmented instead of continuous, but nonetheless function as described in connection with FIGS. 4 and 5.

FIG. 10 is a detailed schematic diagram of a second ion extraction system 104*a* of the present disclosure. The second ion extraction system 104*a* is similar in operation to the ion extraction system 104 shown and described in connection with FIGS. 2 and 3, but includes an alternative configuration. Similar to the ion extraction system 104 shown and described in connection with FIGS. 2 and 3, the second ion extraction system 104*a* includes a vacuum chamber housing 126*a* and an ion manipulation path 128*a* (e.g., a SLIM path). The vacuum chamber housing 126*a* includes a vacuum pump port 132*a*, an entrance port 134*a*, and an exit port 136*a*, and forms a vacuum chamber 138*a* in which the SLIM path 128*a* is positioned. The SLIM path 128*a* can have the same electrode configuration as that shown and described in connection with FIGS. 4, 5, and 8. The vacuum pump port 132*a* extends from the vacuum chamber housing 126*a* to a vacuum pump 122*a*, placing the vacuum pump 122*a* in fluidic communication with the vacuum chamber 138*a*. The ion extraction system 104*a* can also include a pressure gauge 124*a* that is in fluidic communication with the vacuum chamber 138*a*, and provides a reading of the pressure within the vacuum chamber 138*a* to the controller 114, which can control a vacuum pump 122*a* to adjust the pressure within the vacuum chamber 138*a*. Alternatively, as mentioned previously, the pressure within the vacuum chamber 138*a* can be controlled by a separate flow controller that meters in gas, e.g., nitrogen gas.

However, contrary to the ion extraction system 104 shown and described in connection with FIGS. 2 and 3, the second ion extraction system 104*a* does not include a gas diverter 130 to redirect the flow of gas. Instead, the vacuum pump port 132*a* is positioned directly opposite the entrance port 134*a* such that it is aligned therewith, and the SLIM path 128*a* curves 90 degrees toward the exit port 136*a*.

More specifically, the SLIM path 128*a* generally extends from the entrance port 134*a* to the exit port 136*a*, which can be positioned in orthogonal walls of the vacuum chamber housing 126*a*. The SLIM path 128*a* includes an inlet region 160*a*, an ion diverter region 162*a* (e.g., a curved region), and an outlet region 164*a*. The inlet region 160*a* is positioned adjacent the capillary 120, which extends through the entrance port 134*a*. The ion diverter region 162*a* is subsequent the inlet region 160*a* and generally curves or turns 90 degrees toward the exit port 136*a*, which can extend perpendicularly from the vacuum chamber housing 126*a*, is configured to be coupled to the analyzer region 106, and can have a conductance limit orifice plate 142*a* positioned adjacent thereto. That is, the central axis of the exit port 136*a* can be perpendicular to a line drawn connecting the entrance port 134*a* and the vacuum pump port 132*a*. The outlet region 164*a* is subsequent the ion diverter region 162*a*, and extends to the exit port 136*a* and the conductance limit orifice plate 148*a*. The outlet region 164*a* can extend perpendicularly to the inlet region 160*a*. As such, the SLIM path 128*a* has a curved configuration with a bend, e.g., the ion diverter region 162*a*, that extracts the ions from the gas stream/flow and causes the ions to travel perpendicular to the original direction of travel and in a direction different than the gas stream/flow. The SLIM path 128*a* is configured to transport the ions discharged from the capillary 120 to the analyzer region 106.

Additionally, it should be understood that the SLIM path 128*a* need not include the ion diverter region 162*a*, but instead the inlet region 160*a* and the outlet region 164*a* can directly intersect at a right angle such that they are positioned orthogonally. In this configuration, the ions would travel to the end of the inlet region 160*a* and turn 90 degrees at the interface with the outlet region 164*a*, at which point they would enter the outlet region 164*a* and be transferred to the exit port 136*a*. Thus, the outlet region 164*a* functions as an ion diverter as it diverts and extracts the ions from the gas flow.

Furthermore, it should be understood that the ion diverter region 162*a* can have a turn angle less than or greater than 90 degrees if desired. For example, it may be advantageous for the ion diverter region 162*a* to turn less than 90 degrees, e.g., 30 or 45 degrees, to avoid a stronger cross-flow force from the gas flow, which can assist with the diversion and extraction of ions from the gas flow. The ion diverter region 162*a* can also include a series of smaller incremental turns, if desired. Similarly, where the ion diverter region 162*a* is omitted, and the outlet region 164*a* intersects directly with the inlet region 160*a*, such intersection can be at an angle less than or greater than 90 degrees.

Accordingly, in view of the foregoing, the second ion extraction system 104*a* utilizes the ion manipulation path 128*a* to trap, transfer, and extract the ions from the gas stream/flow, and a vacuum pump 122*a* to extract the gas through the vacuum pump port 132*a* so that the gas does not reach the exit port 136*a*. Additionally, due to the configuration of the entrance port 134*a* and the vacuum pump port 132*a*, the gas stream/flow generally flows toward the vacuum pump port 132*a*, thus eliminating the need for a gas diverter.

FIG. 11 is a detailed schematic diagram of a third ion extraction system 104*b* of the present disclosure. The third ion extraction system 104*b* is similar in operation to the ion extraction system 104 shown and described in connection with FIGS. 2 and 3, and the second ion extraction system 104*a* shown and described in connection with FIG. 10, but includes another alternative configuration. Similar to the ion extraction system 104 and the second ion extraction system 104*a*, the third ion extraction system 104*b* includes a vacuum chamber housing 126*b* and an ion manipulation path 128*b* (e.g., a SLIM path). The vacuum chamber housing 126*b* includes a vacuum pump port 132*b*, an entrance port 134*b*, and an exit port 136*b*, and forms a vacuum chamber 138*b* in which the SLIM path 128*b* is positioned. The SLIM path 128*b* can have the same electrode configuration as that shown and described in connection with FIGS. 4, 5, and 8. The vacuum pump port 132*b* extends from the vacuum chamber housing 126*b* to a vacuum pump 122*b*, placing the vacuum pump 122*b* in fluidic communication with the vacuum chamber 138*b*. The ion extraction system 104*b* can also include a pressure gauge 124*b* that is in fluidic communication with the vacuum chamber 138*b*, and provides a reading of the pressure within the vacuum chamber 138*b* to the controller 114, which can control a vacuum pump 122*b* to adjust the pressure within the vacuum chamber 138*b*. Alternatively, as mentioned previously, the pressure within the vacuum chamber 138*b* can be controlled by a separate flow controller that meters in gas, e.g., nitrogen gas.

However, contrary to the ion extraction system 104 shown and described in connection with FIGS. 2 and 3, the third ion extraction system 104*b* does not include a gas diverter 130 to redirect the flow of gas. Instead, the vacuum pump port 132*b* is positioned directly opposite the entrance port 134*b* such that it is aligned therewith, and the SLIM path 128*b* make two 90 degrees turns toward the exit port 136*b*. This is similar to the SLIM path 128*a* of the second ion extraction system 104*a*, but instead of a single 90 degree turn, the SLIM path 128*b* makes two 90 degree turns so that the exit port 136*b* is positioned in the same wall of the vacuum chamber housing 126*b* as the vacuum pump port 132*b*. Thus, the SLIM path 128*b* has a serpentine shape.

More specifically, the SLIM path 128*b* generally extends from the entrance port 134*b* to the exit port 136*b*, which can be positioned in opposite walls of the vacuum chamber housing 126*b*. The SLIM path 128*b* includes an inlet region 160*b*, an ion diverter region 162*b* (e.g., a curved/serpentine region), and an outlet region 164*b*. The inlet region 160*b* is positioned adjacent the capillary 120, which extends through the entrance port 134*b*. The ion diverter region 162*b* is subsequent the inlet region 160*b* and makes two counter-acting 90 degree curves or turns toward the exit port 136*b*, which can extend perpendicularly from the vacuum chamber housing 126*b*, is configured to be coupled to the analyzer region 106, and can have a conductance limit orifice plate 142*b* positioned adjacent thereto. That is, the central axis of the exit port 136*b* can be parallel to a line drawn connecting the entrance port 134*b* and the vacuum pump port 132*b*. The outlet region 164*b* is subsequent the ion diverter region 162*b*, and extends to the exit port 136*b* and the conductance limit orifice plate 148*b*. The outlet region 164*b* can extend parallel to the inlet region 160*b*, but is laterally offset therefrom, e.g., due to the ion diverter region 162*b*. As such, the SLIM path 128*b* has a curved/serpentine configuration with a bend, e.g., the ion diverter region 162*b*, that extracts the ions from the gas stream/flow and causes the ions to travel first in a direction different than the gas stream/flow and then parallel to the original direction of travel but separate from the gas stream/flow. The SLIM path 128*b* is configured to transport the ions discharged from the capillary 120 to the analyzer region 106.

Additionally, it should be understood that instead of having a curved design, the ion diverter region 162*b* of the SLIM path 128*b* could be a straight section that is positioned at a right angle with respect to the inlet region 160*b* and/or the outlet region 164*b*, e.g., the ion diverter region 162*b* can directly intersect the inlet region 160*b* and/or the outlet region 164*b* at a right angle such that they are positioned orthogonally. In this configuration, the ions would travel to the end of the inlet region 160*b*, turn 90 degrees at the interface with the ion diverter region 164*b*, enter the ion diverter region 164*b*, travel to the end of the ion diverter region 164*b*, and turn 90 degrees at the interface with the outlet region 164*b*, at which point they would enter the outlet region 164*b* and be transferred to the exit port 136*b*.

Furthermore, it should be understood that the ion diverter region 162*b* can have turn angles less than or greater than the two 90 degree turns noted above, if desired. For example, it may be advantageous for the ion diverter region 162*b* to have turn angles less than 90 degrees, e.g., 30 or 45 degrees, to avoid a stronger cross-flow force from the gas flow, which can assist with the diversion and extraction of ions from the gas flow. The ion diverter region 162*b* can also include a series of smaller incremental turns if desired. Similarly, where the ion diverter region 162*a* is a straight section that directly intersects with the inlet region 160*b* and/or the outlet region 164*b* at an angle, such intersections can be at an angle less than or greater than 90 degrees.

Accordingly, the third ion extraction system 104*b* utilizes the ion manipulation path 128*b* to trap, transfer, and extract the ions from the gas stream/flow, and a vacuum pump 122*b* to extract the gas through the vacuum pump port 132*b* so that the gas does not reach the exit port 136*b*. Additionally, due to the configuration of the entrance port 134*b* and the vacuum pump port 132*b*, the gas stream/flow generally flows toward the vacuum pump port 132*b*, thus eliminating the need for a gas diverter.

Figure 12:
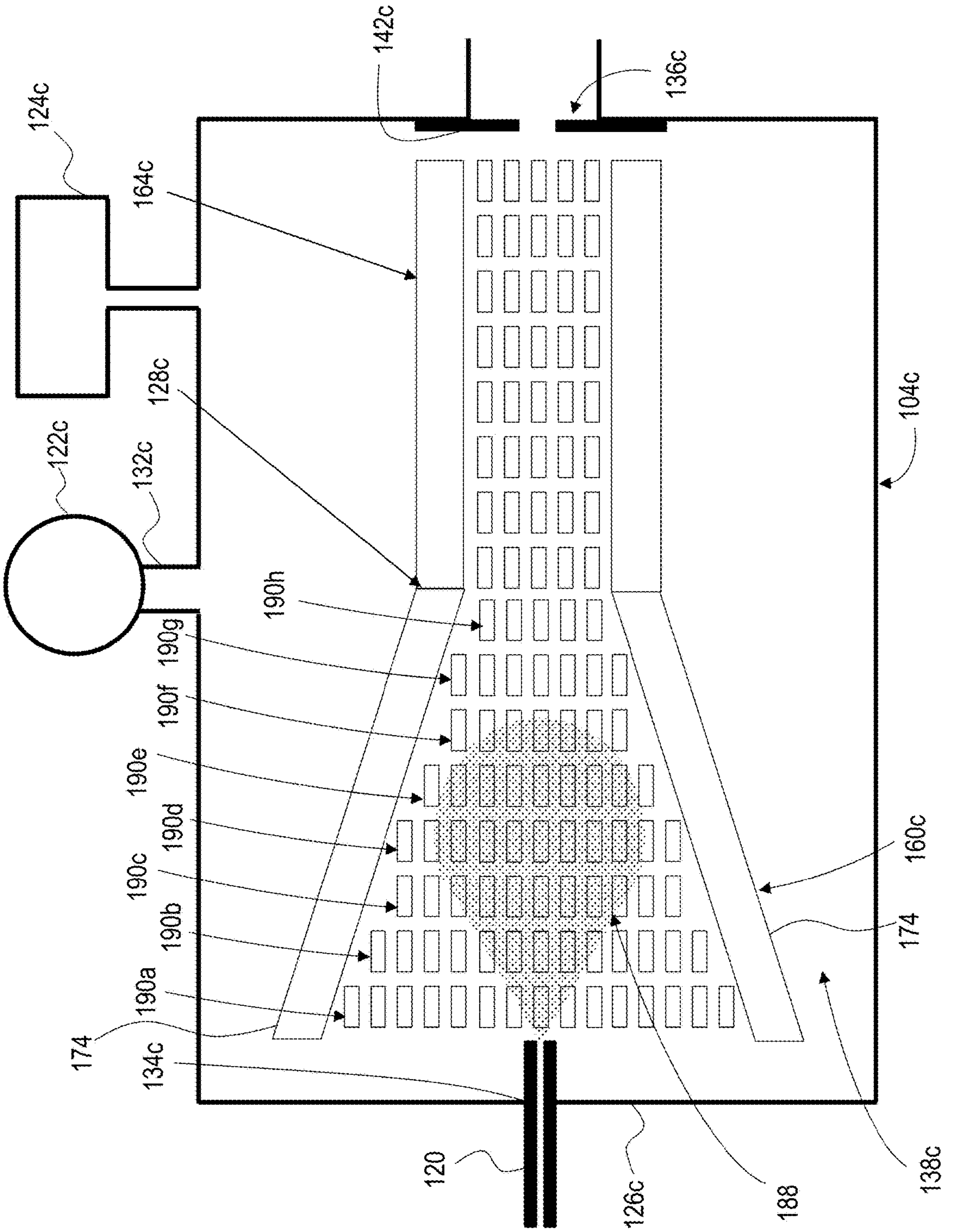
FIG. 12 is a detailed schematic diagram of a fourth ion extraction system of the present disclosure.

FIG. 12 is a detailed schematic diagram of a fourth ion extraction system 104*c* of the present disclosure. The fourth ion extraction system 104*c* includes a vacuum chamber housing 126*c* and an ion manipulation path 128*c* (e.g., a SLIM path). The vacuum chamber housing 126*c* includes a vacuum pump port 132*c*, an entrance port 134*c*, and an exit port 136*c*, and forms a vacuum chamber 138*c* in which the SLIM path 128*c* is positioned. The SLIM path 128*c* can have the same electrode configuration as that shown and described in connection with FIGS. 4, 5, and 8. The vacuum pump port 132*c* extends from the vacuum chamber housing 126*c* to a vacuum pump 122*c*, placing the vacuum pump 122*c* in fluidic communication with the vacuum chamber 138*c*. The ion extraction system 104*c* can also include a pressure gauge 124*c* that is in fluidic communication with the vacuum chamber 138*c*, and provides a reading of the pressure within the vacuum chamber 138*c* to the controller 114, which can control a vacuum pump 122*c* to adjust the pressure within the vacuum chamber 138*c*.

However, contrary to the ion extraction system 104 shown and described in connection with FIGS. 2 and 3, the fourth ion extraction system 104*c* does not include a gas diverter 130 to redirect the flow of gas. Instead, the fourth ion extraction system 104*c* utilizes a flat SLIM funnel inlet region 160*c*, which can have a tapered design, to capture and focus ions from a gas jet/flow 188 that is discharged from the capillary 120 while permitting the gas jet/flow 188 to expand and dissipate reducing drag forces on the ions.

More specifically, the SLIM path 128*c* generally extends from the entrance port 134*c* to the exit port 136*c*, which can be positioned in opposite walls of the vacuum chamber housing 126*c*. The SLIM path 128*c* includes the flat SLIM funnel inlet region 160*c* and an outlet region 164*c*. The flat SLIM funnel inlet region 160*c* is positioned adjacent the capillary 120, which extends through the entrance port 134*c*, and includes a funnel shape with the number of rows of electrodes decreasing along a length thereof. As one example, a first column of electrodes 190*a* closest to the capillary 120 can include fifteen rows of electrodes that alternate between RF electrodes and travelling wave electrodes, a second column of electrodes 190*b* can include thirteen rows of electrodes that similarly alternate, a third column of electrodes 190*c* can include eleven rows of electrodes that similarly alternate, a fourth column of electrodes 190*d* can include eleven rows of electrodes that similarly alternate, a fifth column of electrodes 190*e* can include nine rows of electrodes that similarly alternate, a sixth column of electrodes 190*f* can include seven rows of electrodes that similarly alternate, a seventh column of electrodes 190*g* can include seven rows of electrodes that similarly alternate, and an eighth column of electrodes 190*h* can include five rows of electrodes that similarly alternate and correspond with the five rows of electrodes of the outlet region 164*c*. Additionally, the DC guard electrodes 174 of the flat SLIM funnel inlet region 160*c* can be angled to follow the reduction in electrode rows and form the funnel shape. The outlet region 164*c* is subsequent the flat SLIM funnel inlet region 160*c*, and extends to the exit port 136*c* and the conductance limit orifice plate 148*c*. The SLIM path 128*c* is configured to transport the ions discharged from the capillary 120 to the analyzer region 106.

In view of this configuration, and because the SLIM path 128*c* is provided on spaced apart first and second surfaces 172*a*, 172*b* having open lateral sides, the gas jet/flow 188 is permitted to expand as it discharges into the flat SLIM funnel inlet region 160*c*, and laterally exit the SLIM path 128*c*. That is, the gas jet/flow 188 expands, which causes it to lose velocity and dissipate, and is extracted by the vacuum pump 122*c* through the vacuum pump port 132*c* so that the gas does not reach the exit port 136*c*. Additionally, this configuration permits the exit port 136*c* to be positioned opposite to and aligned with the entrance port 134*c*

Accordingly, the fourth ion extraction system 104*c* utilizes the flat SLIM funnel inlet region 160*c* of the ion manipulation path 128*c* to focus, capture, and extract the ions from the gas jet/flow 188 while permitting the gas jet/flow to expand 188, and a vacuum pump 122*c* to extract the gas through the vacuum pump port 132*c* so that the gas does not reach the exit port 136*c*.

It is also contemplated by the present disclosure that the ion extraction systems 104, 104*a-c* are modular components that can be swapped in or out for existing/conventional systems while retaining the mechanical and electrical components of the associated ion optics, e.g., IMS device, mass spectrometer, etc., or other related components. Additionally, the ion extraction systems 104, 104*a-c* of the present disclosure can be combined with each other in order to further enhance their performance.

The foregoing configuration, e.g., utilization of a gas diverter 130 and/or SLIM technology for the SLIM paths 128, 128*a-c*, provides for an ion extraction system that can be smaller in size, cheaper to manufacture, easier to assembly, and easier to clean than conventional inlet ion optics such as ion funnels. Thus, the present disclosure allows for the replacement of complex assemblies with a much simpler assembly. For example, a prior art ion funnel that requires over one hundred etched metal electrodes to be soldered into an assembly of multiple printed circuit boards, a process that can take hours to complete, can be replaced with an ion extraction system 104, 104*a-c* of the present disclosure that in some instances requires only two circuit boards, spacers, and an optional gas diverter. Moreover, this allows for multiple prototypes to be built and tested quickly and inexpensively.

Additionally, the ion extraction systems 104, 104*a-c* are a more robust alternative to capillary-ion optics interfaces of existing instruments, and can be quicker to assemble and easier to interface with additional ion optics equipment, such as IMS systems, commercial mass spectrometers, etc. Moreover, the ion extraction system 104 is easier to optimize through computational simulations than some other systems, which reduces the design time needed and allows for more accurate simulations and designs to be realized. The foregoing benefits also allow for faster prototyping.

Figure 13:
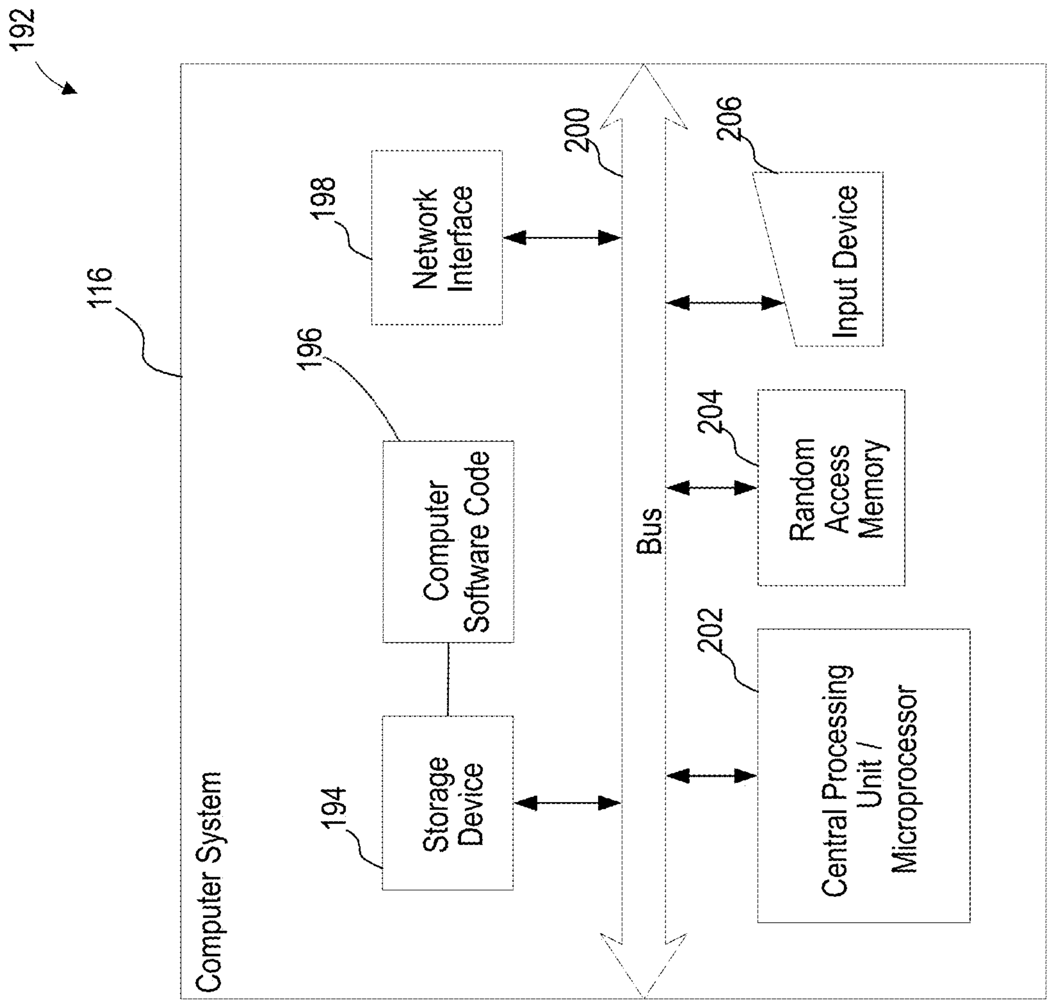
FIG. 13 is a diagram illustrating hardware and software components capable of being utilized to implement embodiments of the system of the present disclosure.

FIG. 13 is a diagram 192 showing hardware and software components of the computer system 116 on which aspects of the present disclosure can be implemented. The computer system 116 can include a storage device 194, computer software code 196, a network interface 198, a communications bus 200, a central processing unit (CPU) (microprocessor) 202, random access memory (RAM) 204, and one or more input devices 206, such as a keyboard, mouse, etc. It is noted that the CPU 202 could also include, or be configured as, one or more graphics processing units (GPUs). The computer system 116 could also include a display (e.g., liquid crystal display (LCD), cathode ray tube (CRT), and the like). The storage device 194 could comprise any suitable computer-readable storage medium, such as a disk, non-volatile memory (e.g., read-only memory (ROM), erasable programmable ROM (EPROM), electrically-erasable programmable ROM (EEPROM), flash memory, field-programmable gate array (FPGA), and the like). The computer system 116 could be a networked computer system, a personal computer, a server, a smart phone, tablet computer, etc.

The functionality provided by the present disclosure could be provided by the computer software code 196, which each could be embodied as computer-readable program code (e.g., algorithm) stored on the storage device 194 and executed by the computer system 116 using any suitable, high or low level computing language, such as Python, Java, C, C++, C#, .NET, MATLAB, etc. A network interface 198 could include an Ethernet network interface device, a wireless network interface device, or any other suitable device which permits the computer system 116 to communicate via a network. The CPU 202 could include any suitable single-core or multiple-core microprocessor of any suitable architecture that is capable of implementing and running the computer software code 196 (e.g., Intel processor). The random access memory 204 could include any suitable, high-speed, random access memory typical of most modern computers, such as dynamic RAM (DRAM), etc.

Figure 14:
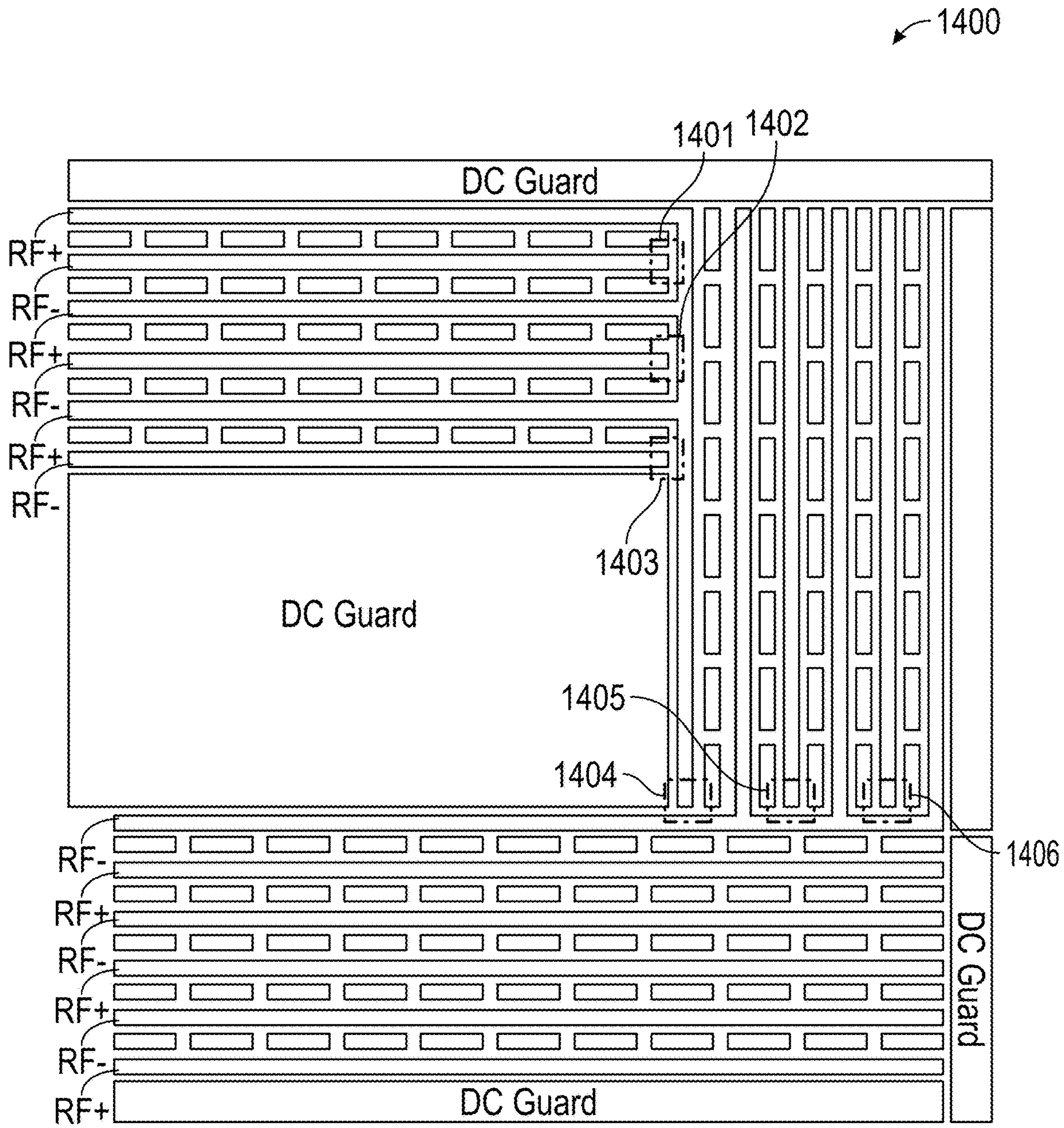
FIG. 14 (Prior Art)
FIG. 14 is a schematic diagram illustrating a prior art arrangement of electrodes for a 180 degree "U-turn" region that can be implemented with IMS devices.

FIG. 14 is a schematic diagram illustrating a prior art arrangement of electrodes for a 180 degree turn region 1400 that can be implemented with IMS devices. As shown in FIG. 14, the 180 turn region 1400 includes several RF interface regions 1401-1406 where RF+ electrodes and/or RF− electrodes turn 90 degrees by way of RF electrode vias, which creates perpendicular intersections of RF+ electrodes and RF− electrodes where ions are discharged from a first path into a second path perpendicular to the first path. However, this configuration requires some RF− and RF+ electrodes to be very close at the interface regions 1401-1406 where the first path transitions to the second path. For example, the distance between RF− and RF+ electrodes can be about 0.127 mm, which can result in mis-aligned RF signals that can have negative impacts on performance, including unintentional trapping of ions, ion heating and fragmentation, loss of large or small ions at the edges of the core transmission range, and reduction of ion mobility resolution due to differential ion transmission through the junction. Additionally, the turn regions 1400 of the prior art only permit ions to travel in a single direction, as they must be discharged perpendicularly from the first path to the second path, which is disposed perpendicularly thereto, and this perpendicular discharge is unidirectional.

Figure 15:
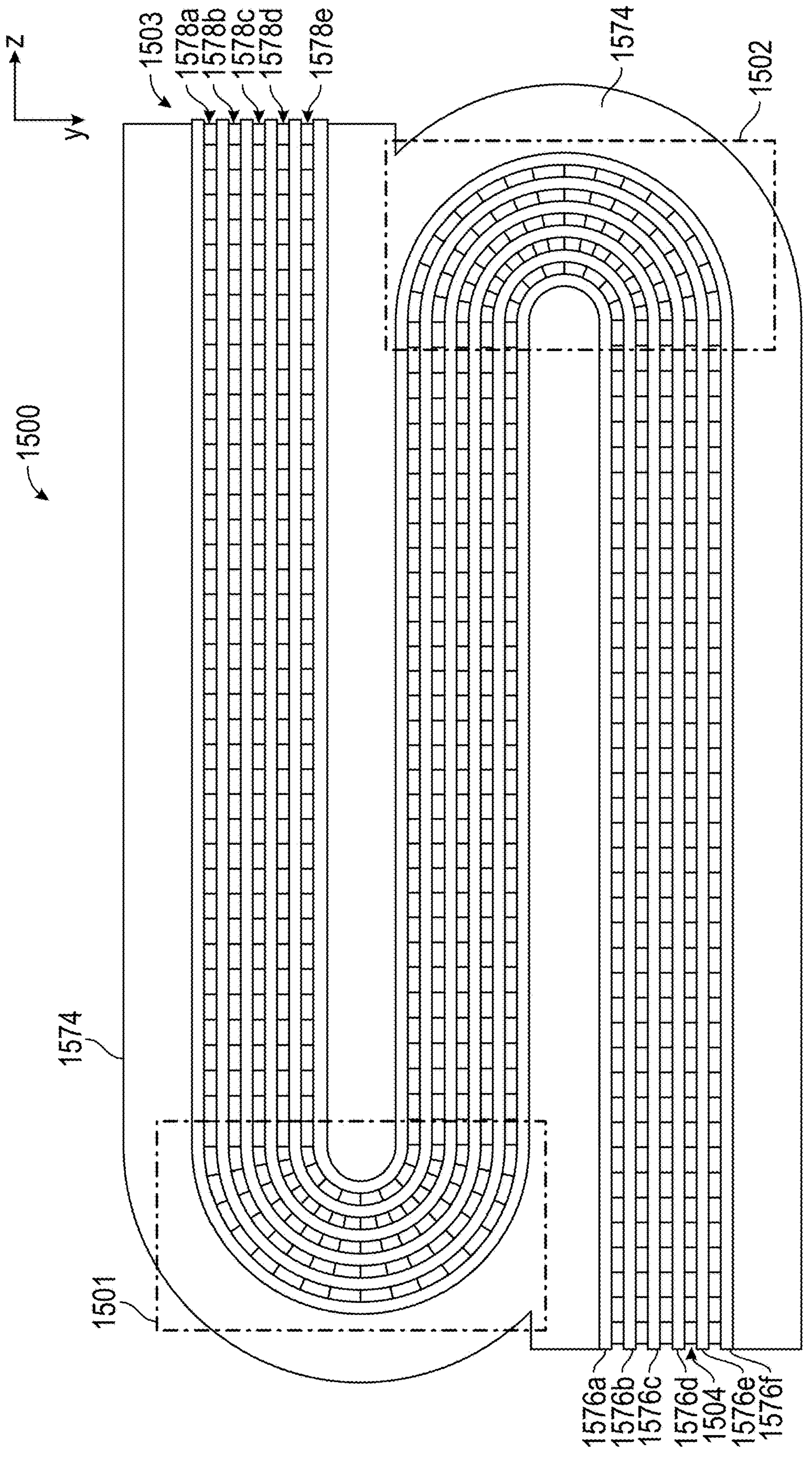
FIG. 15 is a schematic diagram of a SLIM path of the present disclosure having curved regions for implementation with ion extraction systems and IMS devices, such as those of FIGS. 1 and 2, and illustrating an exemplary arrangement of electrodes for two 180 degree "U-turn" regions.

FIG. 15 is a schematic diagram of a SLIM path 1500 having curved regions 1501, 1502 and illustrating an exemplary arrangement of electrodes therefor. The SLIM path 1500 can be implemented with ion extraction systems and IMS devices, such as those of FIGS. 1 and 2. As shown in FIG. 15, the SLIM path 1500 of the present disclosure can include SLIM "U-turn" or curved regions 1501, 1502 that can connect straight regions to create a serpentine or circuitous path, which allows for the length of the SLIM path 1500 to be greatly increased. The SLIM path 1500 includes a plurality of continuous RF electrodes 1576*a-f*, a plurality of segmented electrode arrays 1578*a-e* that can be placed between two RF electrodes 1576*a-f*, and guard electrodes 1574. The continuous RF electrodes 1576*a-f* can be substantially similar to continuous RF electrodes 176*a-f*, the segmented electrode arrays 1578*a-e* can be substantially similar to segmented electrode arrays 178*a-e*, and the guard electrodes 1574 can be substantially similar to guard electrodes 174, as discussed, for example, in connection with FIG. 5. Accordingly, the description thereof similarly applies to the continuous RF electrodes 1576*a-f*, the segmented electrode arrays 1578*a-e*, and the guard electrodes 1574 and need not be repeated. However, each continuous RF electrode 1576*a-f* is continuous along the entirety of the SLIM path 1500 such that they curve along and through the curved regions 1501, 1502. Accordingly, the number of vias required to connect the RF electrodes 1576*a-f* with other RF electrodes of the IMS device is reduced, and a single via can be used to route the electrical potential from the routing traces on the back of the printed circuit boards to the active RF electrode 1576*a-f* on the front of the print circuit board. Similarly, the segmented electrode arrays 1578*a-e* continue along and through the curved regions 1501, 1502. In this regard, some of the individual electrodes of the segmented electrode arrays 1578*a-e* can be curved to match the curvature of the curved regions 1501, 1502. Thus, the continuous RF electrodes 1576*a-f* and the segmented electrode arrays 1578*a-e* form a continuous path in the curved regions 1501, 1502, instead of abrupt 90 degree turns such as that in the prior art turn region 1400 shown in FIG. 14.

The SLIM path 1500 with curved regions 1501, 1502 has improved ion transmission over the prior art turn region 1400, including faster ion transmission, less ion loss, wider mass-to-charge ratio (m/z) transmission, reduced ion heating, improved IM resolution, and minimized number of RF electrode vias. Furthermore, the curved regions 1501, 1502 also permit for bi-directional ion transmission. For example, ions can travel through the SLIM path 1500 from a first end 1503 to a second end 1504, or, alternatively, ions can travel through the SLIM path 1500 in the opposite direction, that is, from the second end 1504 to the first end 1503.

Figure 16A:
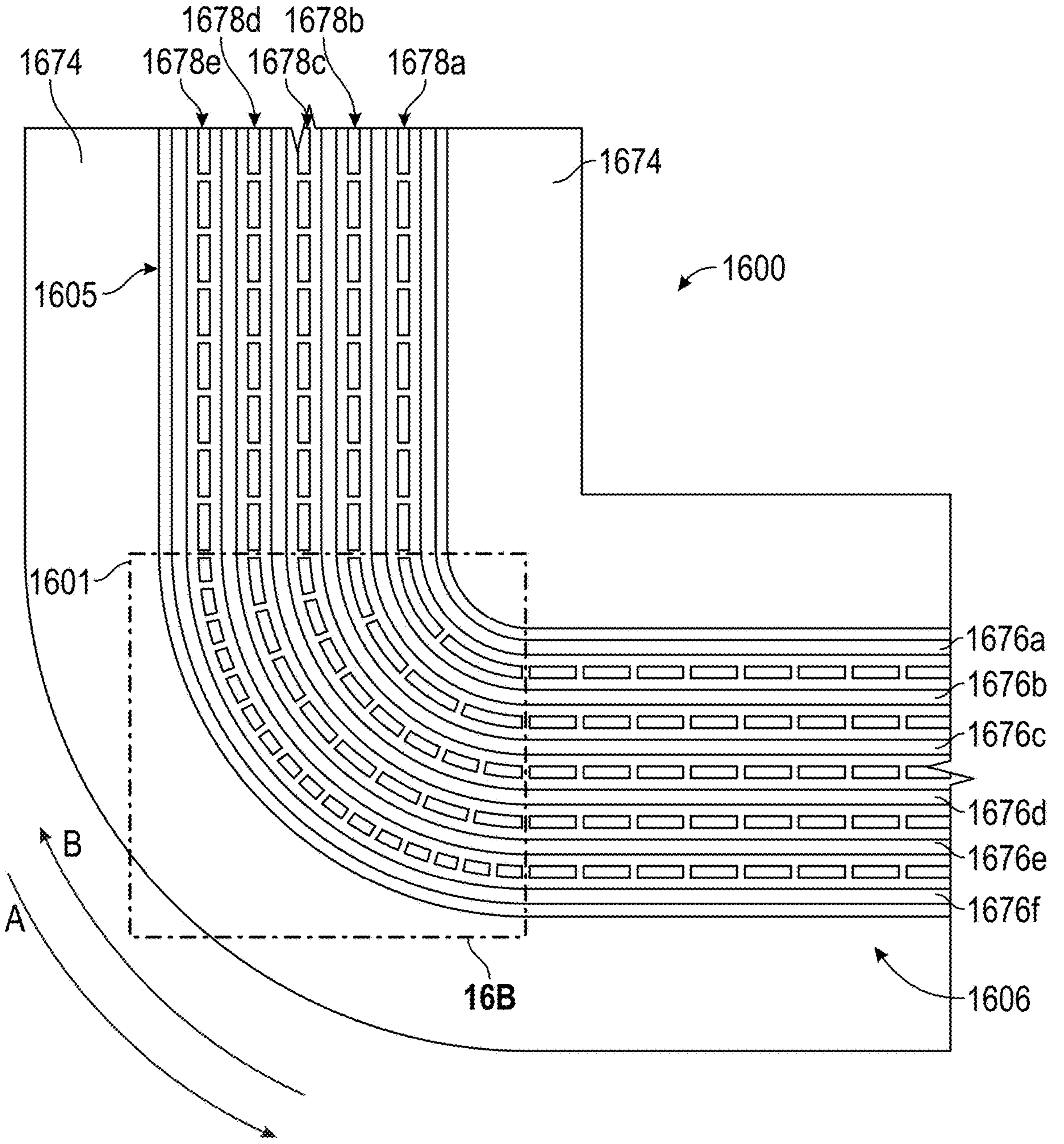
FIG. 16A is a detailed schematic diagram illustrating an exemplary arrangement of electrodes for a portion of a SLIM path of the present disclosure having a 90 degree curved region.
Figure 16B:
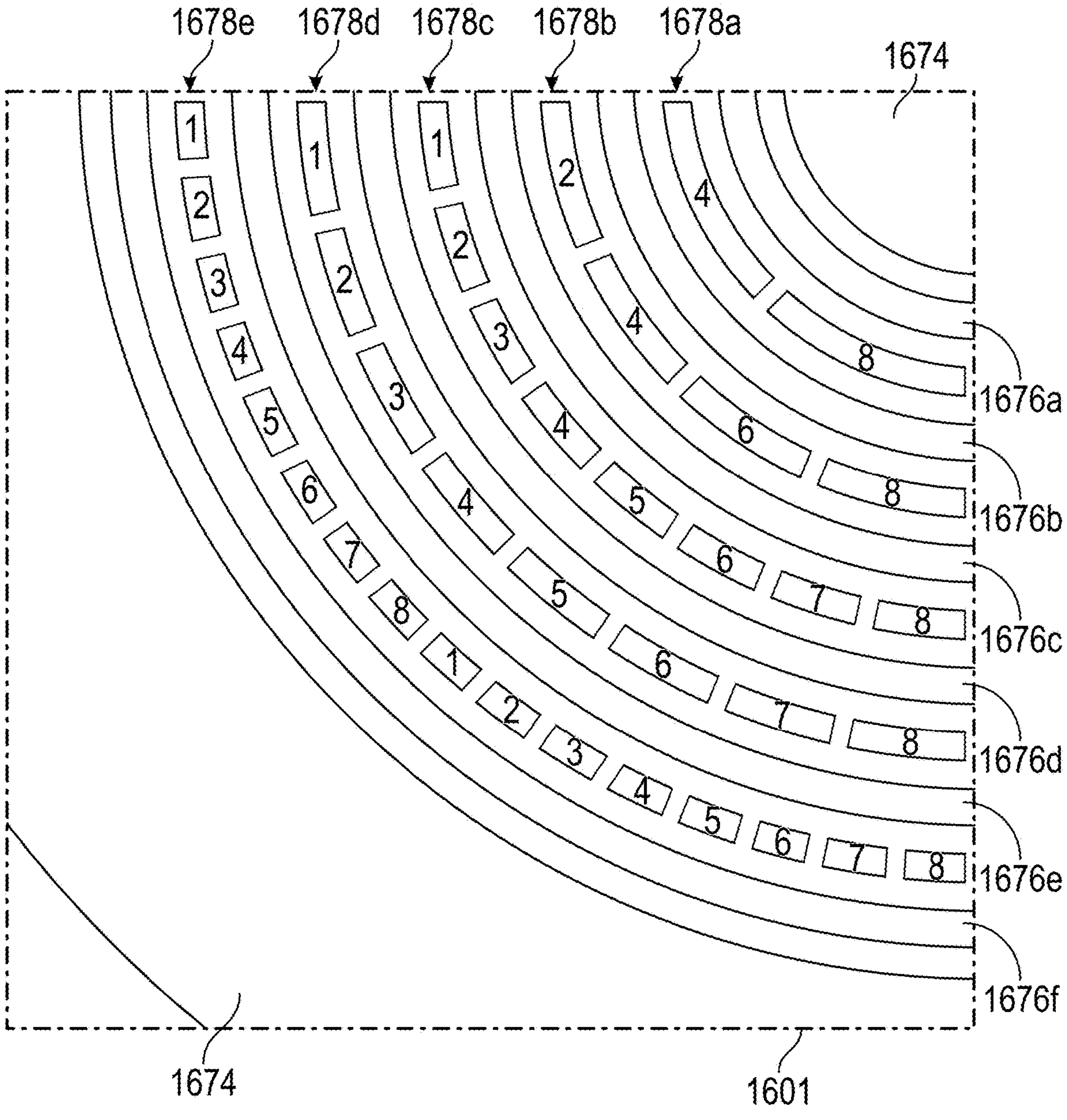
FIG. 16B is an enlarged detailed view of Area 16B of FIG. 16A.

FIG. 16A is a detailed schematic diagram illustrating an exemplary arrangement of electrodes 1676*a-f*, 1678*a-e* for a portion of a SLIM path 1600 of the present disclosure having a 90 degree curved turn region 1601, and FIG. 16B is an enlarged detailed view of Area 16B of FIG. 16A. The SLIM path 1600 includes an inlet region 1605, the curved turn region 1601, and an outlet region 1606. The curved turn region 1601 is positioned between, such that it connects, the inlet region 1605 and the outlet region 1606, and generally curves or turns 90 degrees. Thus, the outlet region 1606 can extend perpendicularly to the inlet region 1605. As such, the SLIM path 1600 has a curved configuration that causes the ions to ultimately travel perpendicular to the original direction of travel. As shown in FIG. 16, the ions travel into the inlet region 1605, enter the curved turn region 1601 in the direction of arrow A, turn 90 degrees as they traverse the curved turn region 1601 in the direction of arrow A, and finally enter the outlet region 1606, which they can then traverse and exit this portion of the SLIM path 1600. Alternatively, since the curved turn region 1601 permits for bi-directional ion transmission, the ions can travel through the SLIM path 1600 in the opposite direction, that is, the ions can travel into the outlet region 1606, enter the curved turn region 1601 in the direction of arrow B, turn 90 degrees as they traverse the curved turn region 1601 in the direction of arrow A, and enter the inlet region 1605, which they can then traverse and exit this portion of the SLIM path 1600, e.g., and enter a different SLIM path region. However, it should be understood that the curved turn region 1601 can turn more or less than 90 degrees to connect inlet and outlet regions 1605, 1606 that are positioned at different angles with respect to each other. For example, the curved turn region 1601 can turn 10°, 22.5°, 45°, 67.5°, 90°, 112.5°, 135°, 157.5°, 180°, etc.

As shown in FIGS. 16A and 16B, the SLIM path 1600, including the curved turn region 1601, includes guard electrodes 1674, a plurality of continuous RF electrodes 1676*a-f*, and a plurality of segmented electrode arrays 1678*a-e*, which progress through the curved turn region 1601. In the curved turn region 1601, the continuous electrodes 1676*a-f* and the segmented electrode arrays 1678*a-e* curve along arrows A/B, thus forming a curved ion path in the direction of arrows A and B. The continuous RF electrodes 1676*a-f* can be substantially similar to continuous RF electrodes 176*a-f*, the segmented electrode arrays 1678*a-e* can be substantially similar to segmented electrode arrays 178*a-e*, and the guard electrodes 1674 can be substantially similar to guard electrodes 174, as discussed, for example, in connection with FIG. 5. Accordingly, the description thereof similarly applies to the continuous RF electrodes 1676*a-f*, the segmented electrode arrays 1678*a-e*, and the guard electrodes 1674 and need not be repeated in its entirety. Each of the RF electrodes 1676*a-f* can receive RF signals that are phase shifted with respect to adjacent RF electrodes 1676*a-f*, e.g., adjacent RF electrodes 1676*a-f* can receive the same RF signal, but phase shifted by 180 degree. Additionally, each of the plurality of segmented electrode arrays 1678*a-e* can be placed between two RF electrodes 1676*a-f*, and can include individual traveling wave electrodes, such as individual electrodes 180*a-h*, shown and described in connection with FIG. 5. Notably, the RF electrodes 1676*a-f* curve from the inlet region 1605 to the outlet region 1606 through the curved turn region 1601, and are continuous there through. Thus, the RF electrodes 1676*a-f* do not require additional vias or connections to form the curved turn region 1601.

In the curved turn region 1601, each of the individual electrodes of the segmented electrode arrays 1678*a-e* can be curved electrodes that follow the curvature of the curved turn region 1601, and the number of electrodes in the curved turn region 1601 for each segmented electrode array 1678*a-e* can be individually tailored depending on the positioning. In particular, the first segmented electrode array 1678*a* traverses less distance across the curved turn region 1601 than the fifth segmented electrode array 1678*e*. For example, the first electrode array 1678*a*, which is positioned as the inner row of the curved turn region 1601, can have two individual electrodes in the curved turn region 1601, the second electrode array 1678*b* can have four individual electrodes in the curved turn region 1601, the third electrode array 1678*c* can have eight individual electrodes in the curved turn region 1601, the fourth electrode array 1678*d* can have eight individual electrodes in the curved turn region 1601, and the fifth electrode array 1678*e* can have sixteen individual electrodes in the curved turn region 1601. The number of individual electrodes or electrode segments in each array 1678*a-e* can also vary independently of the other arrays 1678*a-e*. For example, the number of individual electrodes in any given array 1678*a-e* can be 1, 2, 3, 4, etc. Additionally, it is noted that the size, e.g., length and width, of each individual electrode can vary with respect to other individual electrodes within the same array 1678*a-e* or with respect to individual electrodes of other arrays 1678*a-e*. That is to say, the individual electrodes need not be uniform in dimensions across the electrode arrays 1678*a-e*.

The plurality of segmented electrode arrays 1678*a-e* can receive a voltage signal and generate a drive potential that can drive/transmit ions along the direction of the SLIM path 1600, e.g., in the direction of arrows A and B. In particular, the segmented electrodes 1678*a-e* can be traveling wave (TW) electrodes such that each of the individual electrodes of each segmented electrode array 1678*a-e* receives a voltage signal that is simultaneously applied to all individual electrodes, but phase shifted between adjacent electrodes along the curved direction of arrow A or B. Accordingly, each of the individual electrodes is labeled in FIG. 16B with a number from 1-8 denoting the phase shift of the TW voltage signal applied to that individual electrode, as discussed in connection with FIG. 5 and U.S. Pat. No. 10,317,364 entitled "Ion Manipulation Device," which is incorporated herein by reference in its entirety. For example, "1"=0° phase shift, "2"=45° phase shift, "3"=90° phase shift, "4"=135° phase shift, "5"=180° phase shift, "6"=225° phase shift, "7"=270° phase shift, and "8"=315° phase shift.

Thus, in the curved turn region 1601, the phase shift between the two adjacent individual electrodes for the first segmented electrode array 1678*a* can be 180 degree, e.g., the first individual electrode (4) would receive the 135° phase of the traveling wave voltage signal and the second individual electrode (8) would receive the 315° phase of the traveling wave voltage signal. For the second segmented electrode array 1678, the phase shift between adjacent electrodes of the four individual electrodes in the curved turn region 1601 can be 90 degrees, e.g., the first individual electrode (2) would receive the 45° phase of the traveling wave voltage signal, the second individual electrode (4) would receive the 135° phase of the traveling wave voltage signal, the third individual electrode (6) would receive the 225° phase of the traveling wave voltage signal, and the fourth individual electrode (8) would receive the 315° phase of the traveling wave voltage signal. For the remaining three segmented electrode arrays 1678*c*. 1678*d*, 1678*e*, the phase shift between adjacent individual electrodes in the curved turn region can be 45 degrees, e.g., the first individual electrodes (1) would receive the 0° phase of the traveling wave voltage signal, the second individual electrodes (2) would receive the 45° phase of the traveling wave voltage signal, the third individual electrodes (3) would receive the 90° phase of the traveling wave voltage signal, the fourth individual electrodes (4) would receive the 135° phase of the traveling wave voltage signal, the fifth individual electrodes (5) would receive the 180° phase of the traveling wave voltage signal, the sixth individual electrodes (6) would receive the 225° phase of the traveling wave voltage signal, the seventh individual electrodes (7) would receive the 270° phase of the traveling wave voltage signal, and the eighth individual electrodes (8) would receive the 315° phase of the traveling wave voltage signal. It is noted that the fifth segmented electrode array 1678*e* includes two groups of eight individual electrodes in the curved turn region 1601. The voltage signal applied to the individual electrodes of each segmented electrode array 1678*a-e* can be a sinusoidal waveform (e.g., an AC voltage waveform), a rectangular waveform, a DC square waveform, a sawtooth waveform, a biased sinusoidal waveform, a pulsed current waveform, etc., and the amplitude of the signal provided to the individual electrodes can be determined based on the voltage waveform applied, e.g., in view of the phase shifting referenced above. Accordingly, the segmented electrodes 1678*a-e* are configured to transmit the received ions along the SLIM path 1600.

Figure 17A:
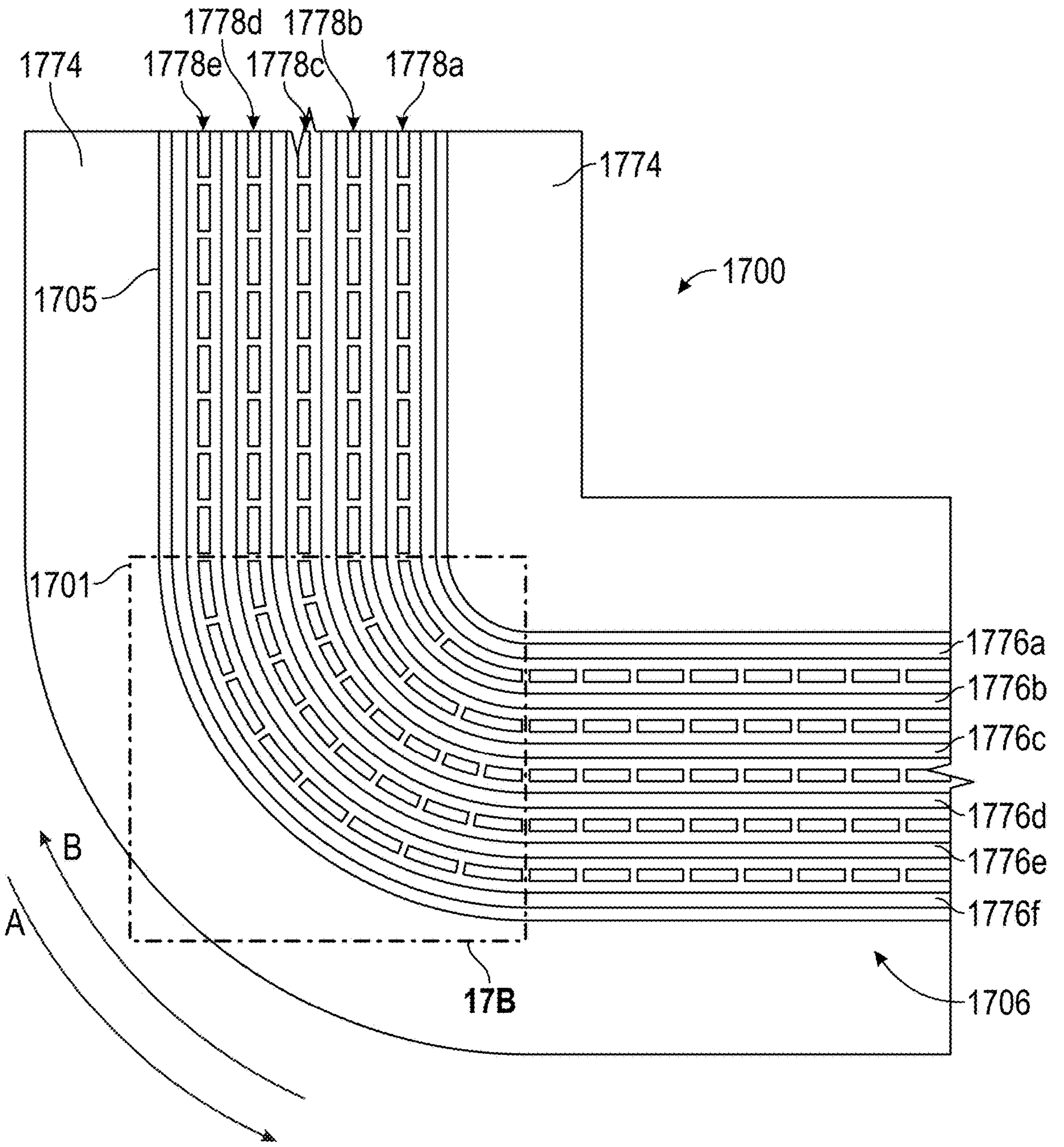
FIG. 17A is a detailed schematic diagram illustrating another exemplary arrangement of electrodes for a portion of a SLIM path of the present disclosure having a 90 degree curved region.
Figure 17B:
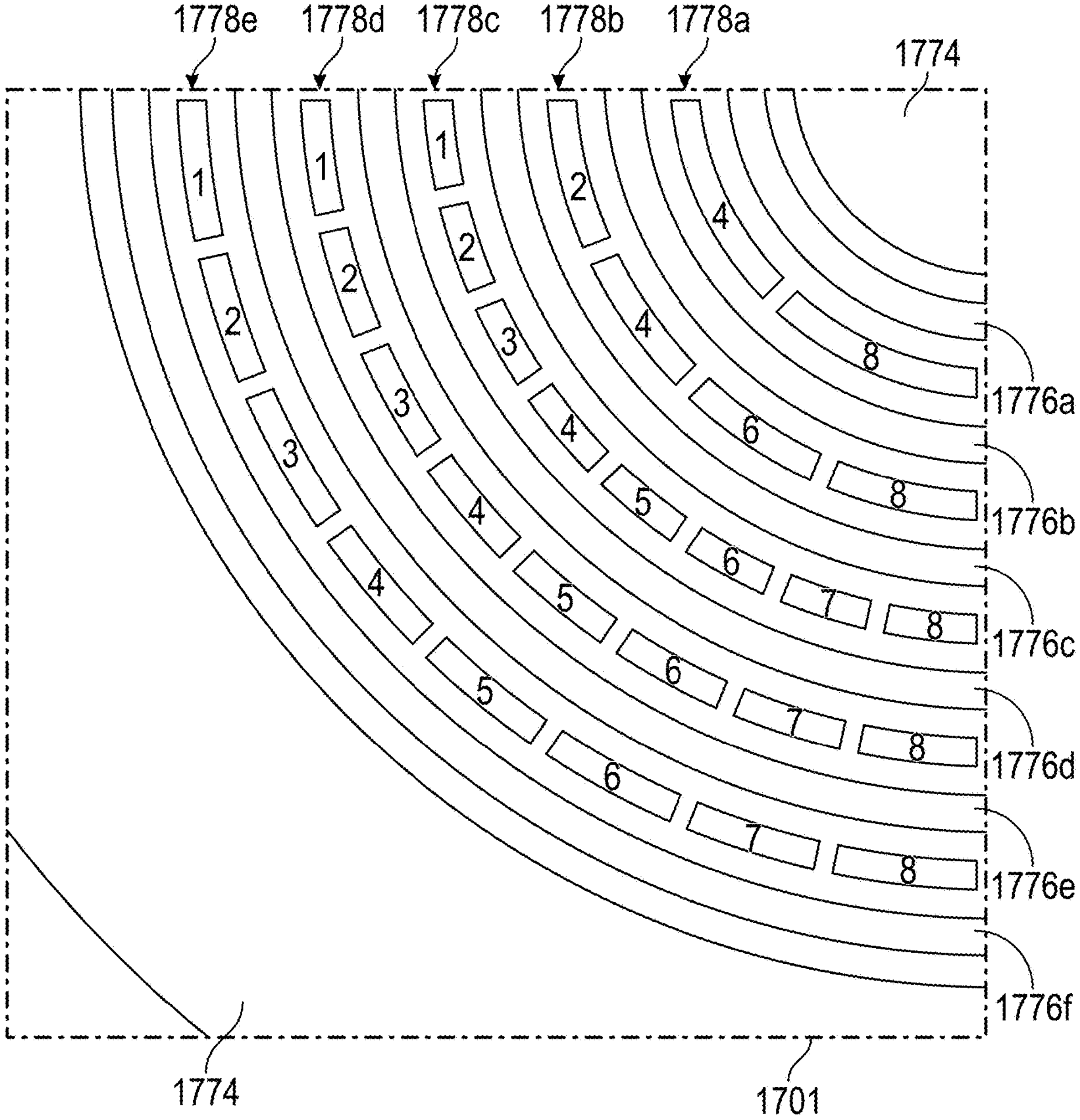
FIG. 17B is an enlarged detailed view of Area 17B of FIG. 17A.

FIG. 17A is a detailed schematic diagram illustrating another exemplary arrangement of electrodes 1776*a-f*, 1778*a-e* for a portion of a SLIM path 1700 of the present disclosure having a 90 degree curved turn region 1701, and FIG. 17B is an enlarged detailed view of Area 17B of FIG. 17A. The SLIM path 1700 and arrangement of electrodes 1776*a-f*, 1778*a-e* of FIGS. 17A-B are substantially similar to the SLIM path 1600 and exemplary arrangement of electrodes 1676*a-f*, 1678*a-e* shown and described in connection with FIGS. 16A-B, and like reference numerals are used to denote like elements but incremented by 100. Accordingly, as shown in FIG. 17A, the SLIM path 1700 includes an inlet region 1705, a curved turn region 1701, and an outlet region 1706. The SLIM path 1700 additionally includes guard electrodes 1774, continuous RF electrodes 1776*a-f*, and segmented electrode arrays 1778*a-e*. However, the electrode configuration illustrated in FIGS. 17A-B differs from that of FIGS. 16A-B in that the fifth segmented electrode array 1778*e* includes eight individual electrodes in the curved turn region 1701 instead of sixteen as in the electrode configuration of FIGS. 16A-B.

Figure 18:
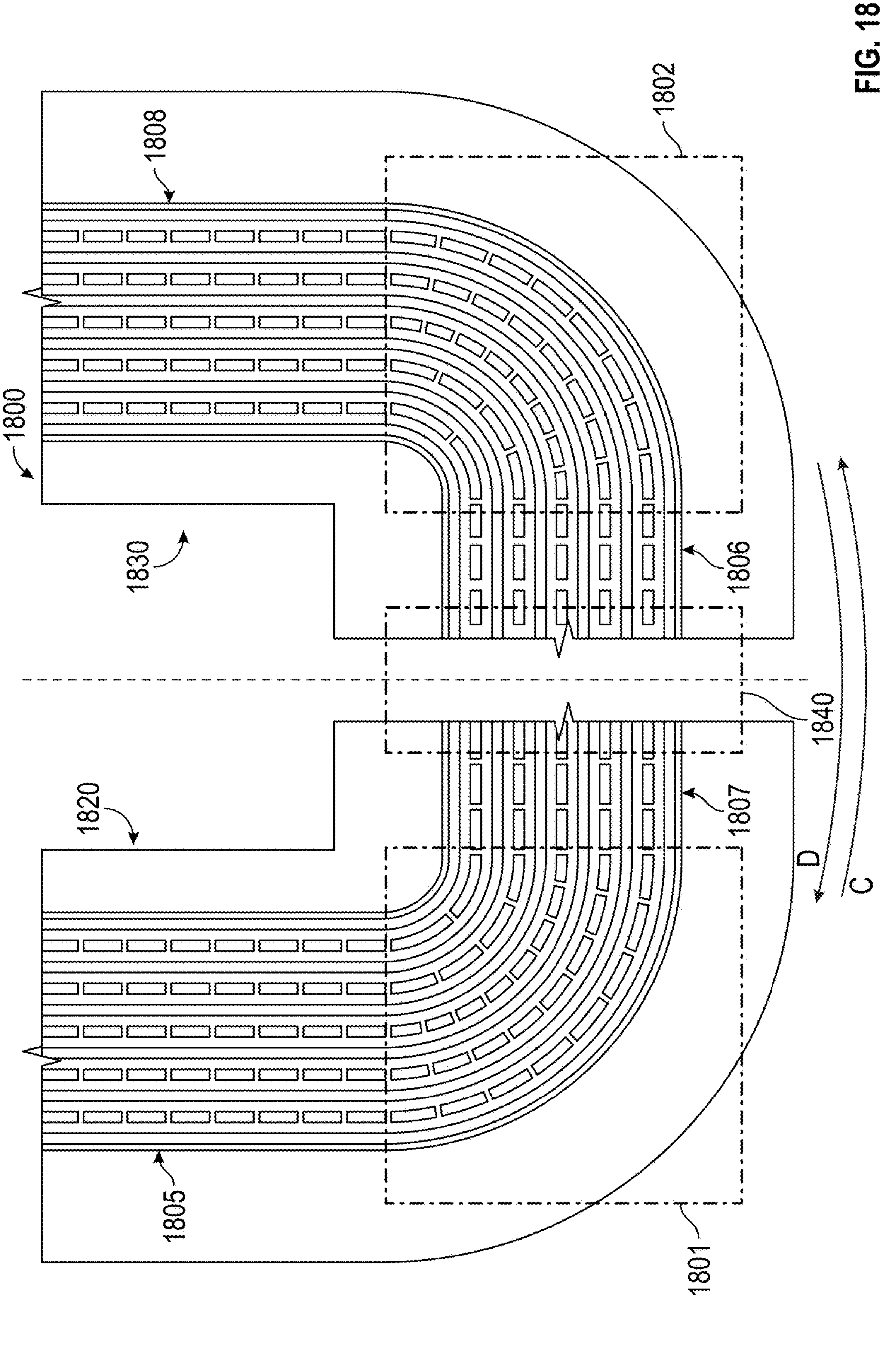
FIG. 18 is a detailed schematic diagram illustrating an exemplary arrangement of electrodes for a portion of a SLIM path of the present disclosure having two 90 degree curved regions, such as those shown in FIGS. 17A-B, combined with an intermediate straight region to form a 180 degree turn.

FIG. 18 is a detailed schematic diagram illustrating an exemplary arrangement of electrodes for a portion of a SLIM path 1800 of the present disclosure having two 90 degree curved turn regions 1801, 1802, similar in construction to the curved turn region 1801 shown and described in connection with FIGS. 17A-B, combined with intermediate straight regions 1806, 1807, 1840 to form a 180 degree turn. More specifically, the SLIM path 1800 includes a first SLIM path 1820 and a second SLIM path 1830 that are connected by an intermediate region 1840. The SLIM paths 1820 and 1830 have an arrangement of electrodes similar to those shown and described in connection with FIGS. 17A-B. As shown in FIG. 18, the first SLIM path 1820 includes an inlet region 1805, a curved turn region 1801 that is subsequent to the inlet region 1805 and generally curves or turns 90 degrees toward an outlet region 1807, which is subsequent to the curved turn region 1801. Similarly, the second SLIM path 1830 includes an inlet region 1806, a curved turn region 1802 that is subsequent to the inlet region 1806 and generally curves or turns 90 degrees toward an outlet region 1808, which is subsequent to the curved turn region 1802. The straight transmission region 1840 connects the outlet region 1807 of the first SLIM path 1820 and the inlet region 1806 of the second SLIM path 1830. As such, the SLIM path 1800 has a curved configuration with two curved turn regions 1801 and 1802 that causes the ions to turn 180 degree with respect to the original direction of travel.

During operation, ions can travel into the inlet region 1805 of the first SLIM path 1820, enter the curved turn region 1801 traveling in the direction of arrow C, turn 90 degrees as they traverse the curved turn region 1801, enter the outlet region 1807, travel through the straight transmission region 1840, enter the inlet region 1806 of the second SLIM path 1830, enter the curved turn region 1802 traveling in the direction of arrow C, turn 90 degrees as they traverse the curved turn region 1802, and finally enter the outlet region 1808 where they can be transferred out to a subsequent SLIM path. Alternatively, since the curved turn regions 1801, 1802 permit for bi-directional ion transmission, ions can alternatively be guided through the SLIM path 1800 in the opposite direction, e.g., entering at the outlet region 1808 of the second SLIM path 1830 and exiting at the inlet region 1805 of the first SLIM path 1820. In this configuration, the ions would travel in the direction of arrow D.

Figure 19A:
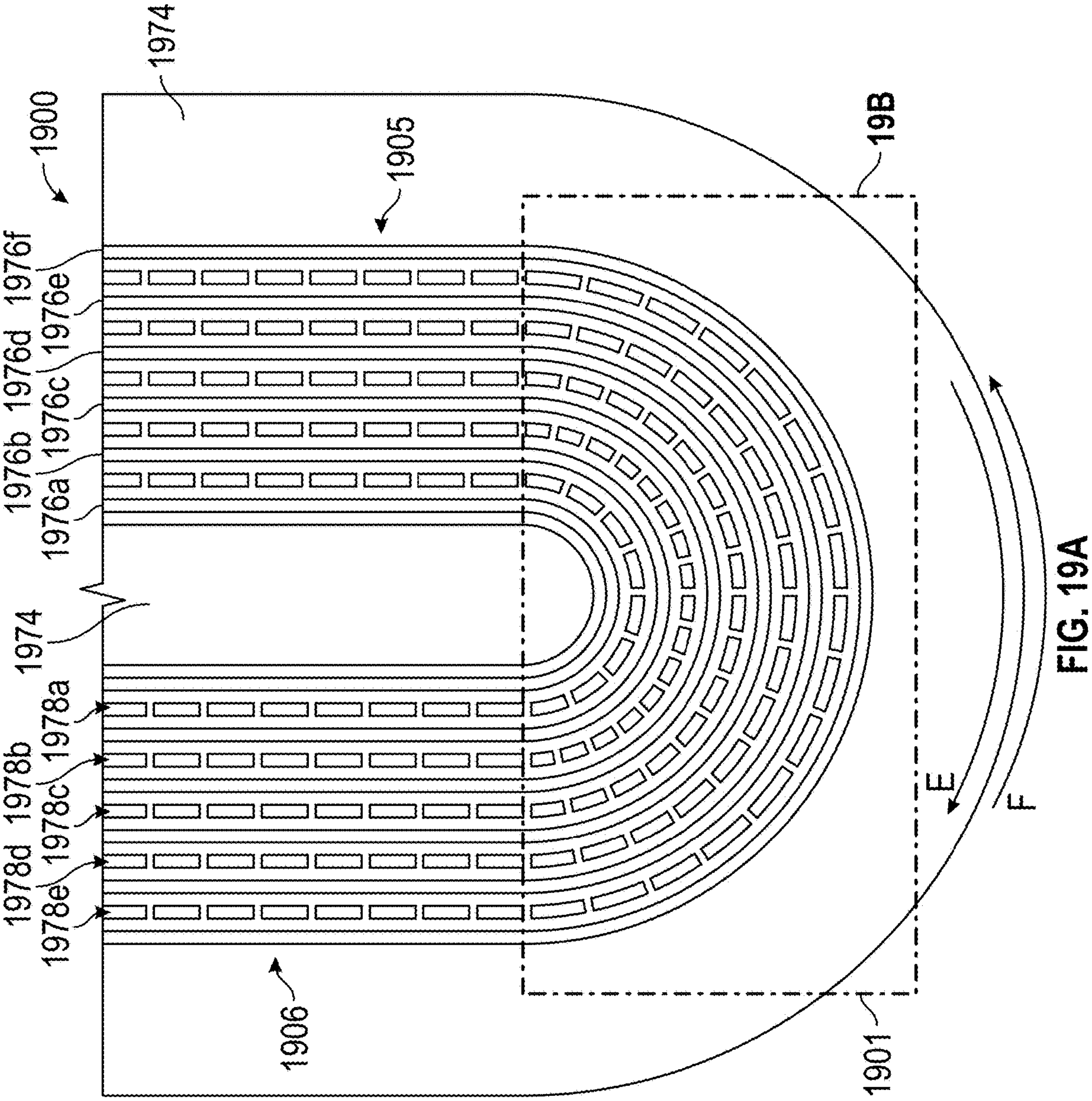
FIG. 19A is a detailed schematic diagram illustrating a first exemplary arrangement of electrodes for a portion of a SLIM path of the present disclosure having a 180 degree curved region.
Figure 19B:
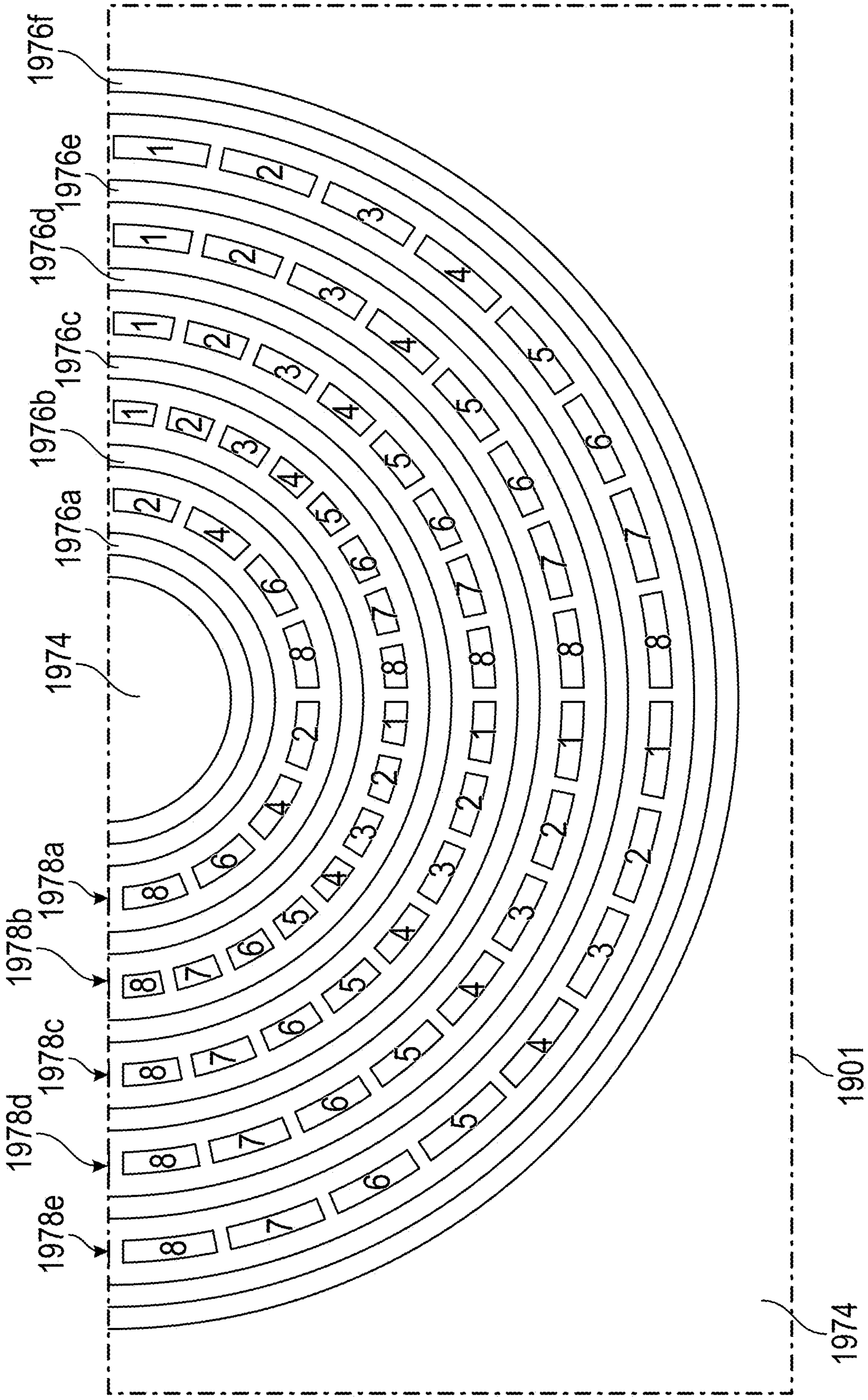
FIG. 19B is an enlarged detailed view of Area 19B of FIG. 19A.

FIG. 19A is a detailed schematic diagram illustrating a first exemplary arrangement of electrodes for a portion of a SLIM path 1900 of the present disclosure having a 180 degree curved turn region 1901, and FIG. 19B is an enlarged detailed view of Area 19B of FIG. 19A. The SLIM path 1900 includes an inlet region 1905, a curved turn region 1901, and an outlet region 1906. The curved turn region 1901 is subsequent to the inlet region 1905 and generally curves or turns 180 degree toward the outlet region 1906, which is subsequent to the curved turn region 1901. The outlet region 1906 can extend parallel to the inlet region 1905. As such, the SLIM path 1900 has a curved configuration that causes ions to turn 180 degree from the original direction of travel as they traverse the SLIM path 1900. As shown in FIG. 19A, ions can traverse the inlet region 1905, enter the curved turn region 1901, traverse the curved turn region 1901 as they travel in the direction of arrow E resulting in the ions turning 180 degree, and finally enter the outlet region 1906 and be transferred out of the outlet region 1906 to a different SLIM path. Alternatively, as the rounded turn permits for bi-directional ion transmission, ions can also be guided through the SLIM path 1901 in the opposite direction, e.g., in the direction of arrow F.

As shown in FIGS. 19A and 19B, the SLIM path 1900, including the curved turn region 1901, includes guard electrodes 1974, a plurality of continuous RF electrodes 1976*a-f*, and a plurality of segmented electrode arrays 1978*a-e*, which progress through the curved turn region 1901. In the curved turn region 191, the continuous electrodes 1976*a-f* and the segmented electrode arrays 1978*a-e* curve along arrows E/F, thus forming a curved ion path in the direction of arrows E and F. The continuous RF electrodes 1976*a-f* can be substantially similar to continuous RF electrodes 1676*a-f*, the segmented electrode arrays 1978*a-e* can be substantially similar to segmented electrode arrays 1678*a-e*, and the guard electrodes 1974 can be substantially similar to guard electrodes 1674, as discussed in connection with FIGS. 16A and 16B. Accordingly, the description thereof similarly applies to the continuous RF electrodes 1976*a-f*, the segmented electrode arrays 1978*a-e*, and the guard electrodes 1974 and need not be repeated in its entirety. Notably, the RF electrodes 1976*a-f* curve from the inlet region 1905 to the outlet region 1906 through the curved turn region 1901, and are continuous there through. Thus, the RF electrodes 1976*a-f* do not require additional vias or connections to form the curved turn region 1901.

In the curved turn region 1901, each of the individual electrodes of the segmented electrode arrays 1978*a-e* can be curved electrodes that follow the curvature of the curved turn region 1901, and the number of electrodes in the curved turn region 1901 for each segmented electrode array 1978*a-e* can be individually tailored depending on the positioning. In particular, the first segmented electrode array 1978*a* traverses less distance across the curved turn region 1901 than the fifth segmented electrode array 1978*e*. For example, the first electrode array 1978*a*, which is positioned as the inner row of the curved turn region 1901, can have eight individual electrodes in the curved turn region 1901, while each of the second, third, fourth, and fifth electrode arrays 1978*b, c, d, e* can have sixteen individual electrodes in the curved turn region 1901. As previously noted, the number of individual electrodes in each electrode array 1978*a-e* can be more or less than described herein.

As discussed in connection with FIGS. 16A and 16B, each of the individual electrodes is labeled in FIG. 19B with a number from 1-8 denoting the phase shift of the TW voltage signal applied to that individual electrode. Thus, the phase shift between the eight individual electrodes, which can be formed as two groups of four, of the first segmented electrode array 1978*a* in the curved turn region 1901 can be 90 degrees, e.g., the first individual electrode (2) would receive the 45° phase of the traveling wave voltage signal, the second individual electrode (4) would receive the 135° phase of the traveling wave voltage signal, the third individual electrode (6) would receive the 225° phase of the traveling wave voltage signal, and the fourth individual electrode (8) would receive the 315° phase of the traveling wave voltage signal. For the remaining four segmented electrode arrays 1978*b*, 1978*c*, 1978*d*, 1978*e*, the phase shift between adjacent individual electrodes in the curved turn region 1901 can be 45 degrees, e.g., the first individual electrodes (1) would receive the 0° phase of the traveling wave voltage signal, the second individual electrodes (2) would receive the 45° phase of the traveling wave voltage signal, the third individual electrodes (3) would receive the 90° phase of the traveling wave voltage signal, the fourth individual electrodes (4) would receive the 135° phase of the traveling wave voltage signal, the fifth individual electrodes (5) would receive the 180° phase of the traveling wave voltage signal, the sixth individual electrodes (6) would receive the 225° phase of the traveling wave voltage signal, the seventh individual electrodes (7) would receive the 270° phase of the traveling wave voltage signal, and the eighth individual electrodes (8) would receive the 315° phase of the traveling wave voltage signal. It is noted that the second, third, fourth, and fifth segmented electrode arrays 1978*b*, 1978*c*, 1978*d*, 1978*e* include two groups of eight individual electrodes in the curved turn region 1901. The voltage signal applied to the individual electrodes of each segmented electrode array 1978*a-e* can be a sinusoidal waveform (e.g., an AC voltage waveform), a rectangular waveform, a DC square waveform, a sawtooth waveform, a biased sinusoidal waveform, a pulsed current waveform, etc., and the amplitude of the signal provided to the individual electrodes can be determined based on the voltage waveform applied, e.g., in view of the phase shifting referenced above. Accordingly, the segmented electrodes 1978*a-e* are configured to transmit the received ions along the SLIM path 1900.

Figure 20A:
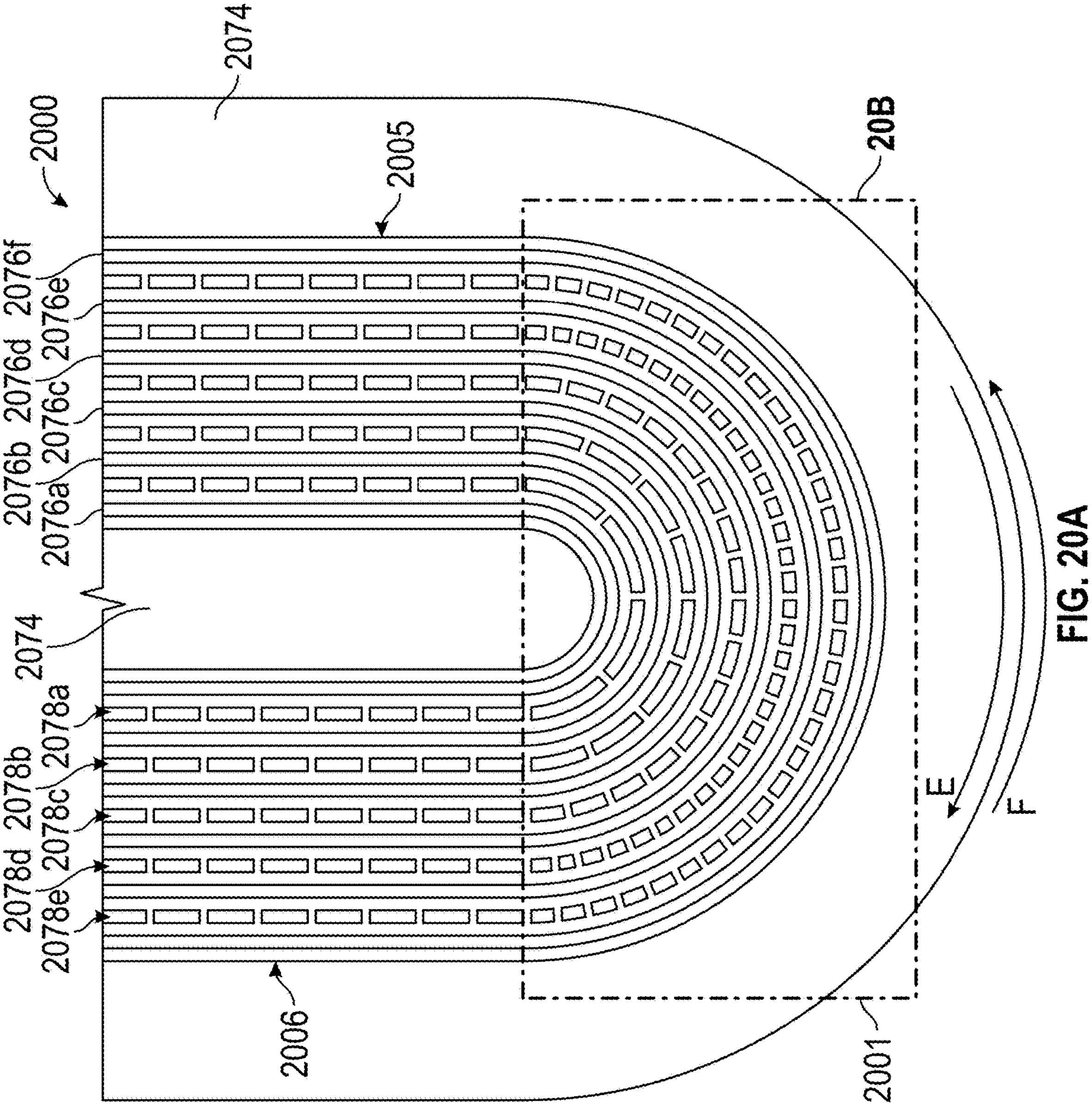
FIG. 20A is a detailed schematic diagram illustrating a second exemplary arrangement of electrodes for a portion of a SLIM path of the present disclosure having a 180 degree curved region.
Figure 20B:
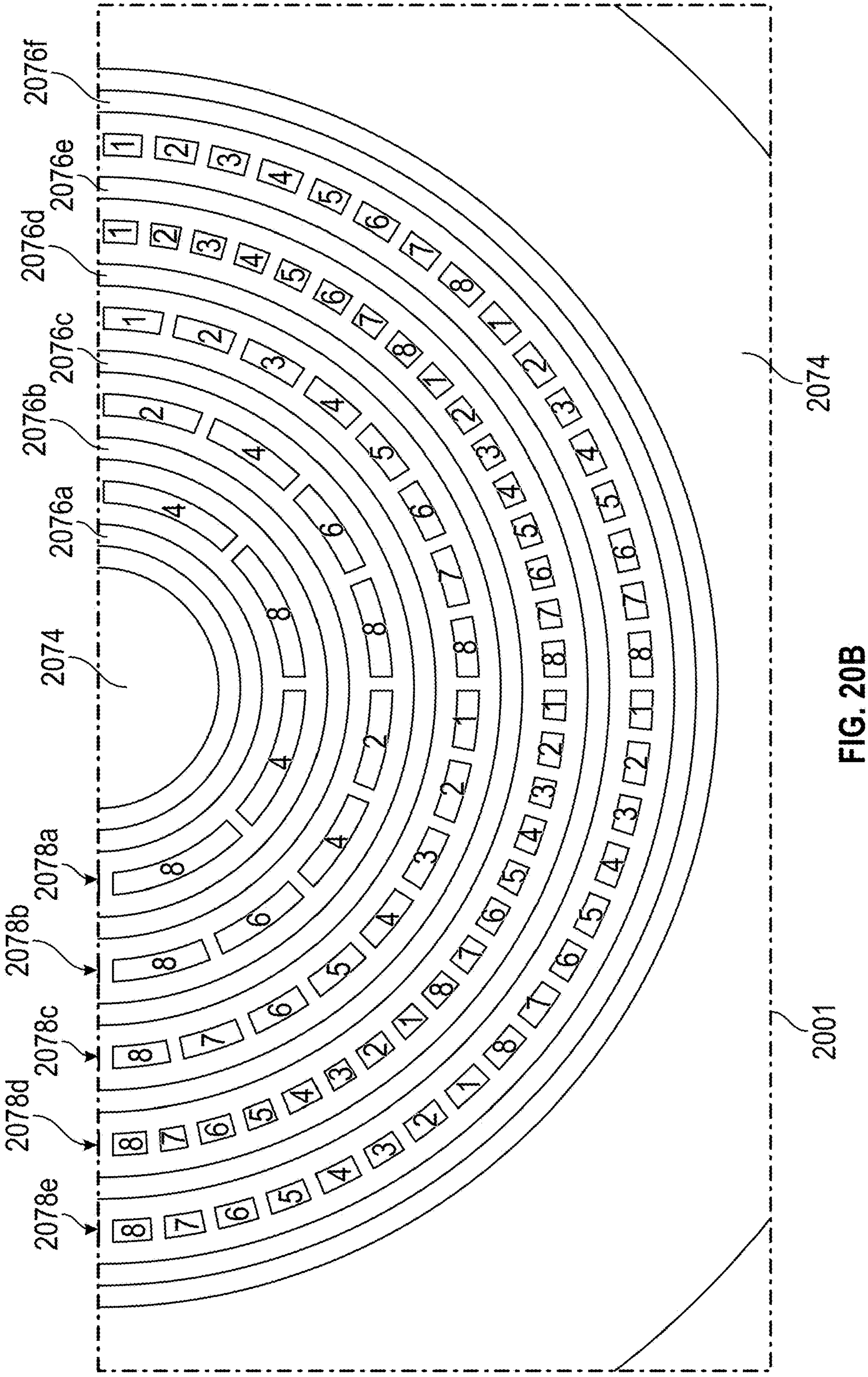
FIG. 20B is an enlarged detailed view of Area 20B of FIG. 20A.

FIG. 20A is a detailed schematic diagram illustrating a second exemplary arrangement of electrodes 2076*a-f*, 2078*a-e* for a portion of a SLIM path 2000 of the present disclosure having a 180 degree curved turn region 2001, and FIG. 20B is an enlarged detailed view of Area 20B of FIG. 20A. The SLIM path 2000 and arrangement of electrodes 2076*a-f*, 2078*a-e* of FIGS. 20A-B are substantially similar to the SLIM path 1900 and exemplary arrangement of electrodes 1976*a-f*, 1978*a-e* shown and described in connection with FIGS. 19A-B, and like reference numerals are used to denote like elements but incremented by 100. Accordingly, as shown in FIG. 20A, the SLIM path 2000 includes an inlet region 2005, a curved turn region 2001, and an outlet region 2006. The SLIM path 2000 additionally includes guard electrodes 2074, continuous RF electrodes 2076*a-f*, and segmented electrode arrays 2078*a-e*.

However, the electrode configuration illustrated in FIGS. 20A-B differs from that of FIGS. 19A-B in that the first segmented electrode array 2078*a* includes four individual electrodes in the curved turn region 2001 instead of eight as in the electrode configuration of FIGS. 19A-B, the second segmented electrode array 2078*b* includes eight (two groups of four) individual electrodes in the curved turn region 2001 instead of sixteen as in the electrode configuration of FIGS. 19A-B, and the fourth and fifth segmented electrode arrays 2078*d*, 2078*e* include thirty-two (four groups of eight) individual electrodes in the curved turn region 2001 instead of sixteen as in the electrode configuration of FIGS. 19A-B. Additionally, the four individual electrodes of the first segmented electrode array 2078*a* in the curved turn region 2001 have a phase shift of 180 degree between adjacent electrodes, e.g., the first and third individual electrodes (4) would receive the 135° phase of the traveling wave voltage signal, and the second and fourth individual electrodes (8) would receive the 315° phase of the traveling wave voltage signal, while the eight individual electrodes of the second segmented electrode array 2078*b* in the curved turn region 2001 have a phase shift of 90 degrees between adjacent electrodes, e.g., the first individual electrodes (2) would receive the 45° phase of the traveling wave voltage signal, the second individual electrodes (4) would receive the 135° phase of the traveling wave voltage signal, the third individual electrodes (6) would receive the 225° phase of the traveling wave voltage signal, and the fourth individual electrodes (8) would receive the 315° phase of the traveling wave voltage signal. For the third, fourth, and fifth segmented electrode arrays 2078*c*, 2078*d*, 2078*e*, the phase shift between adjacent individual electrodes in the curved turn region 2001 can be 45 degrees, like in the electrode arrangement of FIGS. 19A and 19B.

Figure 21A:
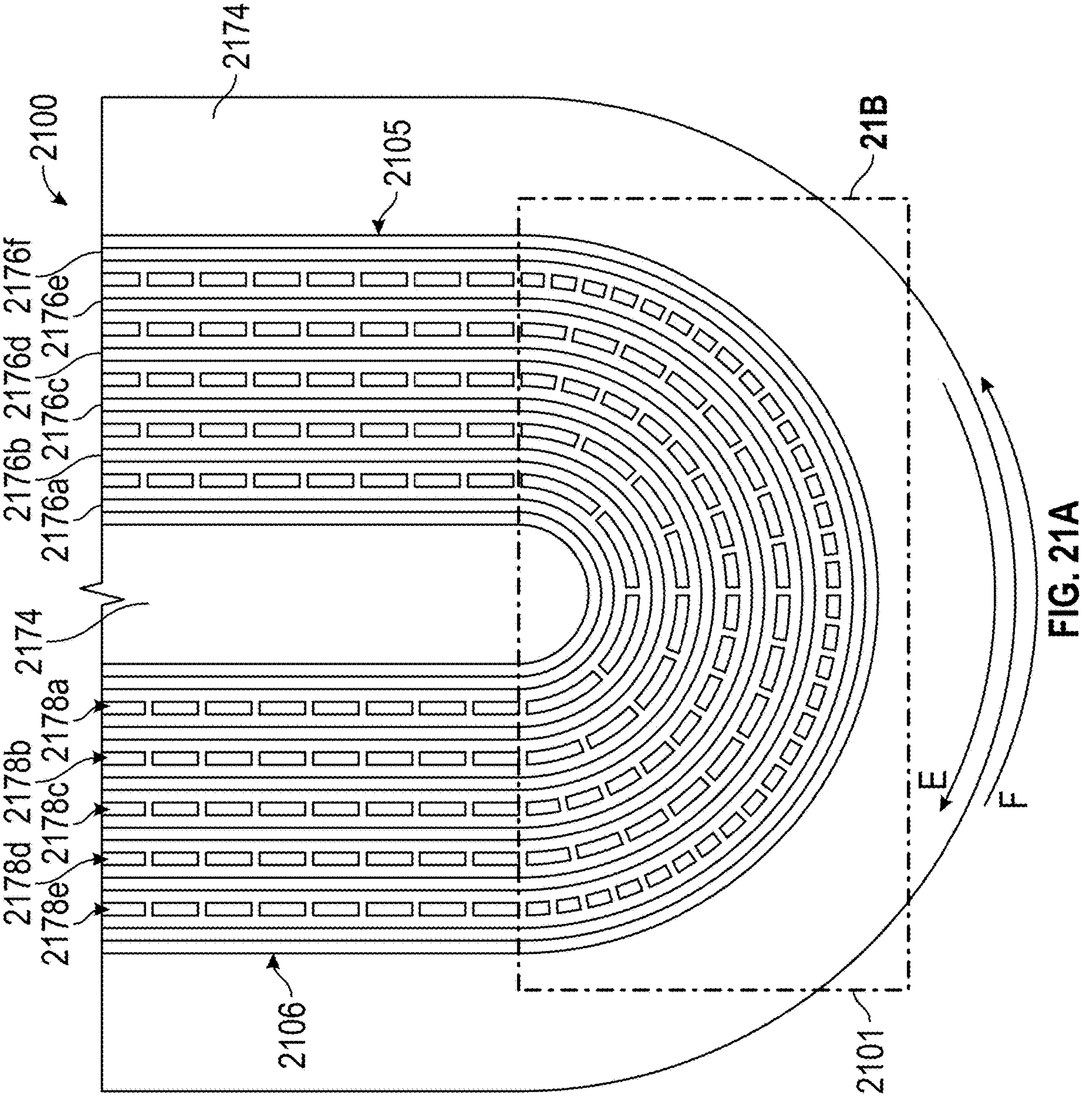
FIG. 21A is a detailed schematic diagram illustrating a third exemplary arrangement of electrodes for a portion of a SLIM path of the present disclosure having a 180 degree curved region.
Figure 21B:
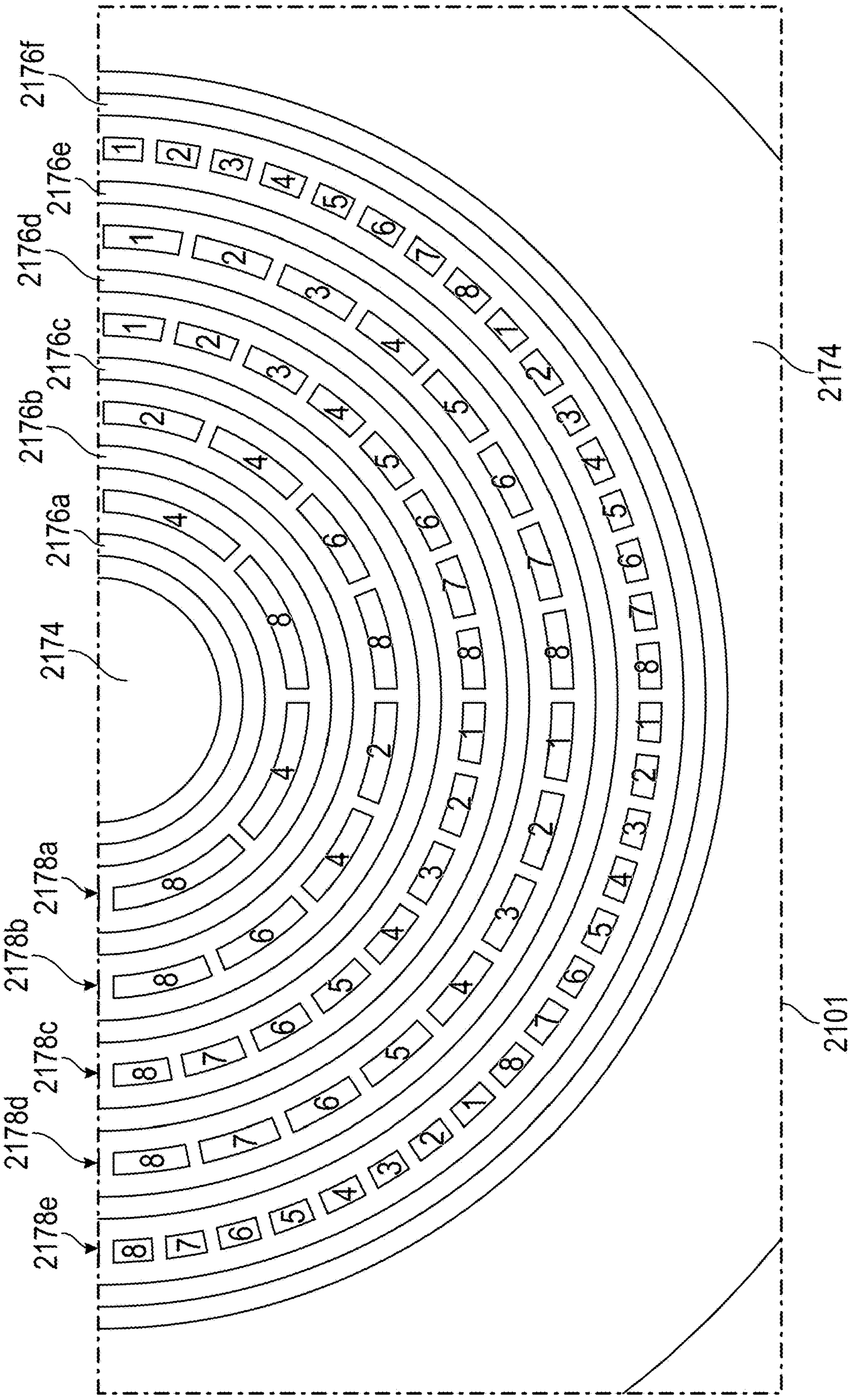
FIG. 21B is an enlarged detailed view of Area 21B of FIG. 21A.

FIG. 21A is a detailed schematic diagram illustrating a third exemplary arrangement of electrodes 2176*a-f*, 2178*a-e* for a portion of a SLIM path 2100 of the present disclosure having a 180 degree curved turn region 2101, and FIG. 21B is an enlarged detailed view of Area 21B of FIG. 21A. The SLIM path 2100 and arrangement of electrodes 2176*a-f*, 2178*a-e* of FIGS. 21A-B are substantially similar to the SLIM path 2000 and exemplary arrangement of electrodes 2076*a-f*, 2078*a-e* shown and described in connection with FIGS. 20A-B, and like reference numerals are used to denote like elements but incremented by 100. Accordingly, as shown in FIG. 21A, the SLIM path 2100 includes an inlet region 2105, a curved turn region 2101, and an outlet region 2106. The SLIM path 2100 additionally includes guard electrodes 2174, continuous RF electrodes 2176*a-f*, and segmented electrode arrays 2178*a-e*.

However, the electrode configuration illustrated in FIGS. 21A-B differs from that of FIGS. 20A-B in that the fourth segmented electrode array 2178*d* includes sixteen (two groups of eight) individual electrodes in the curved turn region 2101 instead of thirty-two as in the electrode configuration of FIGS. 20A-B, but nonetheless still has a phase shift of 45 degrees between adjacent individual electrodes in the curved turn region 2001.

Figure 22A:
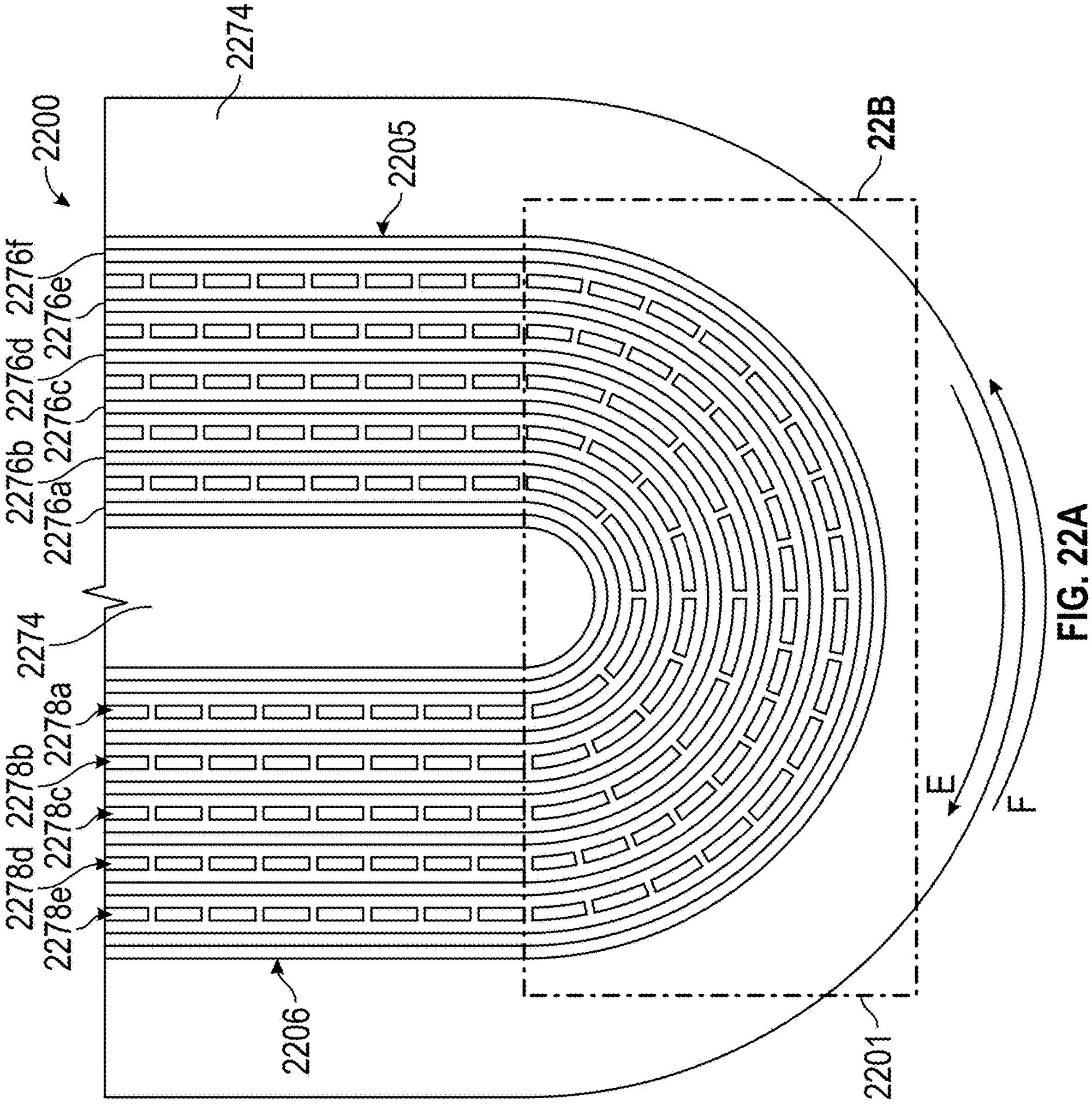
FIG. 22A is a detailed schematic diagram illustrating a fourth exemplary arrangement of electrodes for a portion of a SLIM path of the present disclosure having a 180 degree curved region.
Figure 22B:
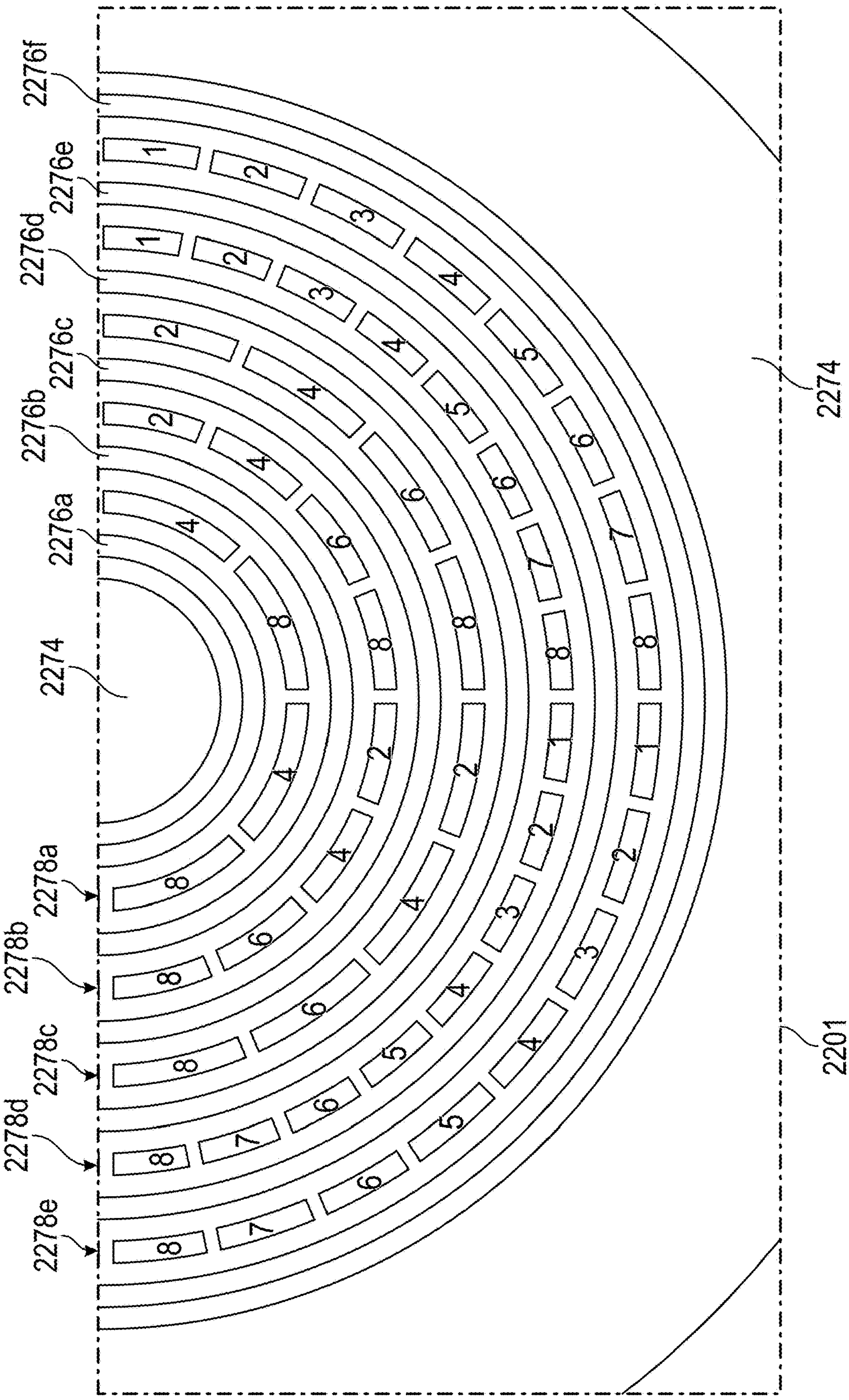
FIG. 22B is an enlarged detailed view of Area 22B of FIG. 22A.

FIG. 22A is a detailed schematic diagram illustrating a fourth exemplary arrangement of electrodes 2276*a-f*, 2278*a-e* for a portion of a SLIM path 2200 of the present disclosure having a 180 degree curved turn region 2201, and FIG. 22B is an enlarged detailed view of Area 22B of FIG. 22A. The SLIM path 2200 and arrangement of electrodes 2276*a-f*, 2278*a-e* of FIGS. 22A-B are substantially similar to the SLIM path 2100 and exemplary arrangement of electrodes 2176*a-f*, 2178*a-e* shown and described in connection with FIGS. 21A-B, and like reference numerals are used to denote like elements but incremented by 100. Accordingly, as shown in FIG. 22A, the SLIM path 2200 includes an inlet region 2205, a curved turn region 2201, and an outlet region 2206. The SLIM path 2200 additionally includes guard electrodes 2274, continuous RF electrodes 2276*a-f*, and segmented electrode arrays 2278*a-e*.

However, the electrode configuration illustrated in FIGS. 22A-B differs from that of FIGS. 21A-B in that the third segmented electrode array 2278*c* includes eight (two groups of four) individual electrodes in the curved turn region 2201 instead of sixteen as in the electrode configuration of FIGS. 21A-B, and the fifth segmented electrode array 2278*e* includes sixteen (two groups of eight) individual electrodes in the curved region 2201 instead of thirty-two as in the electrode configuration of FIGS. 21A-B. Additionally, the eight individual electrodes of the third segmented electrode array 2278*c* in the curved turn region 2201 have a phase shift of 90 degrees between adjacent electrodes, e.g., the first individual electrodes (2) would receive the 45° phase of the traveling wave voltage signal, the second individual electrodes (4) would receive the 135° phase of the traveling wave voltage signal, the third individual electrodes (6) would receive the 225° phase of the traveling wave voltage signal, and the fourth individual electrodes (8) would receive the 315° phase of the traveling wave voltage signal. For the fifth segmented electrode array 2278*e*, the phase shift between adjacent individual electrodes in the curved turn region 2201 can be 45 degrees, like in the electrode arrangement of FIGS. 21A and 21B.

Figure 23A:
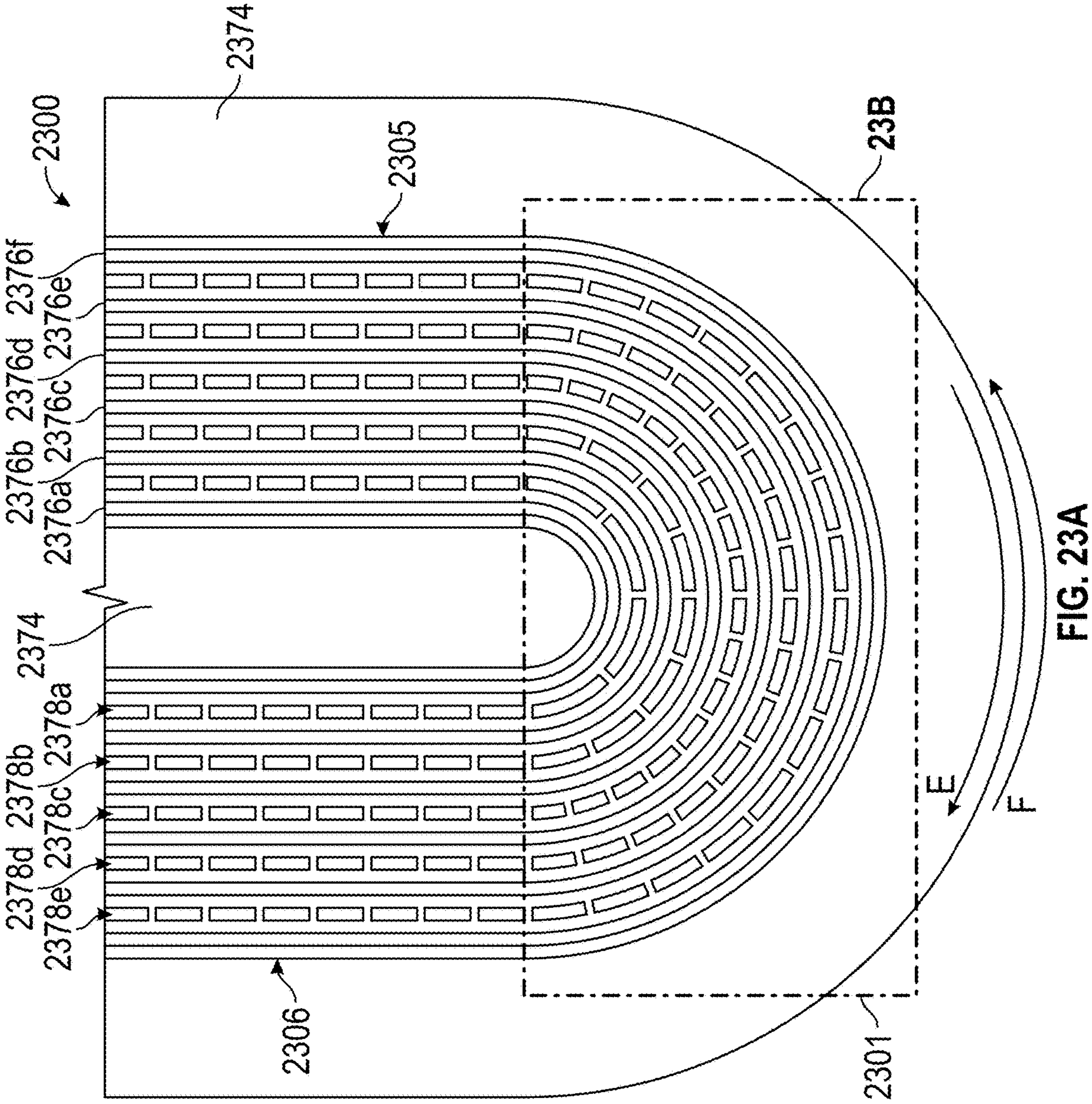
FIG. 23A is a detailed schematic diagram illustrating a fifth exemplary arrangement of electrodes for a portion of a SLIM path of the present disclosure having a 180 degree curved region.
Figure 23B:
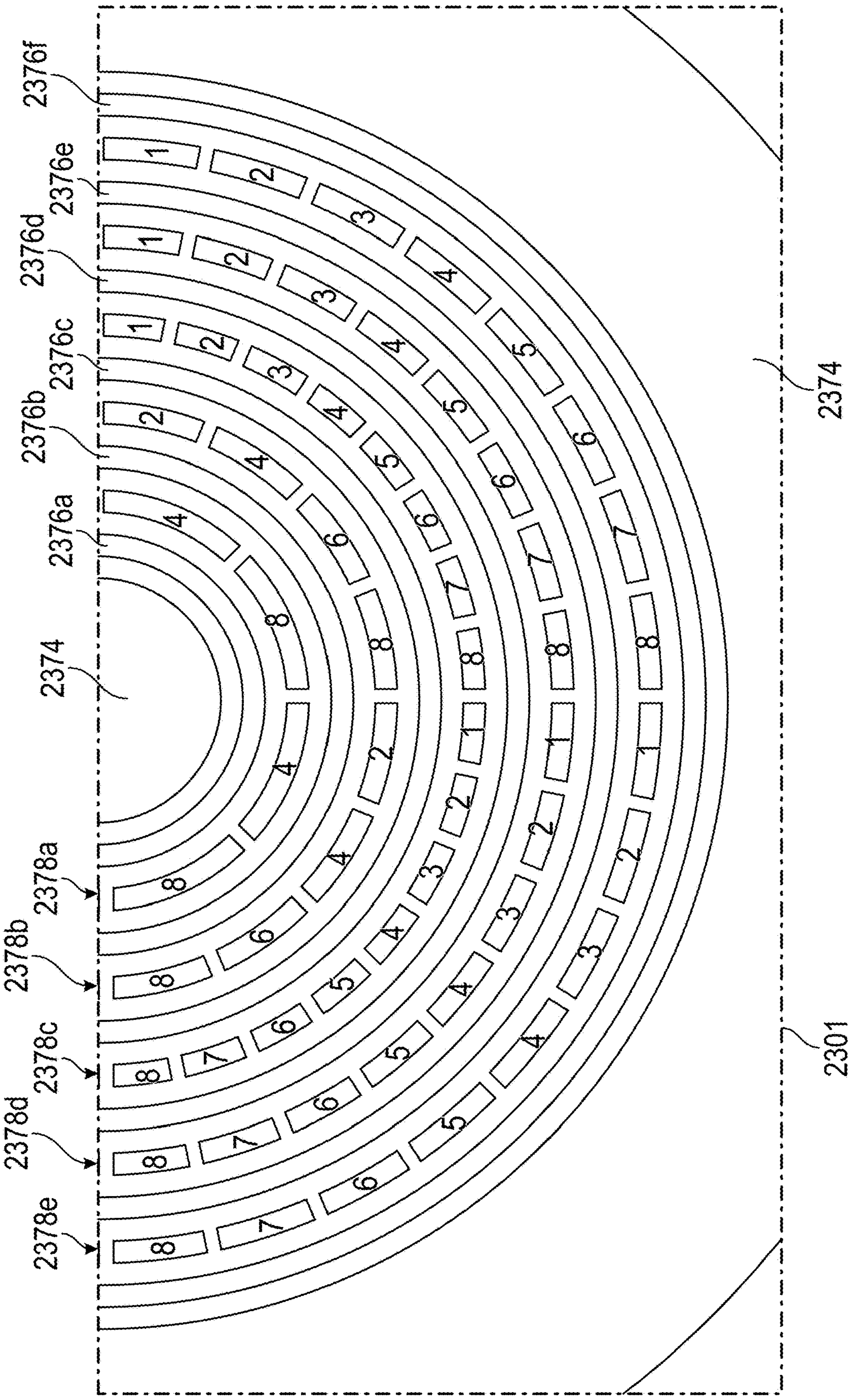
FIG. 23B is an enlarged detailed view of Area 23B of FIG. 23A.

FIG. 23A is a detailed schematic diagram illustrating a fifth exemplary arrangement of electrodes 2376*a-f*, 2378*a-e* for a portion of a SLIM path 2300 of the present disclosure having a 180 degree curved turn region 2301, and FIG. 23B is an enlarged detailed view of Area 23B of FIG. 23A. The SLIM path 2300 and arrangement of electrodes 2376*a-f*, 2378*a-e* of FIGS. 23A-B are substantially similar to the SLIM path 2200 and exemplary arrangement of electrodes 2276*a-f*, 2278*a-e* shown and described in connection with FIGS. 22A-B, and like reference numerals are used to denote like elements but incremented by 100. Accordingly, as shown in FIG. 23A, the SLIM path 2300 includes an inlet region 2305, a curved turn region 2301, and an outlet region 2306. The SLIM path 2300 additionally includes guard electrodes 2374, continuous RF electrodes 2376*a-f*, and segmented electrode arrays 2378*a-e*.

However, the electrode configuration illustrated in FIGS. 23A-B differs from that of FIGS. 22A-B in that the third segmented electrode array 2378*d* includes sixteen (two groups of eight) individual electrodes in the curved turn region 2301 instead of eight as in the electrode configuration of FIGS. 22A-B. Additionally, the individual electrodes in the third segmented electrode array 2378*d* have a phase shift of 45 degrees between adjacent individual electrodes in the curved turn region 2301.

Figure 24A:
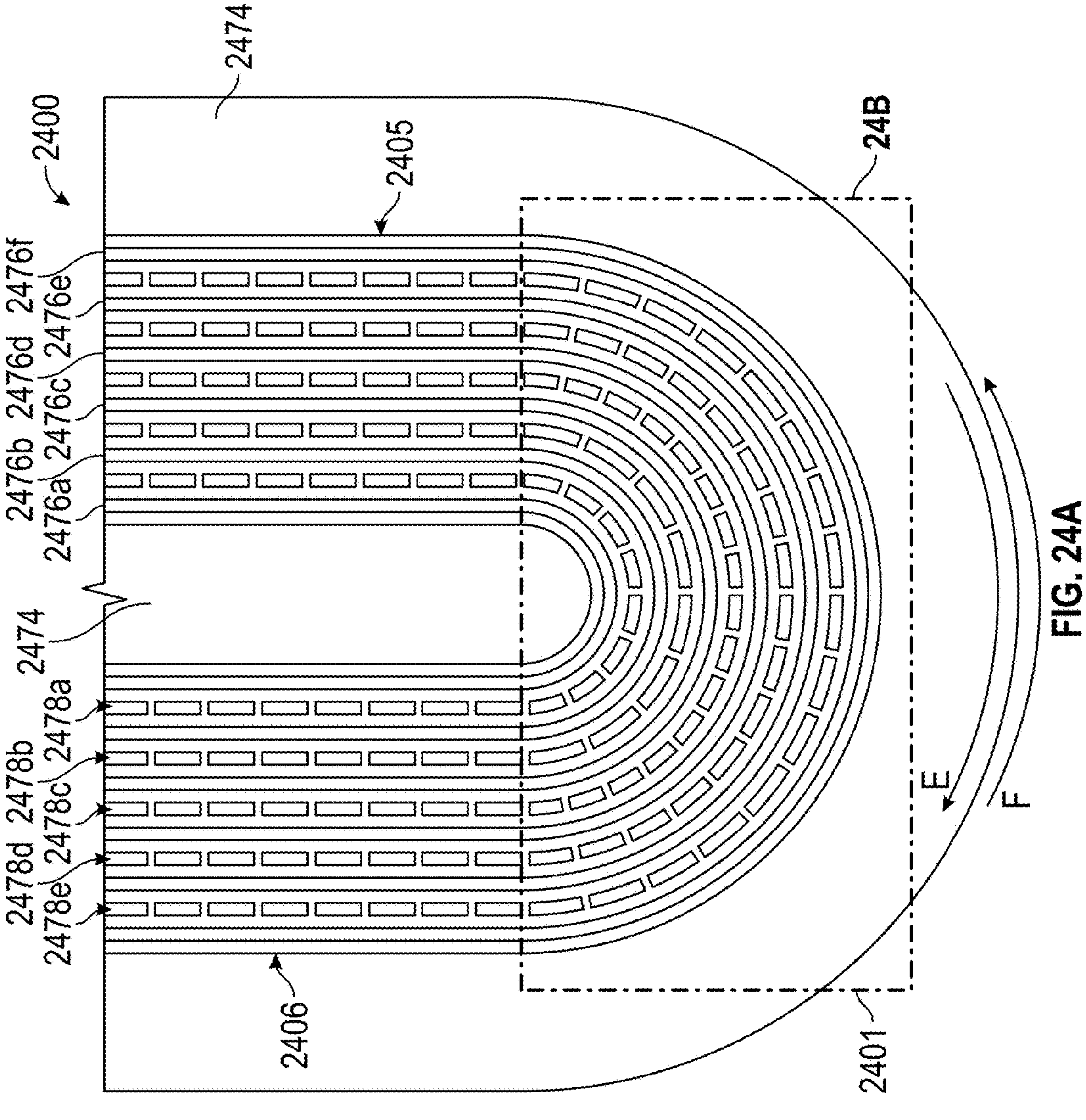
FIG. 24A is a detailed schematic diagram illustrating a sixth exemplary arrangement of electrodes for a portion of a SLIM path of the present disclosure having a 180 degree curved region.
Figure 24B:
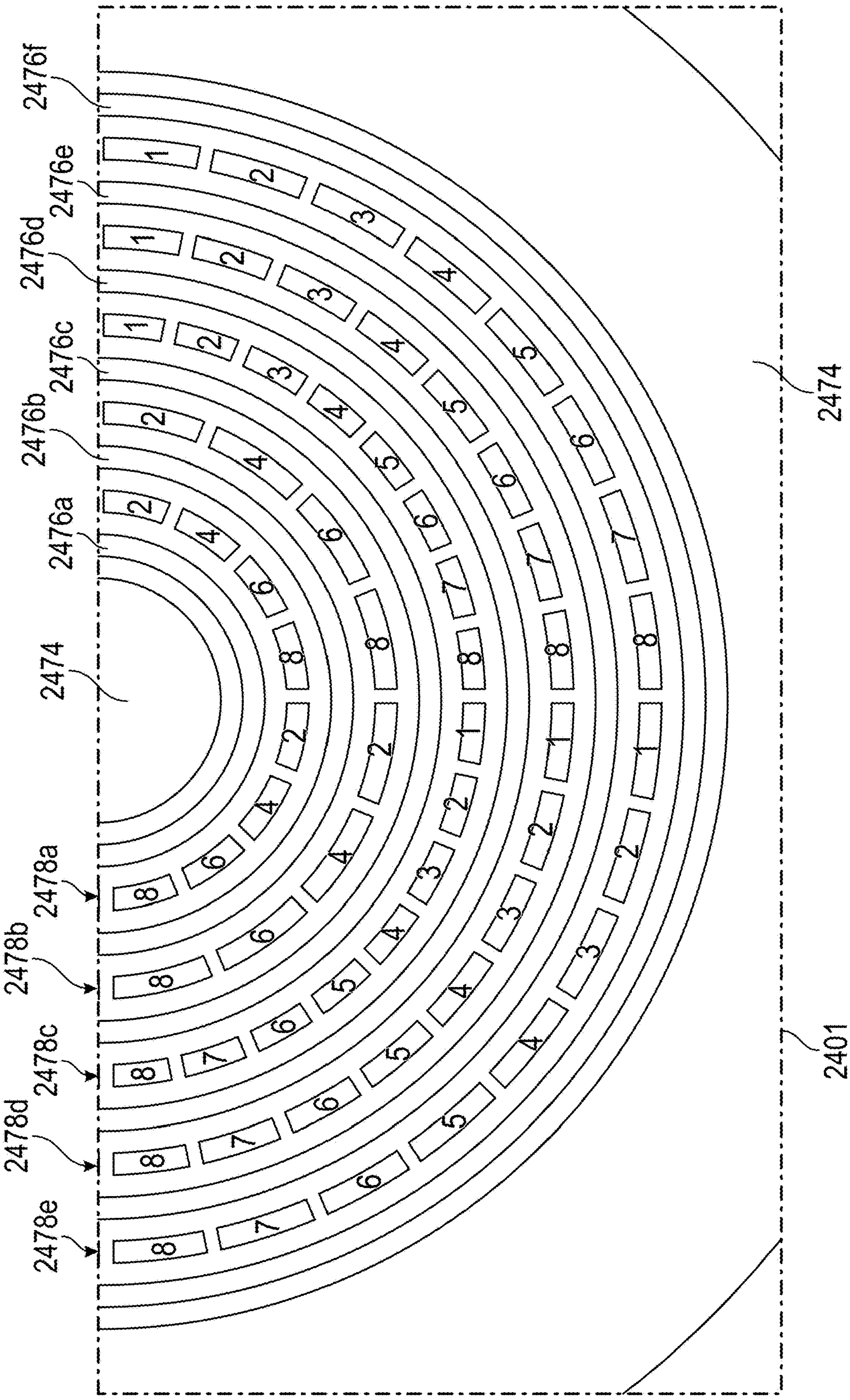
FIG. 24B is an enlarged detailed view of Area 24B of FIG. 24A.

FIG. 24A is a detailed schematic diagram illustrating a sixth exemplary arrangement of electrodes 2476*a-f*, 2478*a-e* for a portion of a SLIM path 2400 of the present disclosure having a 180 degree curved turn region 2401, and FIG. 24B is an enlarged detailed view of Area 24B of FIG. 24A. The SLIM path 2400 and arrangement of electrodes 2476*a-f*, 2478*a-e* of FIGS. 24A-B are substantially similar to the SLIM path 2300 and exemplary arrangement of electrodes 2376*a-f*, 2378*a-e* shown and described in connection with FIGS. 23A-B, and like reference numerals are used to denote like elements but incremented by 100. Accordingly, as shown in FIG. 24A, the SLIM path 2400 includes an inlet region 2405, a curved turn region 2401, and an outlet region 2406. The SLIM path 2400 additionally includes guard electrodes 2474, continuous RF electrodes 2476*a-f*, and segmented electrode arrays 2478*a-e*.

However, the electrode configuration illustrated in FIGS. 24A-B differs from that of FIGS. 23A-B in that the first segmented electrode array 2478*a* includes eight (two groups of four) individual electrodes in the curved turn region 2401 instead of four as in the electrode configuration of FIGS. 23A-B. Additionally, the individual electrodes in the first segmented electrode array 2478*a* have a phase shift of 90 degrees between adjacent individual electrodes in the curved turn region 2401.

Figure 25:
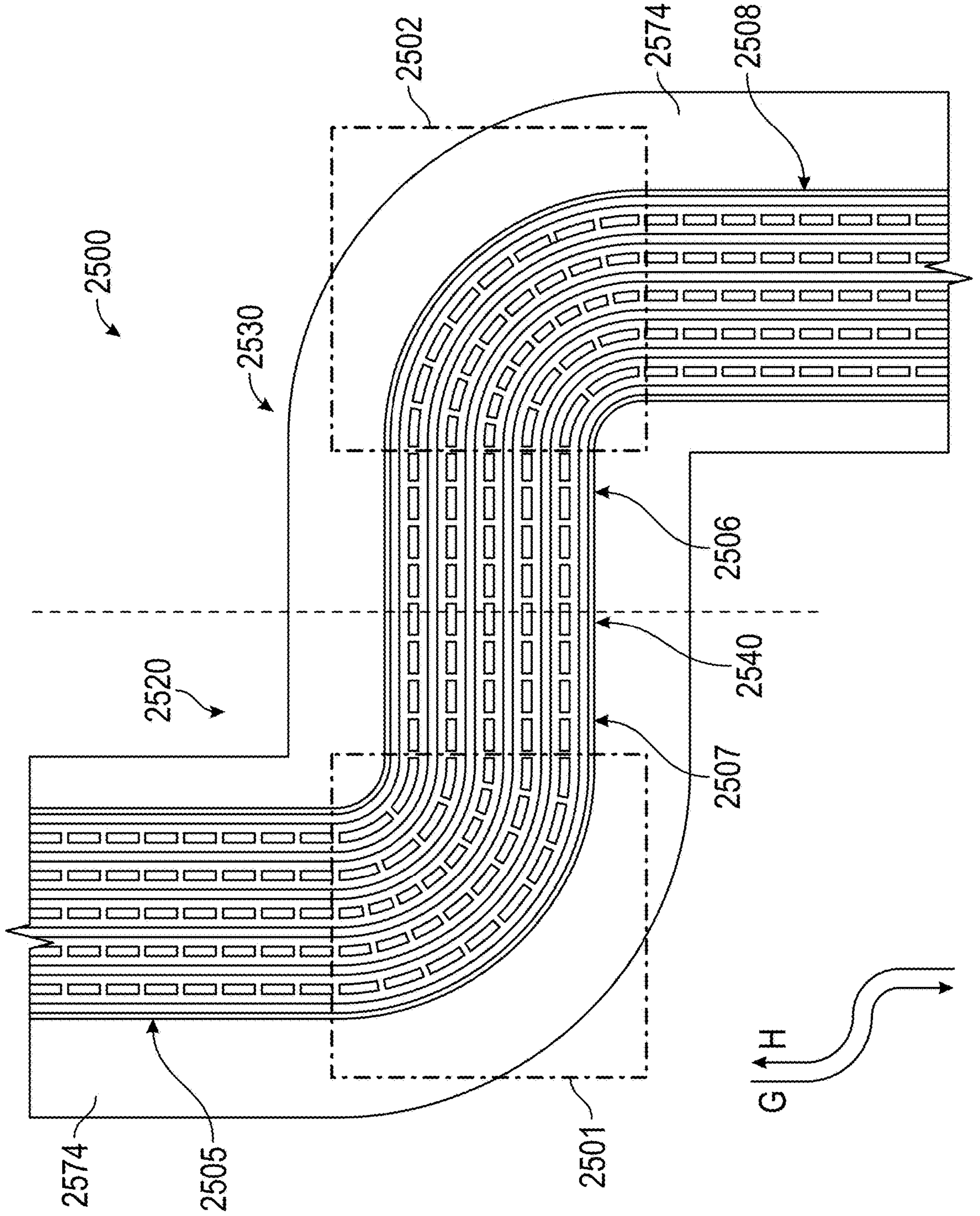
FIG. 25 is a detailed schematic diagram illustrating an exemplary arrangement of electrodes for a portion of a SLIM path of the present disclosure having two 90 degree curved regions, such as those shown in FIGS. 17A-B, combined with an intermediate straight region to form a 0 degree turn.

FIG. 25 is a detailed schematic diagram illustrating an exemplary arrangement of electrodes for a portion of a SLIM path 2500 of the present disclosure having two 90 degree curved turn regions 2501, 2502, such as the 90 degree curved turn region 1701 shown in FIGS. 17A-B, combined with an intermediate straight region 2540 to form a 0 degree turn. More specifically, in FIG. 25, the SLIM path 2500 includes a first SLIM path 2520 and a second SLIM path 2530 that are connected by an intermediate straight region 2540. The SLIM paths 2520 and 2530 have an arrangement of electrodes similar to those shown and described in connection with FIGS. 17A-B. As shown in FIG. 25, the first SLIM path 2520 includes an inlet region 2505, a curved turn region 2501 that is subsequent to the inlet region 2505 and generally curves or turns 90 degrees toward an outlet region 2507, which is subsequent to the curved turn region 2501. Similarly, the second SLIM path 2530 includes an inlet region 2506, a curved turn region 2502 that is subsequent to the inlet region 2506 and generally curves or turns 90 degrees toward an outlet region 2508, which is subsequent to the curved turn region 2502. The intermediate straight region 2540 connects the outlet region 2507 of the first SLIM path 2520 and the inlet region 2506 of the second SLIM path 2530. The outlet region 2508 can extend parallel to the inlet region 2505, but laterally offset therefrom, e.g., due to the two counter-acting 90 degree curved turn regions 2501, 2502. As such, the SLIM path 2500 has a curved configuration with two curved turn regions 2501 and 2502 that causes the ions to ultimately turn 0 degrees such that they proceed in the original direction of travel, but in a parallel path that is laterally offset from the original direction of travel.

During operation, ions can travel into the inlet region 2505 of the first SLIM path 2520, enter the curved turn region 2501 traveling in the direction of arrow G, turn 90 degrees as they traverse the first curved turn region 2501, enter the outlet region 2507, travel through the straight transmission region 2540, enter the inlet region 2506 of the second SLIM path 2530, enter the second curved turn region 2502 continuing to travel along the path of arrow G, turn 90 degrees as they traverse the curved turn region 2502, and finally enter the outlet region 2508 where they can be transferred out to a subsequent SLIM path. Alternatively, since the curved turn regions 2501, 2502 permit for bi-directional ion transmission, ions can alternatively be guided through the SLIM path 2500 in the opposite direction, e.g., entering at the outlet region 2508 of the second SLIM path 2530 and exiting from the inlet region 2505 of the first SLIM path 2520. In this configuration, the ions would travel along the path denoted by arrow H.

Figure 26:
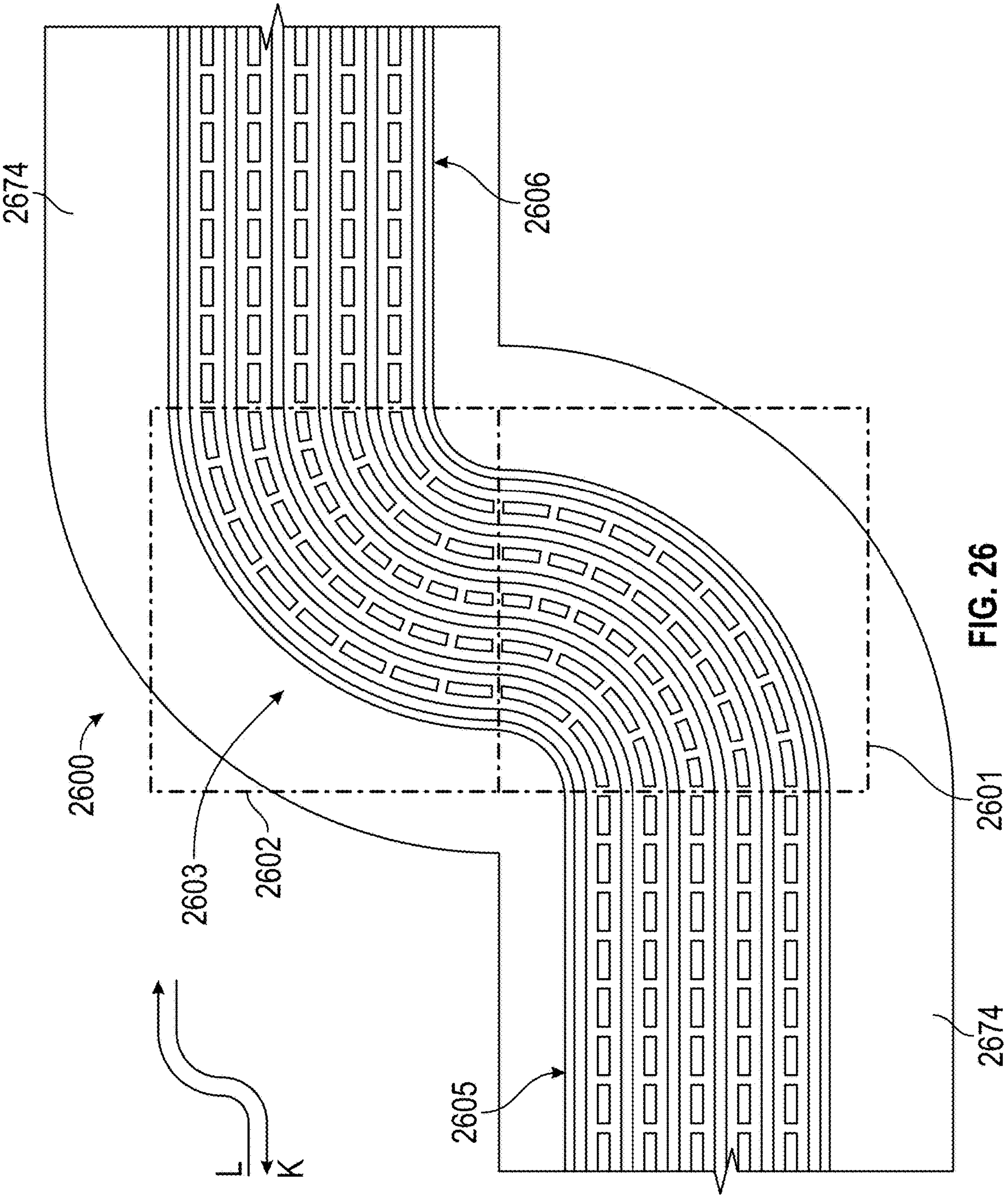
FIG. 26 is a detailed schematic diagram illustrating an exemplary arrangement of electrodes for a portion of a SLIM path of the present disclosure having two 90 degree curved regions, such as those shown in FIGS. 17A-B, combined to form a 0 degree turn.

FIG. 26 is a detailed schematic diagram illustrating an exemplary arrangement of electrodes for a portion of a SLIM path 2600 of the present disclosure having two 90 degree curved regions, such as those shown in FIGS. 17A-B, combined to form a 0 degree turn. The SLIM path 2600 shown in FIG. 26 is substantially similar to the SLIM path 2500 shown and described in connection with FIG. 25, but instead of having two curved turn regions 2501, 2502 connected by an intermediate straight region 2540 the SLIM path 2600 includes two curved turn regions 2601, 2602 that are directly connected, feed in to each other, and form a complex curved turn region 2603. Accordingly, the SLIM path 2600 includes an inlet region 2605, a curved turn region 2603 including the first curved turn region 2601 and the second curved turn region 2602, and an outlet region 2606. The first curved turn region 2601 is subsequent to the inlet region 2605 and generally curves or turns 90 degrees toward the second curved turn region 2602, the second curved turn region 2602 is subsequent to the first curved turn region 2601 and generally curves or turns 90 degrees toward the outlet region 2606, which is subsequent to the second curved turn region 2602. The outlet region 2606 can extend parallel to the inlet region 2605, but laterally offset therefrom, e.g., due to the two counter-acting 90 degree curved turn regions 2601, 2602 that form the 0 degree complex curved turn region 2603. As such, the SLIM path 2600 has a curved configuration with a curved turn region 2603 that causes the ions to ultimately turn 0 degrees such that they proceed in the original direction of travel, but in a parallel path that is laterally offset from the original direction of travel.

During operation, ions can travel along the path denoted by arrow L. Accordingly, during operation, ions can travel into the inlet region 2605 of the SLIM path 2600, enter the first curved turn region 2601, turn 90 degrees as they traverse the first curved turn region 2601, enter the second curved turn region 2502 continuing to travel along the path of arrow L, turn 90 degrees as they traverse the second curved turn region 2502, and finally enter the outlet region 2606 where they can be transferred to a subsequent SLIM path. Alternatively, since the complex curved turn region 2603 permits for bi-directional ion transmission, ions can be guided through the SLIM path 2600 in the opposite direction, e.g., entering at the outlet region 2606 and exiting from the inlet region 2605. In this configuration, the ions would travel along the path denoted by arrow K.

Figure 27A:
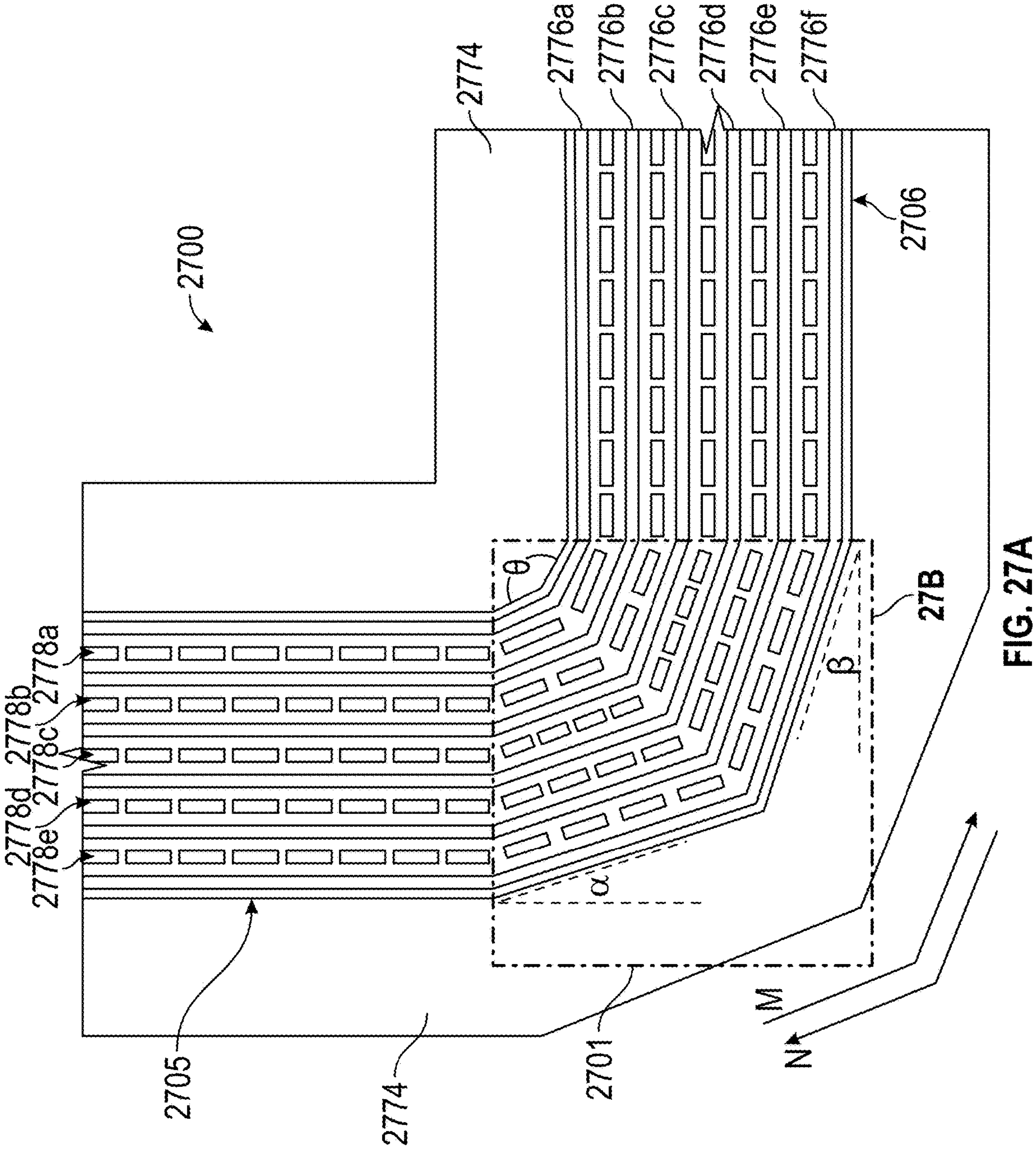
FIG. 27 is a detailed schematic diagram illustrating an exemplary arrangement of electrodes for a portion of a SLIM path of the present disclosure having a 90 degree segmented curved region.
Figure 27B:
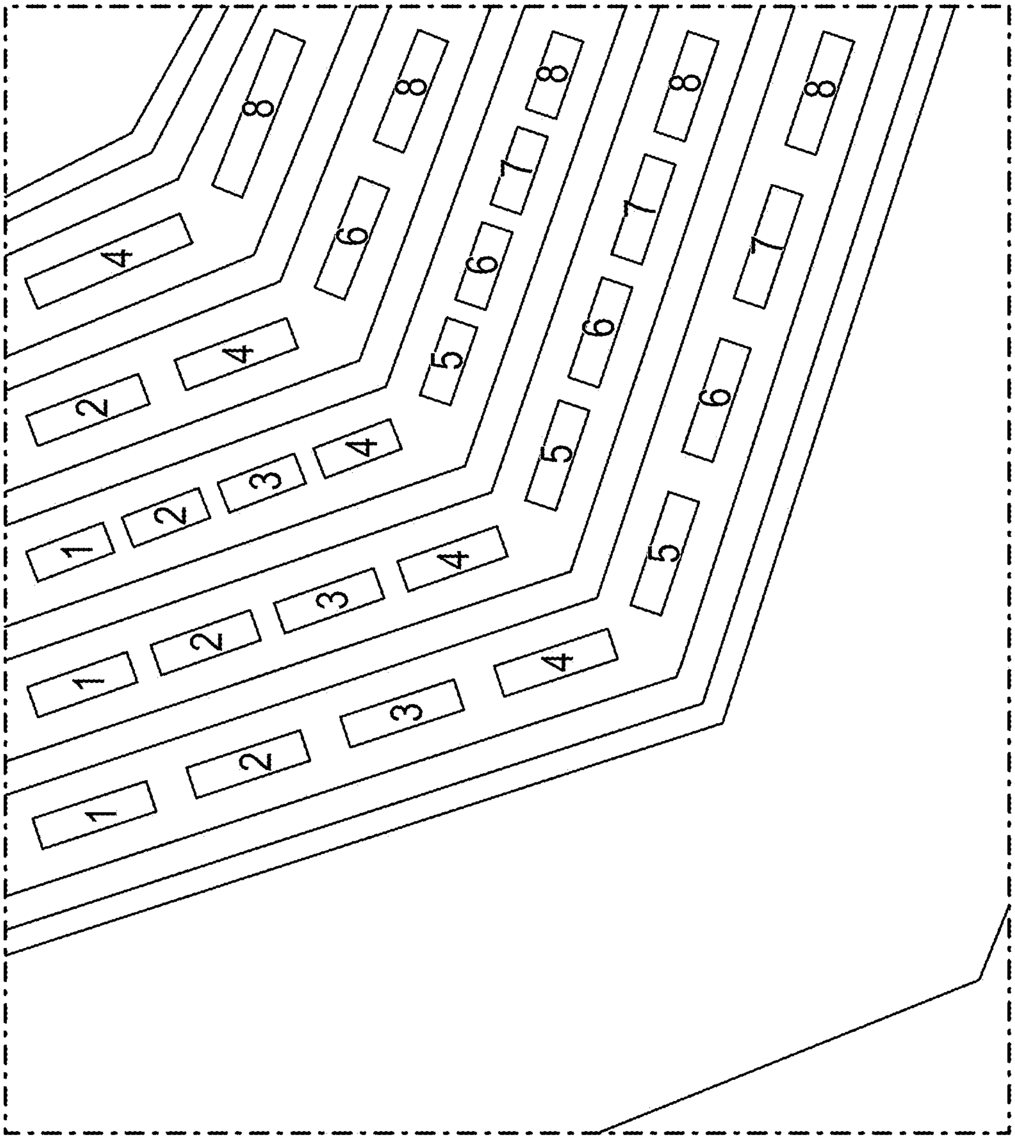

It should be understood that while the curved turn regions 1501, 1601, 1701, 1801, 1802, 1901, 2001, 2101, 2201, 2301, 2401, 2501, 2502, 2601, 2602 of the present disclosure are illustrated as smooth curves with curved electrodes, these regions could be formed from a series of segmented lines using, for example, square, rectangular, trapezoidal, bent, or otherwise angled electrodes in the rounded turn regions, such that a bent ion path is formed. One exemplary configuration is shown in FIGS. 27A and 27B. FIG. 27A is a detailed schematic diagram illustrating an exemplary arrangement of electrodes for a portion of a SLIM path 2700 of the present disclosure having a 90 degree segmented bent turn region 2701, and FIG. 27B is an enlarged detailed view of Area 27B of FIG. 27A. The SLIM path 2700 includes an inlet region 2705, a segmented bent turn region 2701, and an outlet region 2706. The bent turn region 2701 is subsequent to the inlet region 2705 and generally turns 90 degrees toward the outlet region 2706, which is subsequent to the bent turn region 2701. The outlet region 2706 can extend perpendicularly to the inlet region 2705. As such, the SLIM path 2700 has a bent configuration due to the bent turn region 2701, which causes ions to travel perpendicular to the original direction of travel.

As shown in FIGS. 27A and 27B, the bent turn region 2701 is essentially formed from a series of sequential straight regions that form a turn, as opposed to a single curved turn. In this regard, the SLIM path 2700, including the bent turn region 2701, includes guard electrodes 2774, a plurality of continuous RF electrodes 2776*a-f*, and a plurality of segmented electrode arrays 2778*a-e*, which progress through the bent turn region 2701. In the bent turn region 2701, the continuous electrodes 2776*a-f*, instead of being smoothly curved, are bent at angles as they extend through the bent turn region 2701, e.g., they are formed as angularly connected sequential straight sections. For example, a first portion of each continuous electrode 2776*a-f* in the bent turn region 2701 is at a first angle α with respect to the portion of continuous electrodes 2776*a-f* in the inlet region 2705 and extends in a straight line, while a second portion of each continuous electrode 2776*a-f* in the bent turn region 2701 is at a second angle β with respect to the portion of the continuous electrodes 2776*a-f* in the outlet region 2706 and extends in a straight line. The continuous electrodes 2776*a-f* can also form a third angle θ. Similarly, the individual electrodes of the segmented electrode arrays 2778*a-e* in the bent turn region 2701 are rectangular, and formed in two separate groups that extend in a straight line at the respective first and second angles α and β. Thus, the continuous electrodes 2776*a-f* and the segmented electrode arrays 2778*a-e* in the bent turn region 2701 form a bent ion path denoted by arrows M and N. The first and second angles α and β can be the same or different angles. The individual electrodes of each segmented electrode array 2778*a-e* in the bent turn region 2701 can receive the same phase TW voltage signal as the individual electrodes of the segmented electrode arrays 1778*a-e* shown and described in connection with FIGS. 17A-17B, as denoted by the phase numbers 1-8 included in each individual electrode in FIG. 27B.

Additionally, it should be understood that while FIGS. 27A and 27B illustrate the bent turn region 2701 being formed by two separate linear segments, the bent turn region 2701 could include more than two separate linear segments, e.g., three, four, five, etc. Additionally, while the individual electrodes of the segmented electrode arrays 2778*a-e* are shown as rectangular, it should be understood that they could be trapezoidal, such that they include angled ends, which allow the individual electrodes at the angled interfaces between straight segments to be in closer proximity.

Figures 28A, 28B, 28C, 28D:
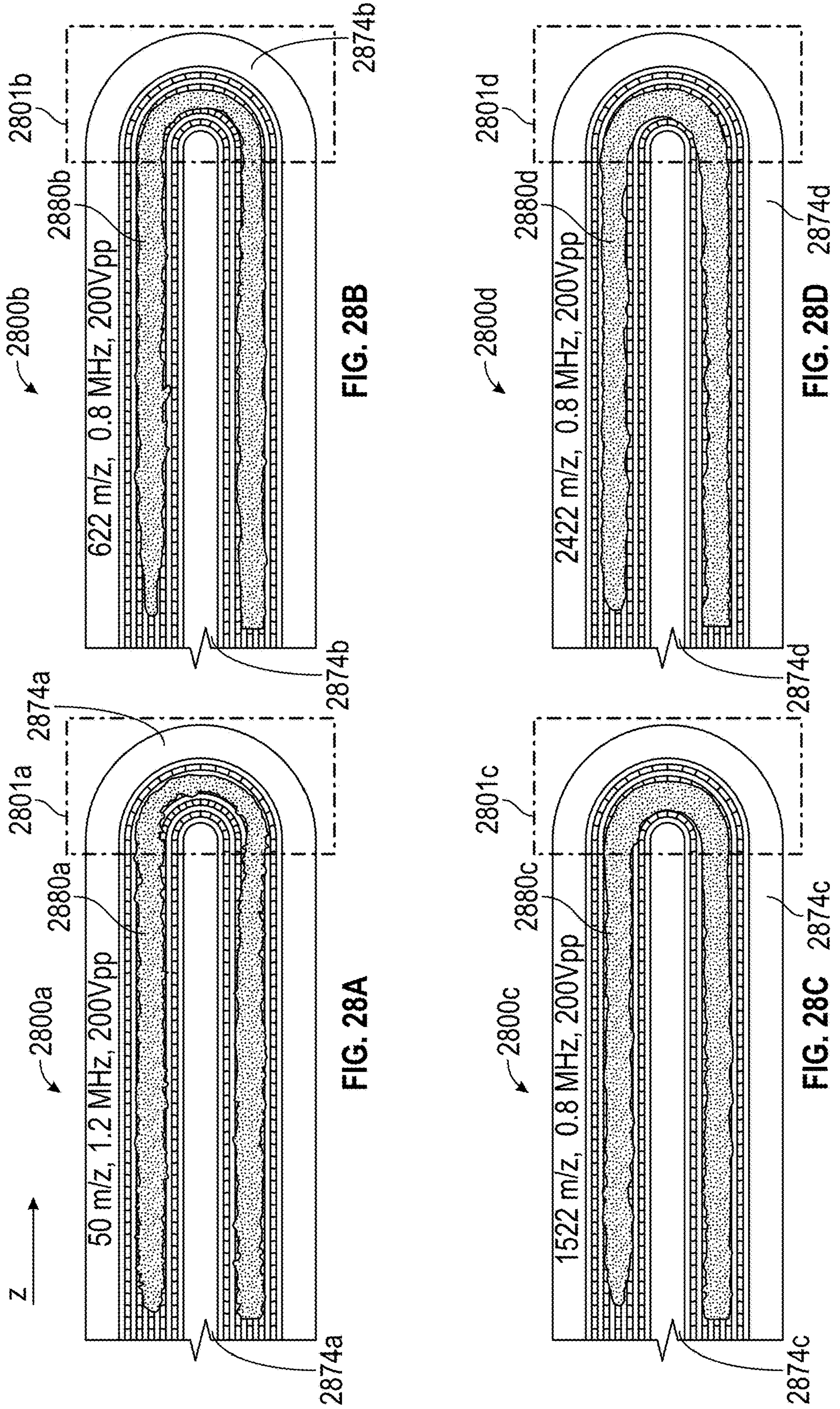
FIGS. 28A-28L are plots of computer simulation results showing an aggregated path of travel along a SLIM path having a 180 degree curved region according to the present disclosure for ions having different mass-to-charge ratios (m/z)
Figures 28E, 28F, 28G, 28H:
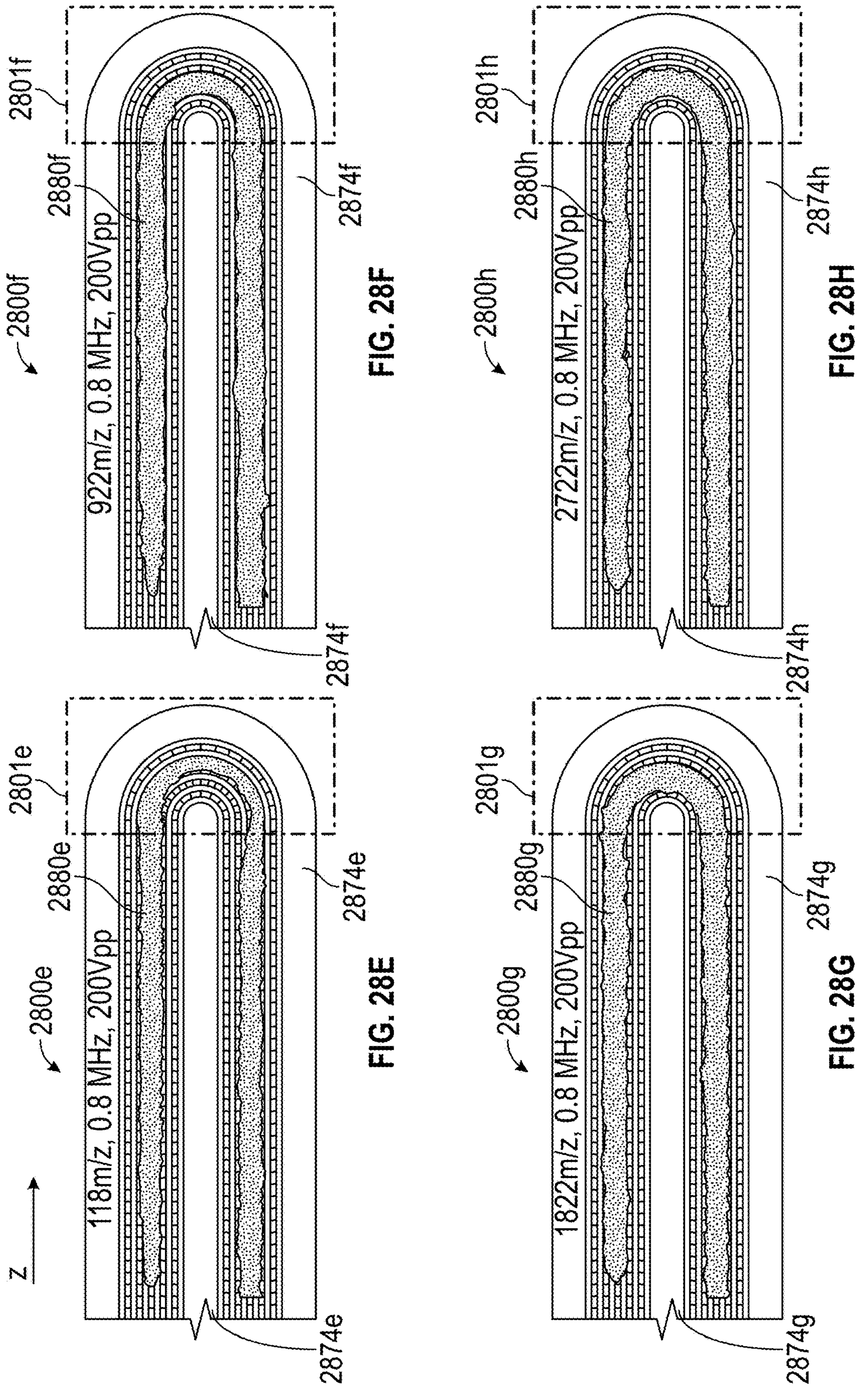
Figure 28I:
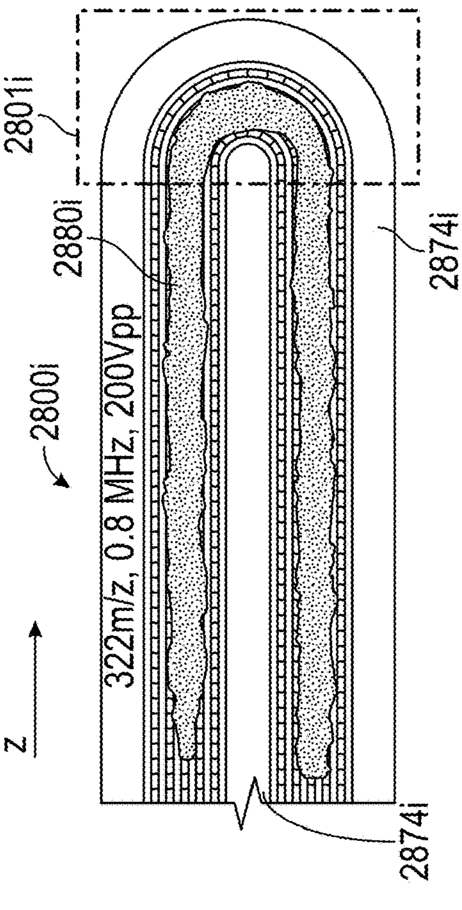
Figure 28J:
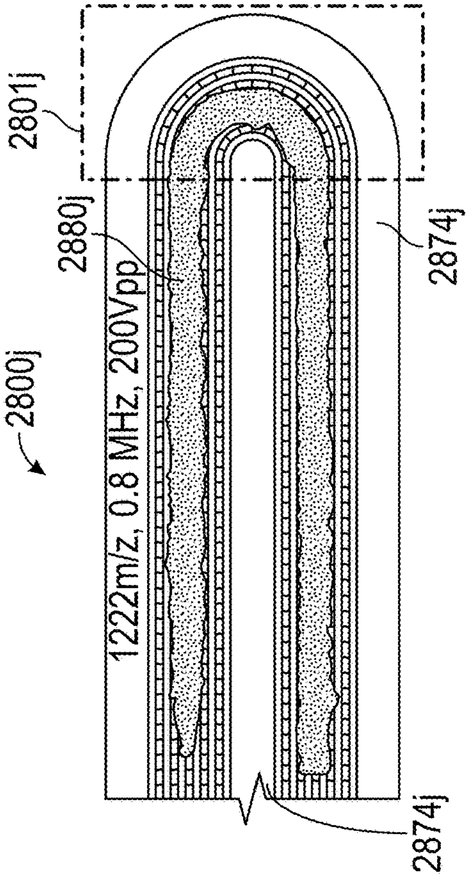
Figure 28K:
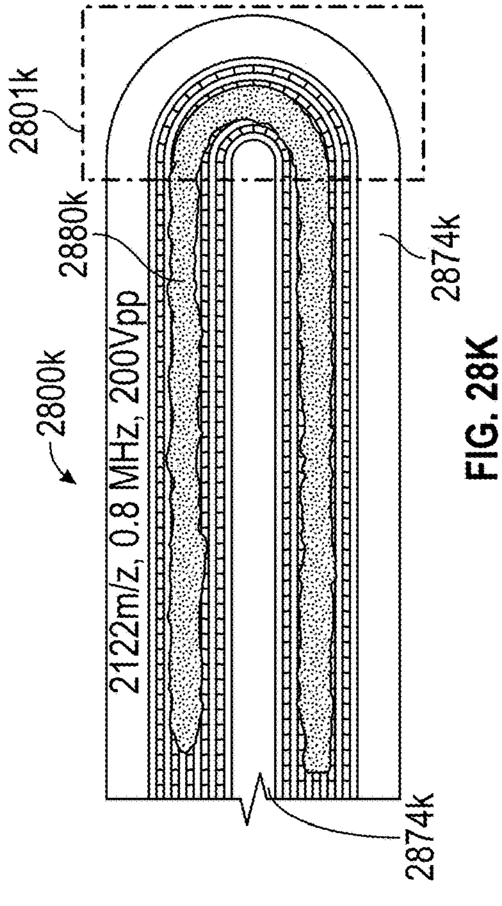
Figure 28L:
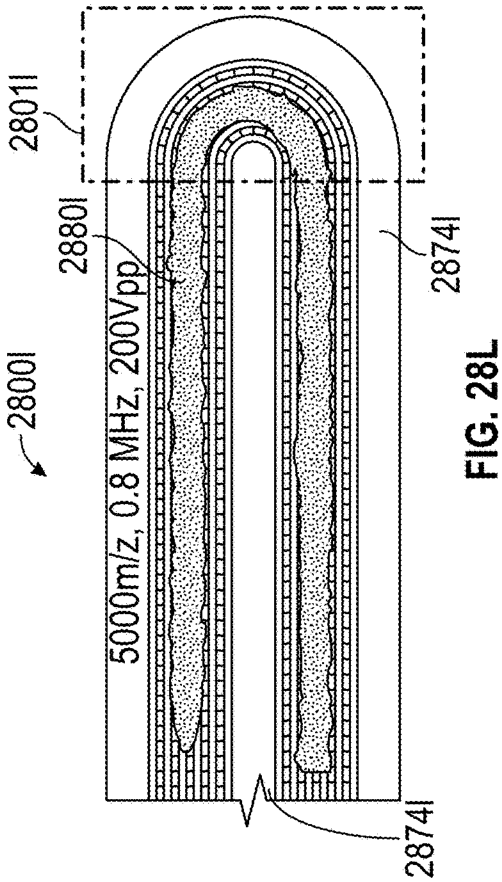

FIGS. 28A-28L are plots 2800*a*-1 of computer simulation results showing an aggregated path of travel along a SLIM path having a 180 degree curved turn region 2801*a-f* in accordance with the curved turn region 1901 of FIGS. 19A-B for 50 m/z ions 2880*a* (FIG. 28A), 622 m/z ions 2880*b* (FIG. 28B), 1522 m/z ions 2880*c* (FIG. 28C), 2422 m/z ions 2880*d* (FIG. 28D), 118 m/z ions 2880*e* (FIG. 28E), 922 m/z ions 2880*f* (FIG. 28F), 1822 m/z ions 2880*g* (FIG. 28G), 2722 m/z ions 2880*h* (FIG. 28H), 322 m/z ions 2880*i* (FIG. 28I), 1222 m/z ions 2880*j* (FIG. 28J), 2122 m/z ions 2880*k* (FIG. 28K), and 5000 m/z ions 2880*l* (FIG. 28L). The simulation for FIG. 28A was performed using an RF frequency of 1.2 MHz and RF amplitude of 200 Vpp, while the simulations for FIGS. 28B-L were performed using an RF frequency of 0.8 MHz and RF amplitude of 200 Vpp. Additionally, the simulations for FIGS. 28A-L were performed with a 208 m/s TW speed, 30 Vpp TW amplitude, 5V guard voltage, and 2.5 Torr pressure, and using 100 ions for each simulation. As can be seen in FIGS. 28A-L, the ions 2880*a*-1 are maintained between the respective guard electrodes 2874*a*-1 and generally traverse the respective curved turn region 2801*a*-1 without traveling over the respective guard electrodes 2874*a*-1. Accordingly, the curved turn regions 2801*a*-1 provide an efficient way to change the direction of ion transmission, including 180 degree turns, while minimizing ion loss. Indeed, the curved turn regions of the present disclosure have been shown to have over 98% transmission efficiency, and, in some instances, 100% transmission efficiency.

Figure 29B:
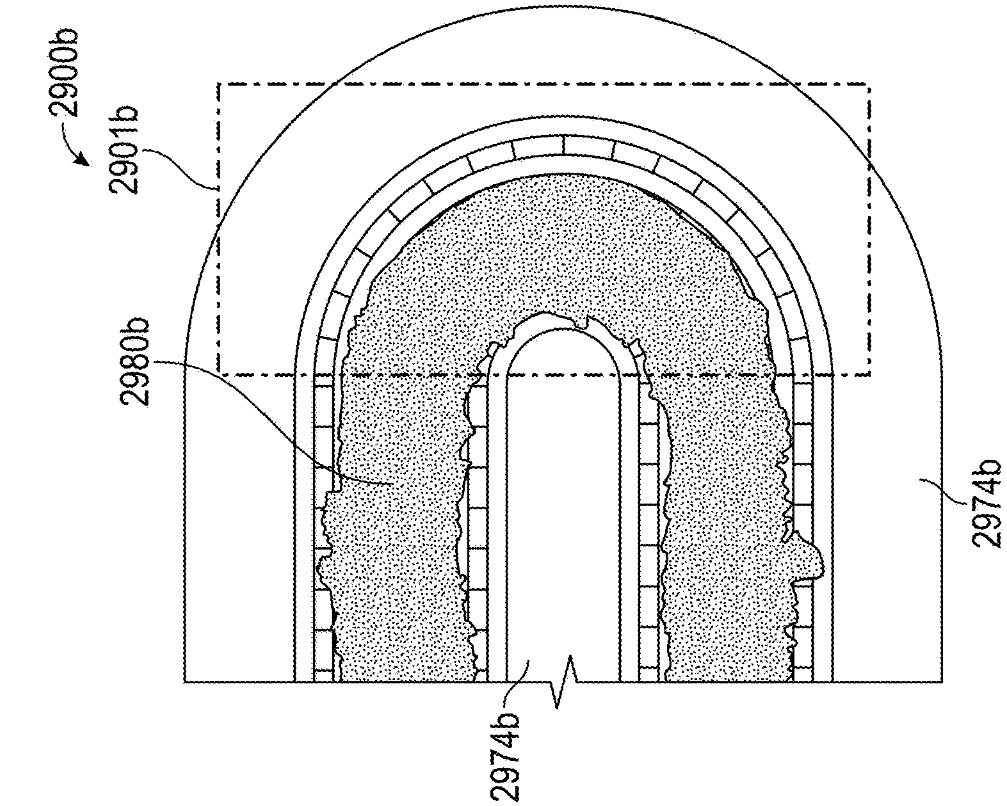
FIG. 29B is a partial plot of 8,500 computer simulation results showing an aggregated path of travel for 118 m/z ions along a portion of a SLIM path having a 180 degree curved turn region according to the present disclosure.
Figure 29A:
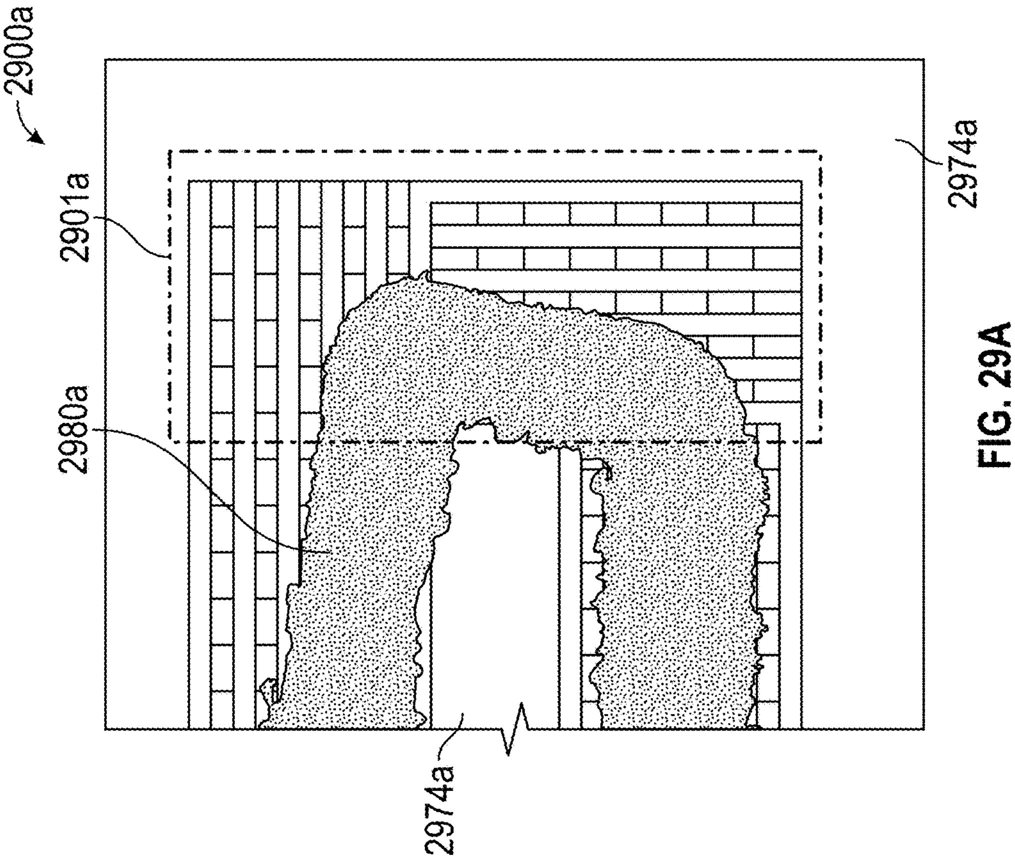
FIG. 29A is a partial plot of 8,500 computer simulation results showing an aggregated path of travel for 118 m/z ions along a portion of a SLIM path having a square turn region according to the prior art.

FIG. 29A is a partial plot 2900*a* of 8,500 computer simulation results showing an aggregated path of travel for 118 m/z ions along a portion of a SLIM path having a square turn region 2901*a* according to the prior art. FIG. 29B is a partial plot 2900*b* of 8,500 computer simulation results showing an aggregated path of travel for 118 m/z ions along a portion of a SLIM path having a 180 degree curved turn region 2901*b* in accordance with the curved turn region 1901 of FIGS. 19A-B. The simulations for FIG. 29A-B were performed using 8,500 ions for each simulation and the following operational parameters an RF frequency of 0.8 MHz, an RF amplitude of 200 Vpp, a TW speed of 208 m/s, a TW amplitude of 30 Vpp, a 5V guard voltage, and 2.5 Torr pressure. As shown in FIG. 29A, as the ions travel through the SLIM path in a counter-clockwise direction, some ions 2980*a* are not entirely maintained between the guard electrodes 2974*a*, but instead a portion of the ions 2980*a* travel over a portion of the guard electrodes 2974*a*, which can result in some or all of such ions being lost, e.g., eliminated, thus reducing the overall efficiency of the square turn region 2901*a*. In contrast, as shown in FIG. 29B, the ions 2980*b* are maintained between the guard electrodes 2974*b* and generally traverse the curved turn region 2801*b* without traveling over a portion of the guard electrodes 2974*b*. Accordingly, the curved turn region 2901*b* provides an efficient way to change the direction of ion transmission, including 180 degree turns, while minimizing ion loss.

It should be understood that while FIGS. 15-27A provide exemplary arrangements of electrodes for curved turn regions 1501, 1601, 1701, 1801, 1802, 1901, 2001, 2101, 2201, 2301, 2401, 2501, 2502, 2601, 2602, it is noted that the scope of the present disclosure is not limited to the examples shown in FIGS. 15-27A. In some examples, the segmented electrode arrays in the bent turn regions may have a different number of segmented electrodes, the number of individual electrodes in each segmented electrode array can be the same as the other segmented electrode arrays, and/or the number of individual electrodes in each segmented electrode array can be different than the other segmented electrode arrays. Additionally, it should be understood that the present disclosure is not limited to the shapes of the curved turn regions 1501, 1601, 1701, 1801, 1802, 1901, 2001, 2101, 2201, 2301, 2401, 2501, 2502, 2601, 2602 as illustrated in FIGS. 15-27B, but instead other shapes are contemplated. For example, the curved turn regions 1501, 1601, 1701, 1801, 1802, 1901, 2001, 2101, 2201, 2301, 2401, 2501, 2502, 2601, 2602 could be U-shaped (like in FIGS. 19A-24B, S-shaped (like in FIG. 26), C-shaped, tear drop shaped (e.g., with a bulbous shape), etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. An apparatus for ion manipulations, comprising:

an inlet configured to receive ions and an outlet configured to have ions discharged therefrom;

an ion manipulation path extending between the inlet and the outlet, the ion manipulation path including a first region extending in a first direction, a second region extending in a second direction, and a curved region extending between the first region and the second region;

at least one continuous electrode extending through the first region, the curved region, and the second region, the at least one continuous electrode configured to receive a first RF voltage signal; and a plurality of segmented electrodes arranged along the ion manipulation path, each segmented electrode extending uninterruptedly through the first region, the curved region, and the second region, the plurality of segmented electrodes configured to receive a second voltage signal and generate a traveling wave field based on the second voltage signal, wherein the traveling wave field is configured to cause the ions received at the inlet to travel through the first region, the curved region, and the second region.

2. The apparatus of claim 1, wherein the at least one continuous electrode curves along the curved region in a single continuous curve.

3. The apparatus of claim 1, wherein the at least one continuous electrode curves along the curved region in a plurality of angularly connected sequential straight sections.

4. The apparatus of claim 1, wherein the second direction is different than the first direction.

5. The apparatus of claim 1, wherein the second direction is the same as the first direction, and the second region is laterally offset from the first region.

6. The apparatus of claim 1, wherein the curved region curves between 0° to 180° from the first region to the second region.

7. The apparatus of claim 1, wherein the curved region includes at least two sequential turns.

8. The apparatus of claim 1, wherein the curved region is configured to change a direction of travel of the ions.

9. The apparatus of claim 1, wherein the at least one continuous electrode includes a first continuous electrode and a second continuous electrode, and the plurality of segmented electrodes are positioned between the first continuous electrode and the second continuous electrode.

10. The apparatus of claim 9, comprising a second plurality of segmented electrodes arranged along the ion manipulation path in the first region, the curved region, and the second region, wherein the at least one continuous electrode includes a third continuous electrode and the second plurality of segmented electrodes are positioned between the second continuous electrode and the third continuous electrode, and wherein the plurality of segmented electrodes includes a first number of individual electrodes in the curved region and the second plurality of segmented electrodes includes a second number of individual electrodes in the curved region, the second number being greater than the first number.

11. The apparatus of claim 10, wherein the second voltage signal is an AC voltage signal, and the AC voltage signal applied to adjacent electrodes within a sequential set of the plurality of segmented electrodes is phase shifted on the adjacent electrodes of the plurality of segmented electrodes by a first value between 1° and 359°, wherein the second plurality of segmented electrodes are configured to receive the AC voltage signal, and the AC voltage signal applied to adjacent electrodes within a sequential set of the second plurality of segmented electrodes is phase shifted on the adjacent electrodes of the second plurality of segmented electrodes by a second value between 1° and 359°, and wherein the second value is different than the first value.

12. The apparatus of claim 1, wherein the plurality of segmented electrodes are curved electrodes, rectangular electrodes, or a combination of curved electrodes and rectangular electrodes.

13. The apparatus of claim 1, wherein the at least one continuous electrode is arranged on a surface, and the plurality of segmented electrodes are arranged on the surface.

14. A curved ion manipulation path, comprising:

an inlet configured to receive ions in a first direction and an outlet configured to discharge ions in a second direction;

a curved region extending between the inlet and the outlet;

at least one continuous electrode extending through the curved region from the inlet to the outlet, the at least one continuous electrode configured to receive a first RF voltage signal; and a first plurality of segmented electrodes arranged along the curved region and extending from the inlet to the outlet, the plurality of segmented electrodes configured to receive a second voltage signal and generate a traveling wave field based on the second voltage signal, one or more second segmented electrodes arranged along the curved region and extending from the inlet to the outlet, the one or more second segmented electrodes configured to receive the second voltage signal and generate the traveling wave field based on the second voltage signal; and wherein the plurality of segmented electrodes includes a first number of individual electrodes in the curved region and the one or more second segmented electrodes includes a second number of individual electrodes in the curved region, the second number being different than the first number; and wherein the traveling wave field is configured to cause the ions received at the inlet to travel through the curved region and to be discharged from the outlet in the second direction.

15. The curved ion manipulation path of claim 14, wherein the at least one continuous electrode curves along the curved region in a single continuous curve.

16. The curved ion manipulation path of claim 14, wherein the at least one continuous electrode curves along the curved region in a plurality of angularly connected sequential straight sections.

17. The curved ion manipulation path of claim 14, wherein the second direction is different than the first direction.

18. The curved ion manipulation path of claim 14, wherein the second direction is the same as the first direction, and the inlet is laterally offset from the outlet.

19. The curved ion manipulation path of claim 14, wherein the curved region curves between 0° to 180° from the inlet to the outlet.

20. The curved ion manipulation path of claim 14, wherein the curved region includes at least two sequential turns.

21. The curved ion manipulation path of claim 14, wherein the curved region is configured to change a direction of travel of the ions.

22. The apparatus of claim 14, wherein the at least one continuous electrode includes a first continuous electrode and a second continuous electrode, and the plurality of segmented electrodes are positioned between the first continuous electrode and the second continuous electrode.

23. The curved ion manipulation path of claim 14, wherein the second voltage signal is an AC voltage signal, and the AC voltage signal applied to adjacent electrodes within a sequential set of the plurality of segmented electrodes is phase shifted on the adjacent electrodes of the plurality of segmented electrodes by a first value between 1° and 359°, wherein the one or more second segmented electrodes are configured to receive the AC voltage signal, and the AC voltage signal applied to adjacent electrodes within a sequential set of the second segmented electrodes is phase shifted on the adjacent electrodes of the second segmented electrodes by a second value between 1° and 359°, and wherein the second value is different than the first value.

24. The curved ion manipulation path of claim 14, wherein the plurality of segmented electrodes are curved electrodes, rectangular electrodes, or a combination of curved electrodes and rectangular electrodes.

25. The curved ion manipulation path of claim 14, wherein the at least one continuous electrode is arranged on a surface, and the plurality of segmented electrodes are arranged on the surface.

26. An apparatus for ion extraction, comprising:

an inlet configured to receive ions and an exit configured to have ions discharged therefrom;

an ion manipulation path extending between the inlet and the exit, the ion manipulation path including an inlet region extending in a first direction, an exit region extending in a second direction, and a curved region extending between the inlet region and the exit region;

a first plurality of electrodes extending through the inlet region, the curved region, and the exit region, the first plurality of electrodes configured to receive a first RF voltage signal;

a second plurality of electrodes arranged along the ion manipulation path, each of the second plurality of electrodes extending uninterruptedly through in the inlet region, the curved region, and the exit region, the second plurality of electrodes configured to receive a second voltage signal and generate a traveling wave field based on the second voltage signal, wherein the traveling wave field is configured to cause the ions received at the inlet to travel through the inlet region, the curved region, and the exit region.

27. The apparatus of claim 26, wherein the first plurality of electrodes includes a plurality of continuous electrodes arranged in rows.

28. The apparatus of claim 27, wherein each of the plurality of continuous electrodes curve along the curved region in a single continuous curve.

29. The apparatus of claim 26, wherein the first plurality of electrodes are segmented electrodes arranged in a row along the ion manipulation path.

30. The apparatus of claim 26, wherein the curved region includes a series of incremental turns.

31. The apparatus of claim 26, wherein the curved region curves between 0° and 180° from the inlet region to the exit region.

32. The apparatus of claim 26, wherein the curved region includes at least two sequential turns.

33. The apparatus of claim 26, wherein the curved region is configured to change a direction of travel of the ions.

34. The apparatus of claim 26, wherein the first plurality of electrodes includes a first continuous electrode and a second continuous electrode, and the second plurality of electrodes are positioned between the first continuous electrode and the second continuous electrode.

35. An ion manipulation path, comprising:

an inlet region configured to receive ions in a first direction;

an exit region configured to discharge ions in a second direction;

a curved region extending between the inlet region and the exit region;

a first plurality of electrodes extending through the inlet region, the curved region, and the exit region, the first plurality of electrodes configured to receive a first RF voltage signal;

a second plurality of electrodes arranged along the ion manipulation path, each of the second plurality of electrodes extending uninterruptedly through the inlet region, the curved region, and the exit region, the second plurality of electrodes configured to receive a second voltage signal and generate a traveling wave field based on the second voltage signal, wherein the traveling wave field is configured to cause the ions received at the inlet region to travel through the inlet region, the curved region, and the exit region.

36. The ion manipulation path of claim 35, wherein the first plurality of electrodes includes a plurality of continuous electrodes arranged in rows.

37. The ion manipulation path of claim 36, wherein each of the plurality of continuous electrodes curve along the curved region in a single continuous curve.

38. The ion manipulation path of claim 35, wherein the first plurality of electrodes are segmented electrodes arranged in a row along the ion manipulation path.

39. The ion manipulation path of claim 35, wherein the curved region includes a series of incremental turns.

40. The ion manipulation path of claim 35, wherein the curved region curves between 0° and 180° from the inlet region to the exit region.

41. The ion manipulation path of claim 35, wherein the curved region includes at least two sequential turns.

42. The ion manipulation path of claim 35, wherein the curved region is configured to change a direction of travel of the ions.

43. The ion manipulation path of claim 35, wherein the first plurality of electrodes includes a first continuous electrode and a second continuous electrode, and the second plurality of electrodes are positioned between the first continuous electrode and the second continuous electrode.

* * * * *